United States Patent
Ozawa et al.

(10) Patent No.: US 11,955,643 B2
(45) Date of Patent: Apr. 9, 2024

(54) CURRENT COLLECTOR WITH ADHESIVE LAYER, ELECTRODE, ALL-SOLID STATE SECONDARY BATTERY, ELECTRONIC APPARATUS, ELECTRIC VEHICLE, AND METHODS OF MANUFACTURING CURRENT COLLECTOR WITH ADHESIVE LAYER, ELECTRODE, AND ALL-SOLID STATE SECONDARY BATTERY

(71) Applicant: FUJIFILM Corporation, Tokyo (JP)

(72) Inventors: Shin Ozawa, Kanagawa (JP); Hiroshi Isojima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 727 days.

(21) Appl. No.: 17/103,976

(22) Filed: Nov. 25, 2020

(65) Prior Publication Data

US 2021/0083299 A1   Mar. 18, 2021

Related U.S. Application Data

(63) Continuation of application No. PCT/JP2019/020666, filed on May 24, 2019.

(30) Foreign Application Priority Data

May 31, 2018 (JP) ................ 2018-104354

(51) Int. Cl.
  *H01M 4/66* (2006.01)
  *H01M 4/04* (2006.01)
  *H01M 4/62* (2006.01)
  *H01M 10/0525* (2010.01)
  *H01M 10/058* (2010.01)

(52) U.S. Cl.
  CPC ......... *H01M 4/667* (2013.01); *H01M 4/0404* (2013.01); *H01M 4/621* (2013.01); *H01M 10/0525* (2013.01); *H01M 10/058* (2013.01); *H01M 2250/20* (2013.01); *H01M 2300/0068* (2013.01)

(58) Field of Classification Search
  None
  See application file for complete search history.

(56) References Cited

U.S. PATENT DOCUMENTS

| | | | |
|---|---|---|---|
| 6,358,650 B2 | 3/2002 | McLin et al. | |
| 8,871,387 B2 | 10/2014 | Wang et al. | |
| 8,968,928 B2 | 3/2015 | Wang et al. | |
| 9,379,387 B2 | 6/2016 | Jung et al. | |
| 2004/0234850 A1 | 11/2004 | Watarai et al. | |
| 2013/0157143 A1 | 6/2013 | Hoshiba et al. | |
| 2015/0086875 A1 | 3/2015 | Yoshida | |
| 2016/0204465 A1* | 7/2016 | Mimura ............ | H01M 10/0565 429/162 |
| 2018/0342765 A1 | 11/2018 | Mimura et al. | |

FOREIGN PATENT DOCUMENTS

| | | |
|---|---|---|
| JP | H10149810 | 6/1998 |
| JP | H11250916 | 9/1999 |
| JP | 2001052710 | 2/2001 |
| JP | 2002304997 | 10/2002 |
| JP | 2011501383 | 1/2011 |
| JP | 2013125707 | 6/2013 |
| JP | 2013533601 | 8/2013 |
| JP | 2015088486 | 5/2015 |
| WO | 2013146916 | 10/2013 |
| WO | 2017131093 | 8/2017 |

OTHER PUBLICATIONS

"Office Action of Japan Counterpart Application" with English translation thereof, dated Dec. 7, 2021, p. 1-p. 10.
"International Search Report (Form PCT/ISA/210) of PCT/JP2019/020666," dated Aug. 20, 2019, with English translation thereof, pp. 1-5.
"Written Opinion of the International Searching Authority (Form PCT/ISA/237) of PCT/JP2019/020666," dated Aug. 20, 2019, with English translation thereof, pp. 1-11.

* cited by examiner

*Primary Examiner* — Wyatt P McConnell
(74) *Attorney, Agent, or Firm* — JCIPRNET

(57) ABSTRACT

Provided is a current collector with an easily adhesive layer including an easily adhesive layer that is provided on at least one surface of a current collector, in which the easily adhesive layer includes a polymer having a solubility of 1 g/100 g or higher in toluene at 25° C. Provided are also an electrode, an all-solid state secondary battery, an electronic apparatus, and an electric vehicle that include the current collector with an easily adhesive layer, and methods of manufacturing the current collector with an easily adhesive layer, the electrode, and the all-solid state secondary battery.

17 Claims, 1 Drawing Sheet

CURRENT COLLECTOR WITH ADHESIVE LAYER, ELECTRODE, ALL-SOLID STATE SECONDARY BATTERY, ELECTRONIC APPARATUS, ELECTRIC VEHICLE, AND METHODS OF MANUFACTURING CURRENT COLLECTOR WITH ADHESIVE LAYER, ELECTRODE, AND ALL-SOLID STATE SECONDARY BATTERY

This application is a Continuation of PCT International Application No. PCT/JP2019/020666 filed on May 24, 2019, which claims priority under 35 U.S.C. § 119 (a) to Japanese Patent Application No. 2018-104354 filed in Japan on May 31, 2018. Each of the above applications is hereby expressly incorporated by reference, in its entirety, into the present application.

BACKGROUND OF THE INVENTION

1. Field of the Invention

The present invention relates to a current collector with an easily adhesive layer, an electrode, an all-solid state secondary battery, an electronic apparatus, an electric vehicle, and methods of manufacturing a current collector with an easily adhesive layer, an electrode, and an all-solid state secondary battery.

2. Description of the Background Art

In an all-solid state secondary battery, a negative electrode, an electrolyte, and a positive electrode are all solid, and safety or reliability which is considered an issue of batteries including an organic electrolytic solution can be significantly improved. In addition, the service lives can also be extended. Further, an all-solid state secondary battery may have a structure in which electrodes and an electrolyte are directly disposed in series. Therefore, the energy density can be further increased as compared to a secondary battery in which an organic electrolytic solution is used, and the application to an electric vehicle or a large-sized storage battery is expected.

In this all-solid state secondary battery, by securing adhesion or contact between solid particles (for example, an inorganic solid electrolyte, an active material, and a conductive auxiliary agent) forming constituent layers (an inorganic solid electrolyte layer, a negative electrode active material layer, and a positive electrode active material layer) to reduce the interface resistance and to improve the battery performance, a binder that adheres the solid particles is typically used. However, in each of the constituent layers, in particular, the negative electrode active material layer and the positive electrode active material layer (also collectively referred to as "electrode active material layer"), in a case where the content of the binder increases, the battery performance deteriorates. Therefore, the content of the binder is set to be as small as possible.

However, even in a secondary battery or an all-solid state secondary battery formed of an electrolytic solution, each of the electrode active material layers may be used as a laminate including not only the electrode active material layer but also a current collector that supports the electrode active material layer. In a case where this laminate is used, by setting the content of the binder in the electrode active material layer to be low, poor adhesion between the electrode active material layer and the current collector occurs, and the battery performance deteriorates.

Therefore, in a secondary battery including the above-described laminate as an electrode, the electrode (the current collector forming the electrode) has considered. For example, a current collector having a surface on which a primer layer (coating layer) including a conductive material such as a carbon component and a specific polymer material such as lithium polysilicate is provided is provided (for example, JP2001-052710A, JP2013-533601A, and JP2011-501383A).

SUMMARY OF THE INVENTION

In all the techniques described in JP2001-052710A, JP2013-533601A, and JP2011-501383A, the primer layer that is provided between the current collector and the electrode active material includes the specific polymer material and the conductive material such that the adhesiveness between the current collector and the active material layer is improved and an electron conduction path is constructed between the current collector and the electrode active material layer. Therefore, the primer layer is formed to be relatively thick (typically, in the order of micrometers). As a result, since the total thickness of the secondary battery increases, there is a room for improvement from the viewpoint of energy density and further electrical resistance.

An object of the present invention is to provide a current collector with an easily adhesive layer that is used as an electrode for a secondary battery such that a high adhesive strength to an electrode active material layer provided on the current collector is can be exhibited and high battery performance can be imparted. In addition, another object of the present invention is to provide an electrode, an all-solid state secondary battery, an electronic apparatus, and an electric vehicle that include the current collector with an easily adhesive layer. Still another object of the present invention is to provide methods of manufacturing the current collector with an easily adhesive layer, the electrode, and the all-solid state secondary battery.

The present inventors repeatedly conducted a thorough investigation and found that, by providing an easily adhesive layer formed of a polymer having a solubility (25° C.) of 1 g/100 g or higher in a solvent (for example, toluene) having a C Log P value of 2.0 or higher on a surface of a current collector, adhesiveness with an electrode active material layer provided on the current collector can be improved, and an electron or ion conduction path can be constructed between the current collector and the electrode active material layer. Further, the present inventors also found that, by using the current collector including the easily adhesive layer as a material for forming an electrode of a secondary battery, excellent battery performance can be imparted to the secondary battery. The present invention has been completed based on the above findings as a result of repeated investigation.

That is, the above-described objects have been achieved by the following means.

<1> A current collector with an easily adhesive layer comprising:
  an easily adhesive layer that is provided on at least one surface of a current collector,
  in which the easily adhesive layer includes a polymer having a solubility of 1 g/100 g or higher in toluene at 25° C.

<2> The current collector with an easily adhesive layer according to <1>,
  in which a surface electrical resistance of the easily adhesive layer is $10^4 \Omega/\square$ or higher.

<3> The current collector with an easily adhesive layer according to <1> or <2>,
  in which a thickness of the easily adhesive layer is 10 to 300 nm.
<4> The current collector with an easily adhesive layer according to any one of <1> to <3>,
  in which the easily adhesive layer includes $1\times10^5$ to $1\times10^{11}$ piece/m$^2$ protrusion portions on a surface.
<5> The current collector with an easily adhesive layer according to any one of <1> to <4>,
  in which a tensile elastic modulus of the easily adhesive layer is 500 MPa or lower.
<6> The current collector with an easily adhesive layer according to anyone of <1> to <5>,
  in which a glass transition temperature of the polymer is 0° C. or lower.
<7> The current collector with an easily adhesive layer according to any one of <1> to <6>,
  in which a residual water content of the easily adhesive layer is 100 ppm or lower.
<8> An electrode comprising:
  an electrode active material layer including a solid electrolyte that is provided on a surface of the current collector with an easily adhesive layer according to any one of <1> to <7> where the easily adhesive layer is provided.
<9> The electrode according to <8>,
  in which the solid electrolyte is an inorganic solid electrolyte.
<10> The electrode according to <9>,
  in which the inorganic solid electrolyte is a sulfide-based solid electrolyte.
<11> The electrode according to anyone of <8> to <10>,
  in which the electrode active material layer includes a particle binder.
<12> An all-solid state secondary battery comprising:
  the electrode according to any one of <8> to <11>.
<13> An electronic apparatus comprising:
  the all-solid state secondary battery according to <12>.
<14> An electric vehicle comprising:
  the all-solid state secondary battery according to <12>.
<15> A method of manufacturing a current collector with an easily adhesive layer, the method comprising:
  forming a film on a surface of a current collector using an easily adhesive layer-forming composition including a polymer having a solubility of 1 g/100 g or higher in toluene at 25° C.
<16> The method of manufacturing a current collector with an easily adhesive layer according to <15>,
  in which the easily adhesive layer-forming composition includes a solvent, and
  the film is formed with an application method using the easily adhesive layer-forming composition.
<17> The method of manufacturing a current collector with an easily adhesive layer according to <16>,
  wherein the solvent is an aqueous solvent.
<18> A method of manufacturing an electrode including the current collector with an easily adhesive layer according to any one of <1> to <7>, the method comprising:
  forming a film on the easily adhesive layer of the current collector with an easily adhesive layer using an active material layer-forming composition including an electrode active material and a solvent that has a C log P value of 2.0 or higher and dissolves the polymer in the easily adhesive layer of the current collector with an easily adhesive layer with a solubility of 1 g/100 g or higher.
<19> A method of manufacturing an all-solid state secondary battery, the method comprising:
  manufacturing an all-solid state secondary battery through the method of manufacturing an electrode according to <18>.

In a case where the current collector with an easily adhesive layer according to the aspect of the present invention is used as a material for forming an electrode of a secondary battery, strong adhesiveness with an electrode active material layer is exhibited and high (electron or ion) conductivity is exhibited. Therefore, the electrode and the all-solid state secondary battery according to the aspect of the present invention including the current collector with an easily adhesive layer according to the aspect of the present invention exhibit high battery performance. That is, the present invention can provide a current collector with an easily adhesive layer that exhibits high adhesive strength with an electrode active material layer provided on a current collector and can impart high battery performance, and an electrode and an (all-solid-state) secondary battery including the current collector with an easily adhesive layer. In addition, the present invention can provide an electronic apparatus and an electric vehicle including the all-solid state secondary battery according to the aspect of the present invention that exhibits the above-described excellent battery performance. Further, the present invention can provide methods of manufacturing the current collector with an easily adhesive layer, the electrode, and the all-solid state secondary battery that exhibit the above-described excellent characteristics.

The above-described and other characteristics and advantageous effects of the present invention will be clarified from the following description appropriately with reference to the accompanying drawings.

DESCRIPTION OF THE PREFERRED EMBODIMENTS

Figure 1:
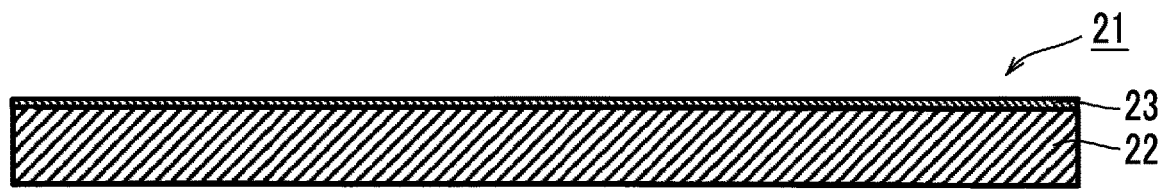
FIG. 1 is a vertical cross-sectional view showing a current collector with an easily adhesive layer according to a preferred embodiment of the present invention.

In the present specification, numerical ranges represented by "to" include numerical values before and after "to" as lower limit values and upper limit values.

In the description of the present specification, the simple expression "acryl" or "(meth)acryl" refers to acryl and/or methacryl.

In the present specification, the expression of a compound (for example, in a case where a compound is represented by an expression with "compound" added to the end) refers to not only the compound itself but also a salt or an ion thereof. In addition, this expression also refers to a derivative obtained by modifying a part of the compound, for example, by introducing a substituent into the compound within a range where the desired effects do not deteriorate.

A substituent, a linking group, or the like (hereinafter, referred to as "substituent or the like") is not specified in the present specification regarding whether to be substituted or unsubstituted may have an appropriate substituent. Accordingly, even in a case where a YYY group is simply described in the present specification, this YYY group includes not only an aspect having a substituent but also an aspect not having a substituent. The same shall be applied to a compound which is not specified in the present specification regarding whether to be substituted or unsubstituted. Preferable examples of the substituent include a substituent T described below.

In the present specification, in a case where a plurality of substituents or the like represented by a specific reference numeral are present or a plurality of substituents or the like are simultaneously or alternatively defined, the respective substituents or the like may be the same as or different from each other. In addition, unless specified otherwise, in a case where a plurality of substituents or the like are adjacent to each other, the substituents may be linked or fused to each other to form a ring.

In the present invention, "Current collector (with an easily adhesive layer)" or "electrode" includes both an aspect where it is a constituent member of a secondary battery (an aspect it is incorporated into a secondary battery) and an aspect where it is a current collector material (with an easily adhesive layer) or an electrode material before being incorporated into a secondary battery as long as it includes the configuration defined by the present invention. Accordingly, regarding the configuration of "current collector (with an easily adhesive layer")" and "electrode", a configuration corresponding to the above-described aspects is applied without any particular limitation. For example, "current collector (with an easily adhesive layer")" and "electrode" may be sheet-shaped (film-shaped) or striped and may be long or short (sheet body). It is preferable that the current collector material (with an easily adhesive layer) or the electrode material has a long sheet shape.

[Current Collector with Easily Adhesive Layer]

A current collector with an easily adhesive layer according to an embodiment of the present invention is a current collector (a laminate including a current collector and an easily adhesive layer) including an easily adhesive layer that includes a polymer having a solubility (25° C.) of 1 g/100 g or higher in a solvent having a C log P value of 2.0 or higher.

In the present invention, the easily adhesive layer refers to a layer that is provided on a surface of the current collector where an electrode active material layer is to be laminated, and in a case where a film is formed on the current collector using an electrode active material, refers to a layer (adhesive layer) that has a function of strongly adhering (closely attaches) the current collector and the electrode active material to each other and suppressing peeling of the electrode active material layer from the current collector. An adhesion strength with which the easily adhesive layer adheres the current collector and the electrode active material to each other cannot be uniquely determined depending on the use of the current collector with an easily adhesive layer and is, for example, a strength of evaluation standard "C" or higher (a defect occurrence diameter is 16 mm or less) in "film hardness test" evaluated in Examples.

The current collector with an easily adhesive layer according to the embodiment of the present invention is used as a material for forming an electrode of a secondary battery such that a high adhesive strength to an electrode active material layer (also referred to as "active material layer") can be exhibited and high battery performance can be imparted to the secondary battery, the electrode active material layer being formed of an active material layer-forming composition including a solvent having a C log P value of 2.0 or higher. The details of the reason for this are not clear but considered to be as follows. That is, after forming the active material layer on the current collector with an easily adhesive layer according to the embodiment of the present invention (after the current collector with an easily adhesive layer according to the embodiment of the present invention is incorporated into an electrode), the polymer in the easily adhesive layer is temporarily dissolved in the above-described solvent in the active material layer-forming composition for forming the active material layer and is incorporated into the formed active material layer by diffusion, infiltration, or the like such that, in some cases, a mixed region with a component forming the active material layer is formed (the easily adhesive layer disappears without maintaining a configuration as a layer). As a result, strong adhesiveness between the current collector and the active material layer is exhibited. In addition, even in a case where the easily adhesive layer has insulating properties, the easily adhesive layer disappears such that the exposed surface of the current collector and the active material layer come into contact with each other to form a conduction path (insulation between the current collector and the active material layer is released). However, since the conduction path is not necessarily formed, the thickness of the formed easily adhesive layer can be reduced, which contributes to reduction in the thickness of the secondary battery.

This way, in the current collector with an easily adhesive layer according to the embodiment of the present invention, the polymer in the easily adhesive layer is incorporated into the active material layer and preferably causes the easily adhesive layer to disappear during the formation of the active material layer such that a high adhesive strength to the active material layer provided on the current collector can be exhibited and high battery performance can be imparted to secondary battery.

In the current collector with an easily adhesive layer according to the embodiment of the present invention, as described above, the easily adhesive layer that includes the polymer having a solubility (25° C.) of 1 g/100 g or higher in the solvent having a C log P value of 2.0 or higher exhibits solubility in the active material layer-forming composition including the solvent having a C log P value of 2.0 or higher such that the above-described function is exhibited. The current collector with an easily adhesive layer according to the embodiment of the present invention having the above-described function is used as a material for forming a constituent layer of a secondary battery, preferably, as a material for forming an electrode of an all-solid state secondary battery in combination with the active material layer-forming composition including the solvent having a C log P value of 2.0 or higher.

In the present invention, in a case where the current collector with an easily adhesive layer is used as a material for forming a positive electrode, the current collector with an easily adhesive layer will be referred to as "positive electrode current collector with an easily adhesive layer". In a case where the current collector with an easily adhesive layer is used as a material for forming a negative electrode, the current collector with an easily adhesive layer will be referred to as "negative electrode current collector with an easily adhesive layer".

In the present invention, the solubility of the polymer in the easily adhesive layer is a value in the solvent having a C log P value of 2.0 or higher and, as described below, is solubility in the solvent having a C log P value of 2.0 or higher among solvents used in the active material layer-forming composition forming the active material layer. This solvent is appropriately determined in combination with the polymer from the viewpoints of battery performance, manufacturing, and the like without being uniquely determined.

Although the details will be described below, examples of the solvent include toluene (C log P=2.52), diisobutyl ketone (DIBK, C log P=3.48), and butyl butyrate (C log P=2.27).

In a case where the solubility (25° C.) of the polymer is 1 g/100 g or higher in the solvent having a C log P value of 2.0 or higher, adhesiveness with the active material layer can be strengthened and a conduction path can be constructed. From the viewpoint that the strengthening of adhesiveness and the construction (battery performance) of a conduction path can be simultaneously achieved on a higher level with a good balance, the solubility is preferably 2 g/100 g or higher, more preferably 5 g/100 g or higher, and still more preferably 10 g/100 g or higher. The upper limit of the solubility is not particularly limited and, for example, can be set to be 100 g/100 g or lower and may be 50 g/100 g or lower in practice.

Here, the C log P value refers to a value obtained by calculating a common logarithm log P of a partition coefficient P between 1-octanol and water. As a method or software used for calculating the C Log P value, a well-known one can be used. In the present invention, unless specified otherwise, the C Log P value is a value calculated after drawing a structure using ChemBioDraw Ultra (version 13.0, manufactured by PerkinElmer Co., Ltd.).

In addition, the solubility of the polymer in the solvent having a C log P value of 2.0 or higher is a value measured with a method and conditions shown in Examples described below using the polymer and the solvent having a C log P value of 2.0 or higher collected from the easily adhesive layer.

The current collector with an easily adhesive layer according to the embodiment of the present invention may include another layer (film) as long as it includes the current collector and the easily adhesive layer. Examples of the other layers include a protective layer (release sheet) and a coating layer. Further, for example, a substrate that supports the current collector with an easily adhesive layer can be used.

A current collector with an easily adhesive layer 21 according to a preferred embodiment of the present invention is formed in a long sheet shape, and a cross-section perpendicular to a longitudinal direction thereof is shown in FIG. 1. The current collector with an easily adhesive layer 21 includes: a long current collector 22; and an easily adhesive layer 23 that is provided in contact with the entirety of one surface of the current collector 22.

In a case where the current collector with an easily adhesive layer according to the embodiment of the present invention is used as a secondary battery having a laminate structure in which a plurality of units each of which consists of a positive electrode, an electrolyte, and a negative electrode are laminated, it is preferable that the easily adhesive layer defined by the present invention is provided on both surfaces of the current collector.

The total thickness of the current collector with an easily adhesive layer according to the embodiment of the present invention is appropriately determined depending on battery performance and the like and is, for example, preferably 1 to 50 µm and more preferably 3 to 30 µm.

The current collector forming the current collector with an easily adhesive layer according to the embodiment of the present invention is not particularly limited as long as it is a current collector that is typically used for a secondary battery, and is preferably an electron conductor. As a material for forming the current collector, an appropriate material for the use of the current collector (a positive electrode current collector or a negative electrode current collector) is selected. For example, in a case where the current collector is used as a positive electrode current collector, not only aluminum, an aluminum alloy, stainless steel, nickel, or titanium but also a material (a material on which a thin film is formed) obtained by treating a surface of aluminum or stainless steel with carbon, nickel, titanium, or silver can be used as a material for forming the positive electrode current collector. Among these, aluminum or an aluminum alloy is preferable. On the other hand, in a case where the current collector is used as a negative electrode current collector, not only aluminum, copper, a copper alloy, stainless steel, nickel, or titanium but also a material obtained by treating a surface of aluminum, copper, a copper alloy, or stainless steel with carbon, nickel, titanium, or silver can be used as a material for forming the negative electrode current collector. Among these, copper, a copper alloy, or stainless steel is preferable.

Regarding the shape of the current collector, typically, current collectors having a film sheet-like shape are used, but it is also possible to use net-shaped collectors, punched collectors, compacts of lath bodies, porous bodies, foaming bodies, or fiber groups, and the like.

The thickness of the current collector is not particularly limited as long as the total thickness of the current collector with an easily adhesive layer is in the above-described range. For example, the thickness of the current collector is preferably 1 to 50 µm and more preferably 3 to 30 µm.

It is also preferable that the surface of the current collector is made to be uneven through a surface treatment.

The easily adhesive layer forming the current collector with an easily adhesive layer according to the embodiment of the present invention includes a specific polymer described below and typically has a layer shape or a film shape. This easily adhesive layer exhibits a function of strongly adhering the current collector and the active material layer to each other, and a part thereof may be maintained as a configuration of a layer even after the current collector and the active material layer are adhered to each other (after the current collector with an easily adhesive layer is incorporated into an electrode). That is, in the present invention, the easily adhesive layer includes not only an aspect the entirety disappears (the polymer is diffused to the active material layer) in the electrode but also an aspect a part disappears in the electrode. The degree of disappearance cannot be determined depending on battery performance or the like required for the electrode or the secondary battery, and can be appropriately determined such that a conduction path is constructed between the current collector and the active material layer. The amount of the easily adhesive layer disappeared can be appropriately adjusted depending on the kind of the polymer, the kind (C log P value) of the solvent, the coating state, and the like.

This easily adhesive layer may be provided on the entire surface of the current collector or may be provided on a part of the surface of the current collector. The proportion in which the easily adhesive layer is provided is set depending on a dissolution rate, a solubility, and the like with respect to the solvent in the active material layer-forming composition such that the easily adhesive layer exhibits the above-described function. In addition, the easily adhesive layer may have a single-layer structure or a multi-layer structure.

The easily adhesive layer may be conductive or can be made to have insulating properties for a reduction in thickness. The insulating properties of the easily adhesive layer can be specified by surface electrical resistance. For example, the surface electrical resistance can be set to be $10^4 \Omega/\square$ or higher. The surface electrical resistance of the easily adhesive layer is preferably $10^8 \Omega/\square$ or higher and more preferably $10^{12} \Omega/\square$ or higher. The surface electrical resistance of the easily adhesive layer is a value measured with a method and conditions shown in Examples described below.

The thickness of the easily adhesive layer is not particularly limited but is preferably 10 to 500 nm, more preferably 10 to 300 nm, still more preferably 30 to 300 nm, and still more preferably 50 to 200 nm from the viewpoint that higher battery performance can be imparted while maintaining high adhesiveness to the active material layer by rapid disappearance (dissolution of the polymer) during the formation of the active material layer. In a case where the thickness of the easily adhesive layer is in the above-described range, the total thickness of the secondary battery can be made small such that the energy density can be improved and the electrical resistance can be reduced. From this viewpoint, the above-described configuration is effective particularly in a case where a plurality of secondary batteries are laminated.

From the viewpoint that adhesiveness and battery performance can be simultaneously achieved on a higher level, the tensile elastic modulus of the easily adhesive layer is preferably 500 MPa or lower, more preferably 200 MPa or lower, and still more preferably 100 MPa or lower. The lower limit value of the tensile elastic modulus is not particularly limited and can be set to be, for example, 1 MPa. The tensile elastic modulus of the easily adhesive layer is a value measured with a method and conditions shown in Examples described below.

In the easily adhesive layer, it is preferable that the residual water content is small, for example, 100 ppm (by mass) or lower. The residual water content of the easily adhesive layer can be obtained by Karl Fischer titration after filtering the easily adhesive layer through a membrane filter having a pore size of 0.02 µm.

It is preferable that the easily adhesive layer includes $1 \times 10^5$ to $1 \times 10^{11}$ piece/m$^2$ protrusion portions (protrusions) on a surface. In a case where the current collector with an easily adhesive layer according to the embodiment of the present invention is typically wound around a roll or the like in case of being long or is laminated in case of being short for manufacturing, storage, transport, and the like. In this case, a surface of the current collector opposite to the easily adhesive layer may come into contact with an adjacent easily adhesive layer on the inside, the lower side, or the like such that the easily adhesive layer may peel off or fracture. However, in a case where the above-described number of protrusion portions (number of protrusions) are provided on the surface of the easily adhesive layer, the peel-off and fracture of the easily adhesive layer can be prevented. From the viewpoint of effectively preventing the peel-off and fracture of the easily adhesive layer, the number of protrusions is more preferably in a range of $1 \times 10^5$ to $1 \times 10^8$ piece/m$^2$. The number of protrusions is a value measured with a method and conditions shown in Examples described below.

The protrusion portions of the easily adhesive layer may be formed in a state where the easily adhesive layer includes particles described below or may be formed through a surface treatment such as a shot blast method.

The polymer in the easily adhesive layer is a polymer having a solubility (25° C.) of 1 g/100 g or higher in a solvent having a C log P value of 2.0 or higher. The solvent that determines the solubility of the polymer is as described above and can be set to, for example, toluene.

The polymer in the easily adhesive layer is not particularly limited as long as it satisfies the above-described solubility, and examples thereof include various polymers that are typically used for a secondary battery. The polymer includes a homopolymer and a copolymer, the copolymer includes an addition polymerization and a polycondensate, and the polymerization method is not particularly limited. The polymer may be a crosslinked polymer or a non-crosslinked polymer.

The above-described polymer is preferably an insulating organic polymer, and examples thereof the following respective resins and other resins.

Examples of a fluorine-containing resin include polytetrafluoroethylene (PTFE), polyvinylene difluoride (PVdF), and a copolymer (PVdF-HFP) of polyvinylene difluoride and hexafluoropropylene.

Examples of a hydrocarbon-based thermoplastic resin include polyethylene, polypropylene, styrene-butadiene rubber (SBR), hydrogenated styrene-butadiene rubber (HSBR), butylene rubber, acrylonitrile-butadiene rubber, polybutadiene, and polyisoprene.

Examples of a (meth)acrylic resin include a homopolymer or copolymers of various (meth)acrylic monomers, (meth)acrylamide monomers (preferably a copolymer of (meth)acrylic acid and methyl (meth)acrylate). In addition, copolymers of vinyl monomers are also be suitably used. Examples of the copolymers include a copolymer of methyl (meth)acrylate and styrene, a copolymer of methyl (meth)acrylate and acrylonitrile, and a copolymer of butyl (meth)acrylate, acrylonitrile, and styrene. In the present invention, the copolymer may be any one of a statistic copolymer or a periodic copolymer and is preferably a block copolymer.

Examples of other resins include a polyurethane resin, a polyurea resin, a polyamide resin, a polyimide resin, a polyester resin, a polyether resin, a polycarbonate resin, and a cellulose derivative resin.

In particular, a fluorine-containing resin, a hydrocarbon-based thermoplastic resin, a (meth)acrylic resin, a polyurethane resin, a polycarbonate resin, or a cellulose derivative resin is preferable.

As the polymer, one kind may be used alone, or two or more kinds may be used in combination.

The glass transition temperature of the polymer is not particularly limited and is preferably 30° C. or lower, more preferably 10° C. or lower, still more preferably 0° C. or lower, and still more preferably −10° C. or lower from the viewpoint that adhesiveness between the solid particles and adhesiveness between the solid particles and the current collector can be strengthened according to the surface shape of the solid particles and the like. The lower limit value of the glass transition temperature is not particularly limited and can be set to be, for example, −130° C. The glass transition temperature of the polymer is a value obtained using a measurement method described in Examples described below.

The mass average molecular weight of the polymer is not particularly limited and is appropriately determined.

The content of the polymer in the easily adhesive layer is appropriately determined in consideration of adhesiveness with the active material layer and battery performance, and can be set to be, for example, 100 mass % or lower. In a case where the easily adhesive layer includes additives and the like described below, the content of the polymer can be set to 50% to 99.9 mass % and may be 60% 99 mass %.

The easily adhesive layer may include various additives and the like in addition to the above-described polymer.

As the additives, components that are typically used for a constituent layer of a secondary battery can be used, and examples thereof include particles for forming the protrusion portions on the surface of the easily adhesive layer. The particles are preferably insulating particles, and examples thereof include particles of an inorganic filler and resin particles. The inorganic filler is not particularly limited, and examples thereof include silica, aluminum oxide, and titanium oxide. A resin forming the resin particles is not particularly limited, and examples thereof include various resins described above regarding the above-described polymer. The average particle size of the particles is not particularly limited and is preferably 0.02 to 5 μm to and more preferably 0.1 to 1 μm from the viewpoint that the above-described number of protrusion portions can be formed on the easily adhesive layer. The average particle size of the particles is a value (volume average particle size) obtained using a measurement method described in Examples described below. In the present invention, the easily adhesive layer may include conductive particles (for example, particles formed of a carbon material or metal particles described in JP2001-052710A, JP2013-533601A, and JP2011-501383A) within a content range where conductivity is not exhibited (a conduction path is not constructed).

The total content of the above-described additives in the easily adhesive layer is appropriately set and can be set to be, for example, 30 mass % or lower. In addition, the content of the above-described particles in the easily adhesive layer is set in a range where the above-described number of protrusion portions can be formed on the easily adhesive layer, and cannot be uniquely determined depending on the thickness of the easily adhesive layer and the like. For example, the content of the above-described particles can be set to be 2% to 30 mass %.

[Method of Manufacturing Current Collector with Easily Adhesive Layer]

A method of manufacturing the current collector with an easily adhesive layer according to the present invention is not particularly limited, and the current collector with an easily adhesive layer can be obtained by preparing an easily adhesive layer-forming composition including a polymer having a solubility of 1 g/100 g or higher at 25° C. in a solvent (for example, toluene) having a C log P value of 2.0 or higher and forming a film on at least one surface of the current collector using this easily adhesive layer-forming composition.

The easily adhesive layer-forming composition used in the method of manufacturing the current collector with an easily adhesive layer includes the polymer having the above-described specific solubility, preferably a solvent, and optionally other components (for example, additives). The polymer, the additives, and the like in the easily adhesive layer-forming composition are as described above. The content of each of the components in the easily adhesive layer-forming composition is the same as that in the above-described easily adhesive layer as the content with respect to 100 mass % of the solid content (solid component) of the easily adhesive layer-forming composition.

In the present invention, unless specified otherwise, the solid content refers to a component that neither volatilize nor evaporate and disappear in a case where the composition is dried at 170° C. for 6 hours in a nitrogen atmosphere at a pressure of 1 mmHg. Typically, the solid content refers to a component other than the solvent.

The solvent in the easily adhesive layer-forming composition is not particularly limited as long as it can dissolve or disperse the polymer, and well-known various solvents or water can be used. In particular, a solvent that dissolves the polymer or an aqueous solvent that disperses the polymer is preferable. Examples of the solvent that dissolves the polymer include a solvent (preferably an organic solvent) that is used for the active material layer-forming composition described below. On the other hand, examples of the aqueous solvent that disperses the polymer include water, a solvent that can be mixed with water, and a mixed solvent including the solvent (having high polarity) and water. Examples of the solvent (having high polarity) include an alcohol compound having 1 to 3 carbon atoms.

The content of the solvent in the easily adhesive layer-forming composition is not particularly limited and is, for example, preferably 20% to 99 mass %, more preferably 30% to 95 mass %, and still more preferably 40% to 90 mass %.

The easily adhesive layer-forming composition can be prepared by mixing the above-described respective components and the solvent using an ordinary method.

In the method of manufacturing the current collector with an easily adhesive layer according to the embodiment of the present invention, the above-described current collector is prepared, and a film is formed on the surface of the current collector using the easily adhesive layer-forming composition. The formation of the film is not particularly limited, and a method of applying the easily adhesive layer-forming composition including the solvent is preferable, and the easily adhesive layer-forming composition is typically dried after being applied. The method for applying the easily adhesive layer-forming composition is not particularly limited and can be appropriately selected. Examples thereof include coating (preferably wet-type coating), spray coating, spin coating, dip coating, slit coating, stripe coating, and bar coating.

Next, the applied easily adhesive layer-forming composition is dried. The drying temperature is not particularly limited, and the lower limit thereof is, for example, preferably 30° C. or higher, more preferably 60° C. or higher, and still more preferably 80° C. or higher. The upper limit is preferably 300° C. or lower, more preferably 250° C. or lower, and still more preferably 200° C. or lower. The drying temperature is not particularly limited and can be appropriately set.

This way, the current collector with an easily adhesive layer including the easily adhesive layer that is formed on at least one surface of the current collector can be prepared.

[Electrode (Electrode Sheet)]

An electrode (electrode sheet) according to the embodiment of the present invention includes an electrode active material layer that is formed on the surface of the current collector with an easily adhesive layer according to the embodiment of the present invention where the easily adhesive layer is provided. This electrode is prepared using the current collector with an easily adhesive layer according to the embodiment of the present invention, and is used as an electrode for a secondary battery while maintaining a high adhesive strength between the current collector and the active material layer. As a result, a high battery performance can be imparted to the secondary battery.

The electrode according to the embodiment of the present invention can be suitably used as an electrode of an all-solid state secondary battery including a solid electrolyte layer as an electrolyte, and can also be used as an electrode of a secondary battery including a liquid electrolyte (electrolytic solution) as an electrolyte.

For example, in a case where the electrode according to the embodiment of the present invention is manufactured to be long on a line (is wound during transport) and is used as an electrode of a wound secondary battery, high adhesiveness between solid particles and high adhesiveness between the current collector and the solid particles in the active material can be maintained. In a case where a secondary battery is manufactured using the electrode, excellent battery performance can be exhibited, and high productivity and yield (reproducibility) can be realized.

In the present invention, the formation of the active material layer on the surface where the easily adhesive layer is provided includes an aspect where the active material layer is formed in contact with the easily adhesive layer in the current collector with an easily adhesive layer (an aspect where the easily adhesive layer remains), an aspect where the active material layer is formed in contact with the current collector in the current collector with an easily adhesive layer (an aspect where the easily adhesive layer disappears), and an aspect where both of the aspects are mixed. In the vicinity of an interface between the active material layer and the current collector or the easily adhesive layer, as described above, the polymer in the easily adhesive layer is incorporated, and a mixed region (mixed layer) in which the components forming the polymer and the active material layer are mixed may be formed. The content of the incorporated polymer typically increases toward the current collector.

This way, the electrode according to the embodiment of the present invention is a laminate including the current collector with an easily adhesive layer and the active material layer, in which the easily adhesive layer may remain as a layer or disappear (by being incorporated into the active material layer). In the present invention, unless specified otherwise, even the active material layer into which the polymer in the easily adhesive layer is incorporated (the active material layer including the mixed region) will also be referred to as "active material layer". In an all-solid state secondary battery shown in FIG. 2, although the easily adhesive layer of the current collector with an easily adhesive layer is not shown, in a case where the easily adhesive layer remains, the easily adhesive layer remains in an interface between a negative electrode current collector 1 and a negative electrode active material layer 2 or in an interface between a positive electrode current collector 5 and a positive electrode active material layer 4.

The electrode according to the embodiment of the present invention may be configured as a positive electrode or as a negative electrode and is appropriately selected depending on the use and the like. Likewise, the active material layer may be a positive electrode active material layer or a negative electrode active material layer, and the current collector may be a positive electrode current collector or a negative electrode current collector.

In the present invention, either or both of the positive electrode active material layer and the negative electrode active material layer will also be simply referred to as "electrode active material layer". In addition, either or both of the positive electrode active material and the negative electrode active material will also be simply referred to as "active material" or "electrode active material". Likewise, either or both of the positive electrode and the negative electrode will also be referred to as "electrode". Either or both of the positive electrode current collector and the negative electrode current collector will also be simply referred to as "current collector".

The electrode may further include other layers described above regarding the current collector with an easily adhesive layer. In addition, in a case where the electrode according to the embodiment of the present invention is used as an electrode of an all-solid state secondary battery, the electrode according to the embodiment of the present invention can be used as a laminate in which a solid electrolyte layer is provided on the active material layer or a laminate in which another active material layer is further provided on the solid electrolyte layer.

The total thickness of the electrode according to the embodiment of the present invention is not particularly limited and is, for example, preferably 30 to 500 μm and more preferably 50 to 350 μm. In addition, the thickness of the active material layer in the electrode according to the embodiment of the present invention is not particularly limited, is appropriately set depending on the kind of the battery, the battery performance, and the like, and is, for example, preferably 10 to 450 μm and more preferably 20 to 300 μm. In a case where the electrode according to the embodiment of the present invention is used as an electrode of an all-solid state secondary battery, the thickness of each of the layers forming the electrode according to the embodiment of the present invention is the same as the thickness of each of layers described below regarding the all-solid state secondary battery.

The active material layer forming the electrode according to the embodiment of the present invention includes the electrode active material, preferably a conductive auxiliary agent and binder particles, and optionally a solid electrolyte, various additives, and the like.

<Active Material>

The active material is capable of intercalating and deintercalating ions of a metal belonging to Group 1 or Group 2 in the periodic table. Examples of the active material include a positive electrode active material and a negative electrode active material. The active material layer includes a positive electrode active material or a negative electrode active material depending on the use of the electrode according to the embodiment of the present invention. As the positive electrode active material, a transition metal oxide is preferable. As the negative electrode active material, a metal oxide or a metal such as Sn, Si, Al, or In capable of forming an alloy with lithium is preferable.

(Positive Electrode Active Material)

The positive electrode active material is preferably capable of reversibly intercalating and/or deintercalating lithium ions. The above-described material is not particularly limited as long as the material has the above-described characteristics and may be transition metal oxides, elements capable of being complexed with Li such as sulfur, or the like.

Among these, as the positive electrode active material, transition metal oxides are preferably used, and transition metal oxides having a transition metal element $M^a$ (one or more elements selected from Co, Ni, Fe, Mn, Cu, and V) are more preferable. In addition, an element $M^b$ (an element of Group 1 (Ia) of the metal periodic table other than lithium, an element of Group 2 (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. It is more preferable that the transition metal oxide is synthesized by mixing the above components such that a molar ratio $Li/M^a$ is 0.3 to 2.2.

Specific examples of the transition metal oxides include transition metal oxides having a layered rock salt structure (MA), transition metal oxides having a spinel-type structure (MB), lithium-containing transition metal phosphate compounds (MC), lithium-containing transition metal halogenated phosphate compounds (MD), and lithium-containing transition metal silicate compounds (ME).

Specific examples of the transition metal oxides having a layered rock salt structure (MA) include $LiCoO_2$ (lithium cobalt oxide [LCO]), $LiNi_2O_2$ (lithium nickel oxide) $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickel oxide).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphate compounds (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and monoclinic nasicon type vanadium phosphate salt such as $Li_3V_2(PO_4)_3$ (lithium vanadium phosphate).

Examples of the lithium-containing transition metal halogenated phosphate compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, and $Li_2CoSiO_4$.

In the present invention, the transition metal oxides having a layered rock salt structure (MA) is preferable, and LCO or NMC is more preferable.

The shape of the positive electrode active material is not particularly limited, but is preferably a particle shape. The volume average particle size (sphere-equivalent average particle size) of positive electrode active material particles is not particularly limited. For example, the volume average particle size can be set to 0.1 to 50 μm. In order to allow the positive electrode active material to have a predetermined particle size, an ordinary pulverizer or classifier may be used. Positive electrode active materials obtained using a calcination method may be used after being washed with water, an acidic aqueous solution, an alkaline aqueous solution, or an organic solvent. The volume average particle size (sphere-equivalent average particle size) of positive electrode active material particles can be measured using a laser diffraction/scattering particle size distribution analyzer LA-920 (trade name, manufactured by Horiba Ltd.).

As the positive electrode active material, one kind may be used alone, or two or more kinds may be used in combination.

In the case of forming a positive electrode active material layer, the mass (mg) of the positive electrode active material per unit area ($cm^2$) of the positive electrode active material layer (weight per unit area) is not particularly limited. The mass (mg) of the inorganic solid electrolyte can be appropriately determined depending on the designed battery capacity and may be, for example, 1 to 100 $mg/cm^2$.

The content of the positive electrode active material in the active material layer is not particularly limited, but is preferably 10% to 97 mass %, more preferably 30% to 95 mass %, still more preferably 40% to 93 mass %, and particularly preferably 50% to 90 mass %.

(Negative Electrode Active Material)

The negative electrode active material is preferably capable of reversibly intercalating and/or deintercalating lithium ions. The above-described material is not particularly limited as long as the material has the above-described characteristics, and examples thereof include carbonaceous materials, metal oxides such as tin oxide, silicon oxide, metal composite oxides, a lithium single body, lithium alloys such as lithium aluminum alloys, metals capable of forming alloys with lithium such as Sn, Si, Al, and In and the like. Among these, a carbonaceous material or a lithium composite oxide is preferably used from the viewpoint of reliability. In addition, the metal composite oxide is preferably capable of intercalating and deintercalating lithium. The material is not particularly limited, but preferably includes titanium and/or lithium as a component from the viewpoint of high current density charging-discharging characteristics.

The carbonaceous material which is used as the negative electrode active material is a material substantially containing carbon. Examples thereof include petroleum pitch, carbon black such as acetylene black (AB), graphite (natural graphite, artificial graphite such as vapor-grown graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, vitreous carbon fibers, and activated carbon fibers, mesophase microspheres, graphite whisker, and tabular graphite.

These carbonaceous materials can be classified into non-graphitizable carbonaceous materials and graphitizable carbonaceous materials based on the graphitization degree. In addition, it is preferable that the carbonaceous material has the lattice spacing, density, and crystallite size described in JP1987-022066A (JP-S62-022066A), JP1990-006856A (JP-H2-006856A), and JP1991-045473A (JP-H3-045473A). The carbonaceous material is not necessarily a single material and, for example, may be a mixture of natural graphite and artificial graphite described in JP1993-090844A (JP-H5-090844A) or graphite having a coating layer described in JP1994-004516A (JP-H6-004516A).

The metal oxides and the metal composite oxides being applied as the negative electrode active material are particularly preferably amorphous oxides, and furthermore, chalcogenides which are reaction products between a metal element and an element belonging to Group 16 in the periodic table are also preferably used. "Amorphous" described herein represents an oxide having a broad scattering band with a peak in a range of 200 to 400 in terms of 2θ in case of being measured by an X-ray diffraction method using CuKα rays, and the oxide may have a crystal diffraction line. The highest intensity in a crystal diffraction line observed in a range of 40° to 70° in terms of 2θ is preferably 100 times or less and more preferably 5 times or less relative to the intensity of a diffraction peak line in a broad scattering band observed in a range of 20 to 400 in terms of 2θ, and it is still more preferable that the oxide does not have a crystal diffraction line.

In a compound group consisting of the amorphous oxides and the chalcogenides, amorphous oxides of metalloid elements and chalcogenides are more preferred, and elements belonging to Groups 13 (IIIB) to 15 (VB) of the periodic table, oxides consisting of one element or a combination of two or more elements of Al, Ga, Si, Sn, Ge, Pb, Sb, and Bi, and chalcogenides are particularly preferable. Specific preferable examples of the amorphous oxides and the chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Sb_2O_5$, $Bi_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, these amorphous oxides may be composite oxides with lithium oxide, for example, $Li_2SnO_2$.

The negative electrode active material preferably contains a titanium atom. More specifically, $Li_4Ti_5O_{12}$ (lithium titanium oxide [LTO]) is preferred since the volume fluctuation during the intercalation and deintercalation of lithium ions is small, and thus the high-speed charging-discharging characteristics are excellent, and the deterioration of electrodes is suppressed. Therefore, it becomes possible to improve the service lives of lithium ion secondary batteries.

In the present invention, hard carbon or graphite is preferably used, and graphite is more preferably used. In the present invention, as the above-described carbonaceous material, one kind may be used alone, or two or more kinds may be used in combination.

In the present invention, a Si-based negative electrode is also preferably applied. Generally, a Si negative electrode is capable of intercalating a larger number of Li ions than a carbon negative electrode (graphite, acetylene black, or the like). That is, the amount of Li ions intercalated per unit weight increases. Therefore, it is possible to increase the battery capacity. As a result, there is an advantage that the battery driving duration can be extended.

The chemical formulae of the compounds obtained using a calcination method can be calculated using inductively coupled plasma (ICP) optical emission spectroscopy as a measurement method from the mass difference of powder before and after calcinating as a convenient method.

Preferable examples of the negative electrode active material which can be used in combination with the amorphous oxide as negative electrode active material containing Sn, Si, or Ge as a major component include carbon materials that can intercalate and/or deintercalate lithium ions or lithium metal; lithium; lithium alloys; and metals that can form an alloy with lithium.

The shape of the negative electrode active material is not particularly limited, but is preferably a particle shape. The average particle size of the negative electrode active material is preferably 0.1 to 60 µm. In order to obtain a predetermined particle size, an ordinary pulverizer or classifier is used. For example, a mortar, a ball mill, a sand mill, a vibration ball mill, a satellite ball mill, a planetary ball mill, a swirling air flow jet mill, or a sieve is preferably used. During the pulverization, wet pulverization of causing water or an organic solvent such as methanol to coexist with the negative electrode active material can be optionally performed. In order to obtain a desired particle size, it is preferable to perform classification. A classification method is not particularly limited, and a method using, for example, a sieve or an air classifier can be optionally used. The classification can be used using a dry method or a wet method. The average particle size of negative electrode active material particles can be measured using the same method as the method of measuring the volume average particle size of the positive electrode active material.

As the negative electrode active material, one kind may be used alone, or two or more kinds may be used in combination.

In the case of forming a negative electrode active material layer, the mass (mg) of the negative electrode active material per unit area (cm²) in the negative electrode active material layer (weight per unit area) is not particularly limited. The mass (mg) of the inorganic solid electrolyte can be appropriately determined depending on the designed battery capacity and may be, for example, 1 to 100 mg/cm².

The content of the negative electrode active material in the active material layer is not particularly limited and is preferably 10% to 90 mass %, more preferably 20% to 85 mass %, still more preferably 30% to 80 mass %, and still more preferably 40% to 75 mass %.

(Coating of Active Material)

The surfaces of the positive electrode active material and the negative electrode active material may be coated with a separate metal oxide. Examples of the surface coating agent include metal oxides and the like containing Ti, Nb, Ta, W, Zr, Al, Si, or Li. Specific examples thereof include titanium oxide spinel, tantalum-based oxides, niobium-based oxides, and lithium niobate-based compounds, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, and $B_2O_3$.

In addition, a surface treatment may be carried out on the surfaces of electrodes including the positive electrode active material or the negative electrode active material using sulfur, phosphorous, or the like.

Furthermore, the particle surfaces of the positive electrode active material or the negative electrode active material may be treated with an actinic ray or an active gas (plasma or the like) before or after the coating of the surfaces.

<Conductive Auxiliary Agent>

The active material layer may optionally include a conductive auxiliary agent used for improving, for example, the electron conductivity of the active material. As the conductive auxiliary agent, a general conductive auxiliary agent can be used. The conductive auxiliary agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene which are electron-conductive materials and also may be metal powder or a metal fiber of copper, nickel, or the like, and a conductive polymer such as polyaniline, polypyrrole, polythiophene, polyacetylene, or a polyphenylene derivative may also be used. In addition, among these, one kind may be used, or two or more kinds may be used.

The content of the conductive auxiliary agent in the active material layer is preferably 0% to 10 mass %.

In the present invention, in a case where the active material and the conductive auxiliary agent are used in combination, among the above-described conductive auxiliary agents, a conductive auxiliary agent that does not intercalate and deintercalate Li and does not function as an active material during charging and discharging of the battery is classified as the conductive auxiliary agent. Whether or not the conductive auxiliary agent functions as the active material during charging and discharging of the battery is not uniquely determined but is determined based on a combination of the conductive auxiliary agent with the active material.

<Binder>

It is preferable that the active material layer includes a binder. As a result, solid particles can be strongly adhered to each other. In addition, the solid particles and the current collector can also be strongly adhered to each other.

The binder used in the present invention is not particularly limited as long as it is typically used for an all-solid state secondary battery, and preferable examples thereof include a binder described in JP2015-088486A and a binder described in WO2017/131093A. In particular, in a case where the active material layer provided in the current collector with an easily adhesive layer according to the embodiment of the present invention includes the binder described below, the active material layer (the solid particles therein) and the current collector can be more strongly adhered to each other while maintaining strong adhesiveness (binding properties) between the solid particles (for example, particles of the inorganic solid electrolyte, the inorganic solid electrolyte and the active material, and particles of the active material).

The shape of the binder is not particularly limited as long as the above-described function can be exhibited. The shape of the binder is preferably a particle shape (the binder having a particle shape will also be referred to as "binder particles") and may be flat or unstructured but is preferably spherical or granular.

Hereinafter, as the binder that is preferably used in the present invention, binder particles A and binder particles B will be described in detail.

—Binder Particles A—

A component derived from a macromonomer A having a number-average molecular weight (Mn) of preferably 1000 or higher is incorporated into a polymer forming the binder particles A. In the polymer forming the binder particles A, a graft portion derived from the macromonomer A forms a side chain with respect to the main chain. The main chain is not particularly limited. The binder particles A exhibits high adhesiveness particularly to the positive electrode active material.

Monomer (a)

A component (for example, the main chain) other than the component derived from the macromonomer A in the polymer forming the binder particles A is not particularly limited, and a typical polymer component can be used. It is preferable that a monomer for introducing the component other than the component derived from the macromonomer A (hereinafter, this monomer will also be referred to as "monomer (a)") is a monomer having a polymerizable unsaturated bond. For example, various vinyl monomers and/or (meth) acrylic monomers can be used. In the present invention, in particular, a (meth)acrylic monomer is preferably used. It is more preferable that a monomer selected from a (meth) acrylic acid monomer, a (meth)acrylic acid ester monomer, or a (meth)acrylonitrile is used. The number of polymerizable groups in one molecule of the monomer is not particularly limited and is preferably 1 to 4.

It is preferable that the polymer forming the binder particles A has at least one functional group in the following group (a) of functional groups. This group of functional groups may be included in the main chain or in the side chain derived from the macromonomer A but is preferably included in the main chain. This way, the specific functional group is included in the main chain or the like such that an interaction with a hydrogen atom, an oxygen atom, or a sulfur atom that is presumed to be present on a surface of the inorganic solid electrolyte, the active material, or the current collector is strengthened, binding properties are improved, and an action of reducing an interface resistance can be expected.

Group (a) of Functional Groups a carbonyl group-containing group, an amino group, a sulfonate group, a phosphate group, a hydroxy group, an ether group, a cyano group, and a thiol (sulfanyl) group.

Examples of a carbonyl group-containing group include a carboxy group, a carbonyloxy group, an amido group, and a carbamoyl group, and the number of carbon atoms in the carboxy group-containing group is preferably 1 to 24, more preferably 1 to 12, and still more preferably 1 to 6. The carbonyloxy group is a group as a binding site between a carbonyl group or an oxy group and the polymer, and examples of a terminal group bonded to the carbonyl group or the oxy group include the substituent T described below.

The number of carbon atoms in the amino group is preferably 0 to 12, more preferably 0 to 6, and still more preferably 0 to 2.

The sulfonate group may be an ester or a salt thereof. In the case of an ester, the number of carbon atoms is preferably 1 to 24, more preferably 1 to 12, and still more preferably 1 to 6.

The phosphate group may be an ester or a salt thereof. In the case of an ester, the number of carbon atoms is preferably 1 to 24, more preferably 1 to 12, and still more preferably 1 to 6.

The ether group is not particularly limited as long as it is a group having an —O— bond, and examples of a terminal group bonded to —O— include the substituent T described below.

The above-described functional group may be present as a substituent or may be present as a linking group. For example, the amino group may be present as a divalent imino group or a trivalent nitrogen atom.

It is preferable that the vinyl monomer or the (meth) acrylic monomer forming the above-described polymer is represented by Formula (b-1).

(b-1)

In the formula, $R^1$ represents a hydrogen atom, a hydroxy group, a cyano group, a halogen atom, an alkyl group (having preferably 1 to 24 carbon atoms, more preferably 1 to 12 carbon atoms, and still more preferably 1 to 6 carbon atoms), an alkenyl group (having preferably 2 to 24 carbon atoms, more preferably 2 to 12 carbon atoms, and still more preferably 2 to 6 carbon atoms), an alkynyl group (having preferably 2 to 24 carbon atoms, more preferably 2 to 12 carbon atoms, and still more preferably 2 to 6 carbon atoms), or an aryl group (having preferably 6 to 22 carbon atoms and more preferably 6 to 14 carbon atoms). In particular, a hydrogen atom or an alkyl group is preferable, and a hydrogen atom or a methyl group is more preferable.

$R^2$ represents a hydrogen atom, an alkyl group (having preferably 1 to 24 carbon atoms, more preferably 1 to 12 carbon atoms, and still more preferably 1 to 6 carbon atoms), an alkenyl group (having preferably 2 to 12 carbon atoms and more preferably 2 to 6 carbon atoms), an aryl group (having preferably 6 to 22 carbon atoms and more preferably 6 to 14 carbon atoms), an aralkyl group (having preferably 7 to 23 carbon atoms and more preferably 7 to 15 carbon atoms), a cyano group, a carboxy group, a hydroxy group, a thiol group, a sulfonate group, a phosphate group, a phosphonate group, an aliphatic heterocyclic group having an oxygen atom (having preferably 2 to 12 carbon atoms and more preferably 2 to 6 carbon atoms), or an amino group ($NR^N{}_2$: $R^N$ represents preferably a hydrogen atom or an alkyl group having 1 to 3 carbon atoms according to the definition described below). In particular, for example, a methyl group, an ethyl group, a propyl group, a butyl group, a cyano group, an ethenyl group, a phenyl group, a carboxy group, a thiol group, or a sulfonate group is preferable.

$R^2$ may further have a substituent T described below. In particular, a carboxy group, a halogen atom (for example, a fluorine atom), a hydroxy group, an alkyl group, or the like may be substituted.

A carboxy group, a hydroxy group, a sulfonate group, a phosphate group, or a phosphonate group may be esterified through, for example, an alkyl group having 1 to 6 carbon atoms.

As the aliphatic heterocyclic group having an oxygen atom, for example, an epoxy group-containing group, an oxetane group-containing group, or a tetrahydrofuryl group-containing group is preferable.

$L^1$ represents any linking group, and examples thereof include examples of a linking group L described below. Specific examples of the linking group L include an alkylene group having 1 to 6 carbon atoms (having preferably 1 to 3 carbon atoms), an alkenylene group having 2 to 6 carbon atoms (having preferably 2 or 3 carbon atoms), an arylene group having 6 to 24 carbon atoms (having preferably 6 to 10 carbon atoms), an oxygen atom, a sulfur atom, an imino group ($NR^N$), a carbonyl group, a phosphate linking group (—O—P(OH)(O)—O—), a phosphonate linking group (—P(OH)(O)—O—), and a group relating to a combination thereof. The above-described linking group may have any substituent. The number of linking atoms and a preferable range of the number of linking atoms are as described below. Examples of the substituent include the substituent T. For example, an alkyl group or a halogen atom can be used.

n represents 0 or 1.

It is preferable that the (meth)acrylic monomer forming the above-described polymer is represented by any one of Formula (b-1) and Formulae (b-2) to (b-6).

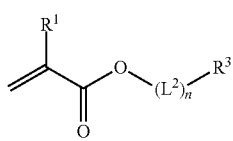
(b-2)

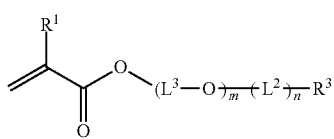
(b-3)

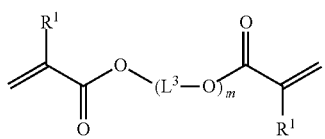
(b-4)

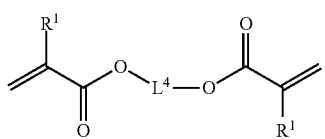
(b-5)

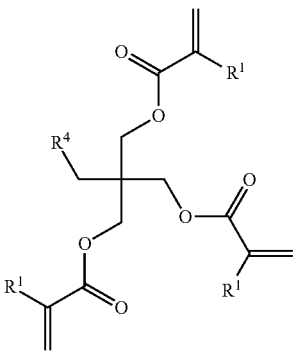
(b-6)

$R^1$ and n have the same definitions as those of Formula (b-1).

$R^3$ has the same definition as that of $R^2$. For example, a hydrogen atom, an alkyl group, an aryl group, a carboxy group, a thiol group, a phosphate group, a phosphonate group, an aliphatic heterocyclic group having an oxygen atom, or an amino group ($NR^N_2$) is preferable.

$L^2$ represents any linking group, examples of $L^1$ are preferable, and an oxygen atom, an alkylene group having 1 to 6 carbon atoms (having preferably 1 to 3 carbon atoms), an alkenylene group having 2 to 6 carbon atoms (having preferably 2 or 3 carbon atoms), a carbonyl group, an imino group ($NR^N$), or a group relating to a combination thereof is more preferable.

$L^3$ represents a linking group, examples of $L^2$ are preferable, and an alkylene group having 1 to 6 carbon atoms (having preferably 1 to 3 carbon atoms) is more preferable.

$L^4$ has the same definition as that of $L^1$.

$R^4$ represents a hydrogen atom, an alkyl group having 1 to 6 carbon atoms (having preferably 1 to 3 carbon atoms), a hydroxy group-containing group having 0 to 6 carbon atoms (having preferably 0 to 3 carbon atoms), a carboxy group-containing group having 0 to 6 carbon atoms (having preferably 0 to 3 carbon atoms), or a (meth)acryloyloxy group. $R^4$ may represent the linking group of $L^1$, in which a dimer may be formed.

m represents an integer of 1 to 200, preferably an integer of 1 to 100, and more preferably an integer of 1 to 50.

In Formulae (b-1) to (b-6), a group which may have a substituent such as an alkyl group, an aryl group, an alkylene group, or an arylene group may have any substituent as long as the effects of the present invention can be maintained. Examples of the substituent include the substituent T. Specifically, the group may have any substituent such as a halogen atom, a hydroxy group, a carboxy group, a thiol group, an acyl group, an acyloxy group, an alkoxy group, an aryloxy group, an aryloyl group, an aryloyloxy group, or an amino group.

Specific examples of the monomer (a) will be shown below but do not intend to limit the present invention. In the following formulae, 1 represents 1 to 1,000,000.

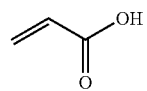
A-1

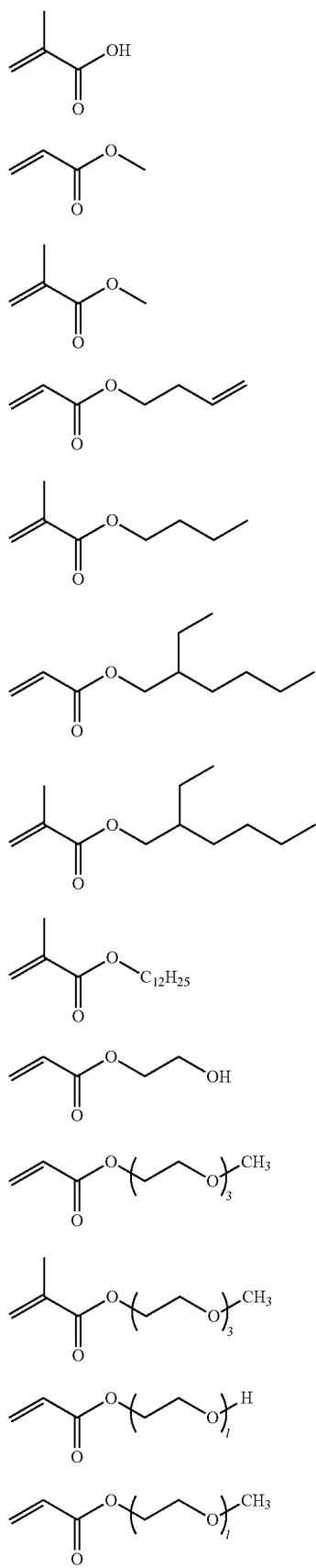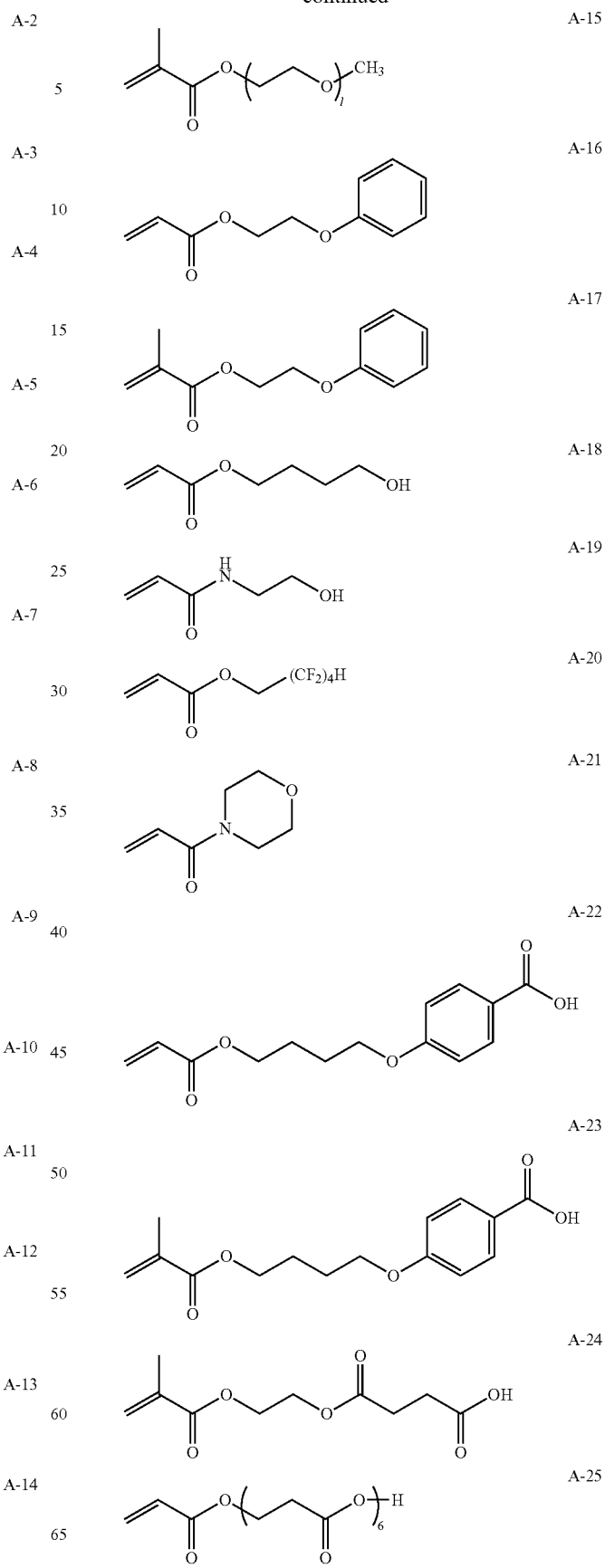

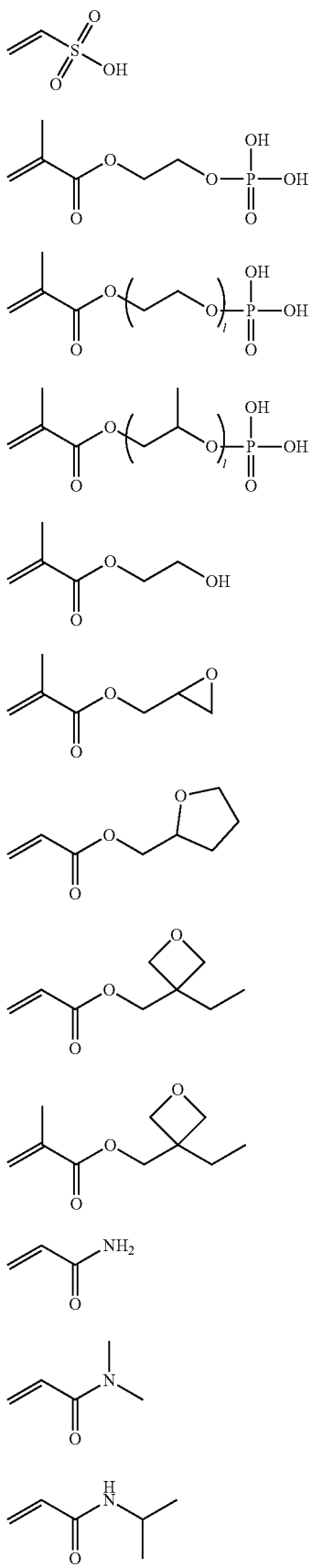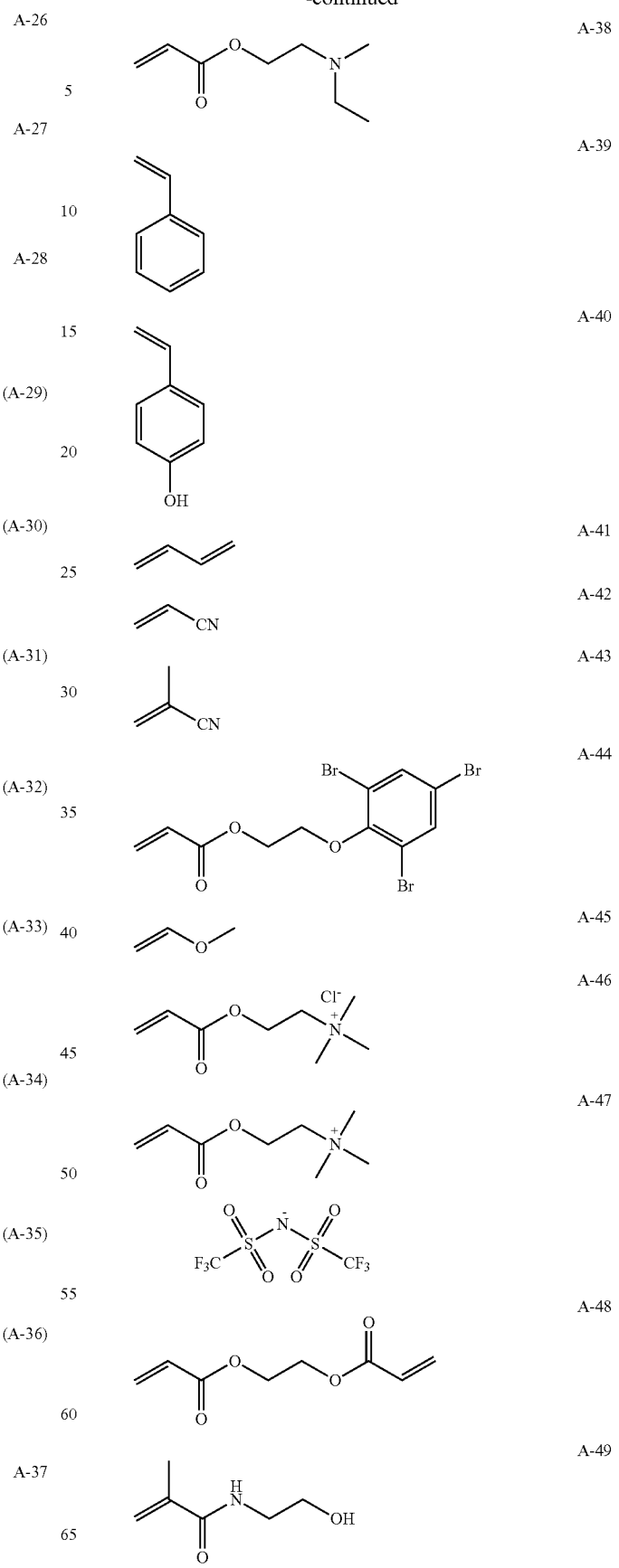

A-50
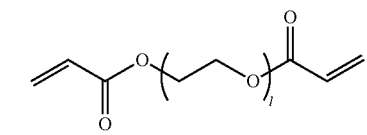
A-51
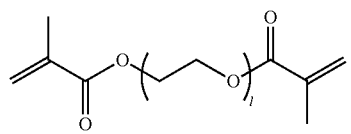
A-52
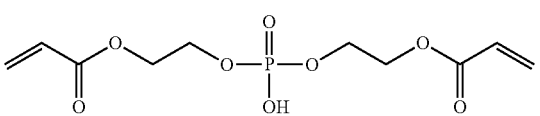
A-53
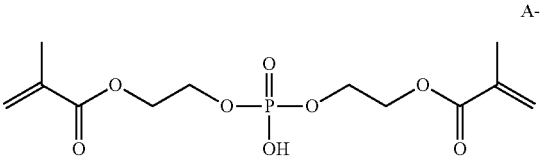
A-54
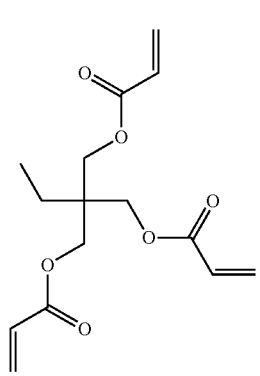
A-55
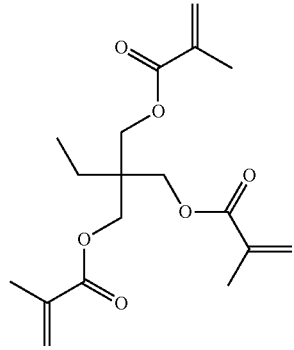
A-56
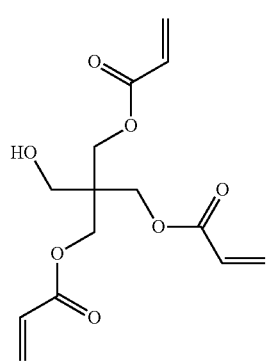
A-57
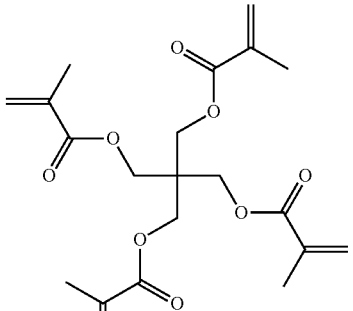
A-58
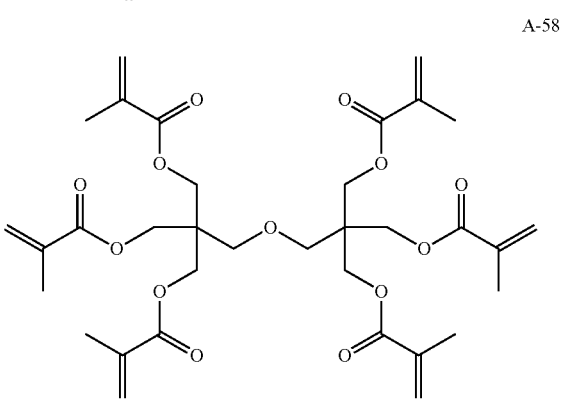
A-59
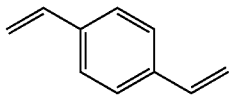
A-60
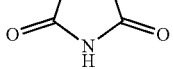
A-61
A-62
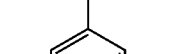
A-63
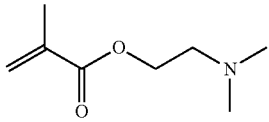
A-64
A-65

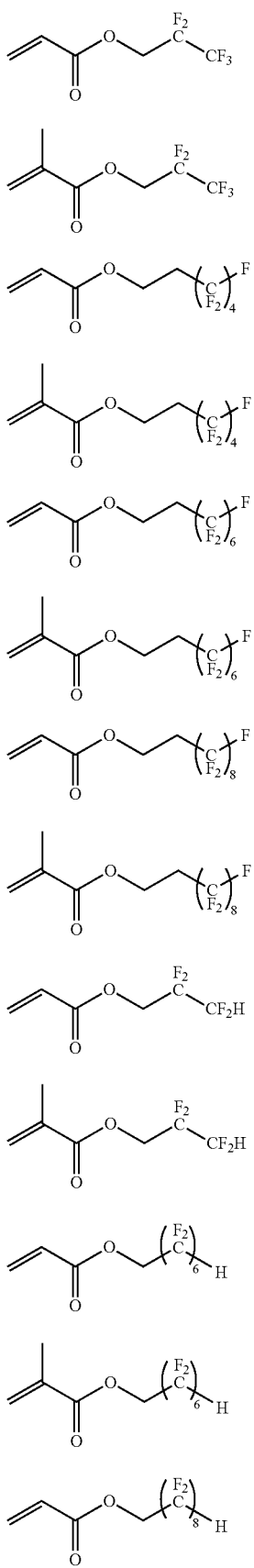
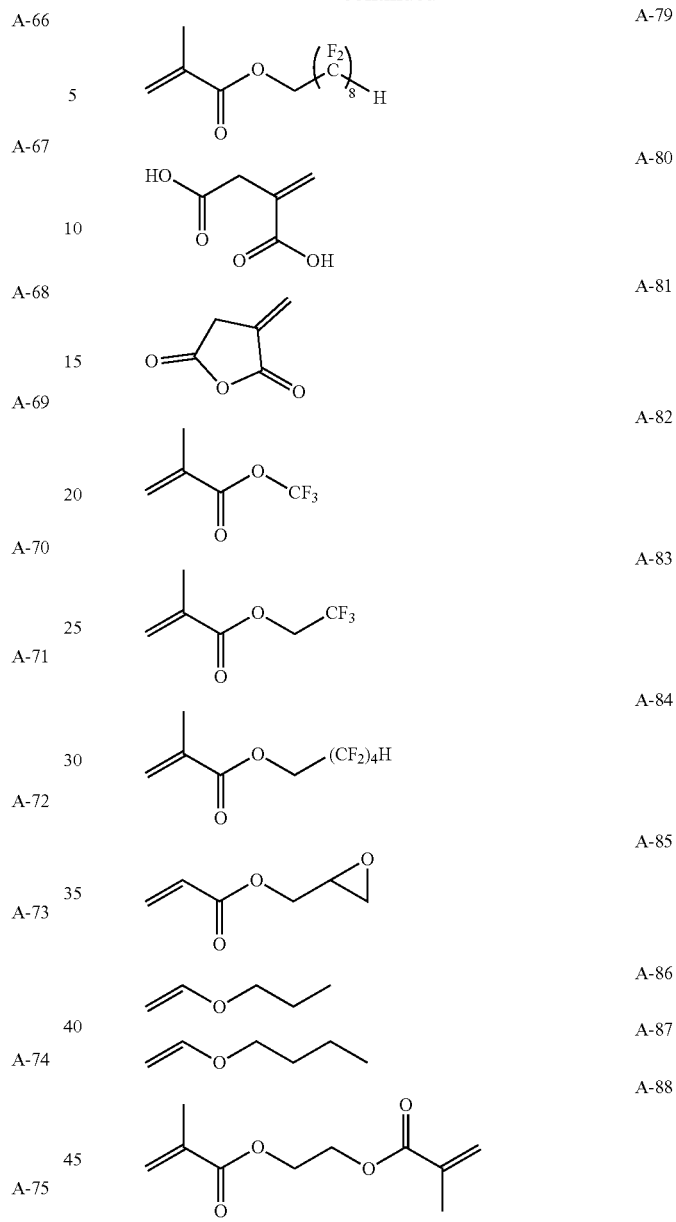

(Macromonomer A)

The number-average molecular weight of the macromonomer A is preferably 1,000 or higher, more preferably 2,000 or higher, and still more preferably 3,000 or higher. The upper limit is preferably 500,000 or lower, more preferably 100,000 or lower, and still more preferably 30,000 or lower. The polymer forming the above-described binder particles A includes the side chain derived from the macromonomer A having a molecular weight in the above-described range such that the polymer can be uniformly dispersed in an organic solvent (dispersion medium) more favorably and can be mixed with the solid electrolyte particles and the like for application.

It is presumed that the above-described side chain component in the polymer forming the binder particles A has an action of improving dispersibility in a solvent. As a result, the binder particles A are favorably dispersed and thus can cause the inorganic solid electrolyte to be bound to each other without locally or totally covering the solid particles such as the inorganic solid electrolyte. As a result, the solid particles can be adhered to each other without interrupting an electrical connection therebetween. Therefore, it is presumed that an increase in the interface resistance between the solid particles is suppressed. Further, the polymer forming the binder particles A includes the above-described side chain such that not only an effect of causing the binder particles A to be attached to the solid particles but also an effect of twisting the side chain can be expected. As a result, it is presumed that suppression in the interface resistance between the solid particles and improvement of binding properties are simultaneously achieved. Further since the polymer forming the binder particles A has high dispersibility, a step of transferring a layer in an organic solvent can be removed as compared to emulsion polymerization in water or the like, and a solvent having a low boiling point can also be used as a dispersion medium. The molecular weight of the component derived from the macromonomer A can be identified by measuring the molecular weight of a polymerizable compound (macromonomer A) incorporated during the synthesis of the polymer forming the binder particles A.

—Measurement of Molecular Weight—

In the present invention, unless specified otherwise, the molecular weights of the polymer forming the binder A and the macromonomer A refer to number-average molecular weights and are obtained by measuring the number-average molecular weights in terms of standard polystyrene by gel permeation chromatography (GPC). Regarding a measurement method, basically, a value measured using a method under the following condition 1 or condition 2 (preferred) is used. In this case, an appropriate eluent may be selected and used depending on the kind of the polymer.

(Condition 1)

Column: Two TOSOH TSKgel Super AWM-H's (trade name, manufactured by Tosoh Corporation) connected together Carrier: 10 mM LiBr/N-methylpyrrolidone Measurement temperature: 40° C.

Carrier flow rate: 1.0 ml/min

Sample concentration: 0.1 mass %

Detector: refractive index (RI) detector (Condition 2)

Column: A column obtained by connecting TOSOH TSKgel Super HZM-H, TOSOH TSKgel Super HZ4000, and TOSOH TSKgel Super HZ2000 (all of which are trade names, manufactured by Tosoh Corporation)

Carrier: tetrahydrofuran

Measurement temperature: 40° C.

Carrier flow rate: 1.0 ml/min

Sample concentration: 0.1 mass %

Detector: refractive index (RI) detector

The SP value of the macromonomer A is preferably 10 or lower and more preferably 9.5 or lower. The lower limit value is not particularly limited, but is practically 5 or more.

—Definition of SP Value—

Unless specified otherwise, the SP value in the present specification is obtained using a Hoy method (H. L. Hoy Journal of Painting, 1970, Vol. 42, 76-118). In addition, the unit of the SP value is not shown but is $cal^{1/2} \ cm^{-3/2}$. The SP value of the side chain component is not substantially different from the SP value of a raw material monomer forming the above-described side chain and may be evaluated using the SP value of the raw material monomer.

The SP value is an index indicating a property of being dispersed in an organic solvent. In addition, it is preferable that the side chain component has a specific molecular weight or higher to adjust the SP value to be the above-described SP value or higher because binding properties with the solid particles can be improved, affinity to a solvent can be improved, and thus the inorganic solid electrolyte can be stably dispersed.

The main chain of the above-described macromonomer A is not particularly limited, and a typical polymer component can be used. It is preferable that the macromonomer A has a polymerizable unsaturated bond. For example, the macromonomer A may have various vinyl groups or (meth)acryloyl groups. In the present invention, in particular, it is preferable that the macromonomer B has a (meth)acryloyl group.

In the present invention, in a broad sense, "acryl" or "acryloyl" refers to not only an acryloyl group but also a derivative structure thereof, that is, a structure which has a specific substituent at the α-position of the acryloyl group. In a narrow sense, a structure in which the α-position is a hydrogen atom may be referred to as "acryl" or "acryloyl". A structure which has a methyl group at the α-position may be referred to as "methacryl", and any one of acryl (the α-position is a hydrogen atom) or methacryl (the α-position is a methyl group) may be referred to as "(meth)acryl".

It is preferable that the above-described macromonomer A is a repeating unit derived from a monomer selected from a (meth)acrylic acid monomer, a (meth)acrylic acid ester monomer, or a (meth)acrylonitrile. In addition, it is preferable that the above-described macromonomer A includes a polymerizable double bond and a linear hydrocarbon structural unit S having 6 or more carbon atoms (preferably an alkylene group having 6 to 30 carbon atoms and more preferably an alkylene group having 8 to 24 carbon atoms). This way, the macromonomer A forming the side chain includes the linear hydrocarbon structural unit S such that an action of improving affinity to a dispersion medium and improving dispersion stability can be expected.

It is preferable that the above-described macromonomer A has a site represented by Formula (b-11).

$R^{11}$ has the same definition as $R^1$. * represents a binding site.

It is preferable that the above-described macromonomer A has a site represented by any one of Formulae (b-12a) to (b-12c). These sites will also be referred to as "specific polymerizable site".

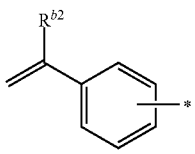

(b-12c)

$R^{b2}$ has the same definition as $R^1$. * represents a binding site. $R^N$ has the same definition described below regarding the substituent T. A benzene ring in Formula (b-12c) and (b-13c) and (b-14c) described below may be substituted with any substituent T.

A structural unit present before the binding site of * is not particularly limited as long as it satisfies a molecular weight as the macromonomer A, but is preferably a structural unit formed of a carbon atom, an oxygen atom, or a hydrogen atom. In this case, this structural unit may have the substituent T, for example, a halogen atom (fluorine atom).

It is preferable that the above-described macromonomer A is a compound represented by any one of Formulae (b-13a) to (b-13c) or a compound having a repeating unit represented by any one of Formulae (b-14a) to (b-14c).

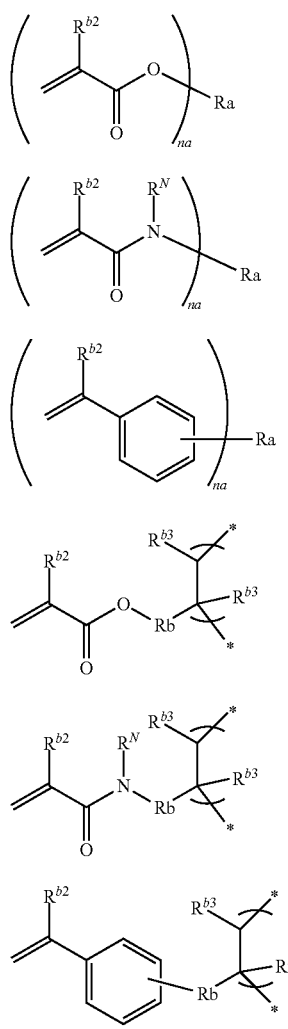

(b-13a)

(b-13b)

(b-13c)

(b-14a)

(b-14b)

(b-14c)

$R^{b2}$ and $R^{b3}$ have the same definition as that of $R^1$. $R^N$ has the same definition described below regarding the substituent T.

na is not particularly limited and is preferably an integer of 1 to 6 and more preferably 1 or 2.

In a case where na represents 1, Ra represents a substituent (preferably an organic group). In a case where na represents 2 or more, Ra represents a linking group.

Rb represents a divalent linking group.

In a case where Ra and Rb represent a linking group, examples of the linking group include the following linking group L. Specifically, it is preferable that the linking group is an alkane linking group having 1 to 30 carbon atoms (in the case of a divalent linking group, an alkylene group), a cycloalkane linking group having 3 to 12 carbon atoms (in the case of a divalent linking group, a cycloalkylene group), an aryl linking group having 6 to 24 carbon atoms (in the case of a divalent linking group, an arylene group), a heteroaryl linking group having 3 to 12 carbon atoms (in the case of a divalent linking group, a heteroarylene group), an ether group (—O—), a sulfide group (—S—), a phosphinidene group (—PR—: R represents a hydrogen atom or an alkyl group having 1 to 6 carbon atoms), a silylene group (—SiRR'—: R and R' represent a hydrogen atom or an alkyl group having 1 to 6 carbon atoms), a carbonyl group, an imino group ($NR^N$: $R^N$ represents preferably a hydrogen atom, an alkyl group having 1 to 6 carbon atoms, or an aryl group having 6 to 10 carbon atoms according to the definition described below), or a combination thereof. In particular, it is preferable that the linking group is an alkane linking group having 1 to 30 carbon atoms (in the case of a divalent linking group, an alkylene group), an aryl linking group having 6 to 24 carbon atoms (in the case of a divalent linking group, an arylene group), an ether group, a carbonyl group, or a combination thereof. In addition, in a case where Ra and Rb represent a linking group, the following linking group L may be adopted as the linking group.

It is preferable that the linking group represented by Ra and Rb is a linking structure formed of a carbon atom, an oxygen atom, or a hydrogen atom. Alternatively, it is preferable that the linking group represented by Ra and Rb is a structural unit including the following repeating unit (b-15). In a case where Ra and Rb represent a linking group, the number of atoms forming the linking group or the number of linking atoms has the same definition as that of the linking group L described below.

In a case where Ra represents a monovalent substituent, examples of the monovalent substituent include examples of the substituent T described below. In particular, an alkyl group, an alkenyl group, or an aryl group is preferable. In this case, in a case where the linking group L is interposed for substitution, the linking group L may be interposed in the substituent.

Alternatively, in a case where Ra represents a monovalent substituent, it is preferable that the linking group is a structure represented by -Rb-Rc or a structural unit including the following repeating unit (b-15). Here, Rc represents examples of the substituent T described below. In particular, an alkyl group, an alkenyl group, or an aryl group is preferable.

In this case, it is preferable that each of Ra and Rb includes at least a linear hydrocarbon structural unit having 1 to 30 carbon atoms (preferably an alkylene group), and it is more preferable that each of Ra and Rb includes the above-described linear hydrocarbon structural unit S. In addition, each of Ra to Rc may have a linking group or a substituent, and examples thereof include the linking group L or the substituent T described below.

It is preferable that the above-described macromonomer A further includes a repeating unit represented by Formula (b-15), and it is preferable that the repeating unit is bonded to the above-described polymerizable double bond (preferably a site represented by any one of Formulae (b-11) and (b-12a) to (b-12c)) through the linking group L described below.

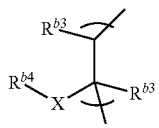
(b-15)

In the formula, $R^{b3}$ has the same as $R^{b3}$ described above. $R^{b4}$ represents a hydrogen atom or the substituent T described below. Among these, a hydrogen atom, an alkyl group, an alkenyl group, or an aryl group is preferable. In a case where $R^{b4}$ represents an alkyl group, an alkenyl group, or an aryl group, $R^4$ may further have the substituent T described below, for example, a halogen atom or a hydroxy group.

X represents a linking group, and examples thereof include examples of the linking group L. Among these, an ether group, a carbonyl group, an imino group, an alkylene group, an arylene group, or a combination thereof is preferable. Specific examples of the linking group relating to the combination include linking groups formed of a carbonyloxy group, an amido group, an oxygen atom, a carbon atom, and a hydrogen atom. In a case where $R^{b4}$ and X include a carbon atom, the preferable number of carbon atoms is the same as that of the substituent T described below and the linking group L. The preferable number of atoms forming the linking group or the preferable number of linking atoms is the same as that of the substituent T described below and the linking group L.

In addition, the macromonomer A may include the repeating unit having the above-described polymerizable group, a (meth)acrylate constitutional unit such as Formula (b-15), or an alkylene chain (for example, an ethylene chain) which may have a halogen atom (for example, a fluorine atom). In this case, an ether group (—O—) or the like may be interposed in the alkylene chain.

Examples of the substituent include a structure in which any substituent is positioned at a terminal of the above-described linking group. Examples of the terminal substituent include the substituent T described below. Among these, examples of $R^1$ are preferable.

Examples of the substituent T are as follows:
an alkyl group (preferably an alkyl group having 1 to 20 carbon atoms, for example, methyl, ethyl, isopropyl, t-butyl, pentyl, heptyl, 1-ethylheptyl, benzyl, 2-ethoxyethyl, or 1-carboxymethyl); an alkenyl group (preferably an alkenyl group having 2 to 20 carbon atoms, for example, vinyl, allyl, or oleyl); an alkynyl group (preferably an alkynyl group having 2 to 20 carbon atoms, for example, ethynyl, butadiynyl, or phenyl-ethynyl); a cycloalkyl group (preferably a cycloalkyl group having 3 to 20 carbon atoms, for example, cyclopropyl, cyclopentyl, cyclohexyl, or 4-methylcyclohexyl); an aryl group (preferably an aryl group having 6 to 26 carbon atoms, for example, phenyl, 1-naphthyl, 4-methoxyphenyl, 2-chlorophenyl, or 3-methylphenyl); a hetero- cyclic group (preferably a heterocyclic group having 2 to 20 carbon atoms and more preferably a 5- or 6-membered heterocyclic group having at least one oxygen atom, sulfur atom, or nitrogen atom; the heterocyclic group includes an aromatic heterocyclic group and an aliphatic heterocyclic group; for example, tetrahydropyran, tetrahydrofuran, 2-pyridyl, 4-pyridyl, 2-imidazolyl, 2-benzimidazolyl, 2-thiazolyl, or 2-oxazolyl); an alkoxy group (preferably an alkoxy group having 1 to 20 carbon atoms, for example, methoxy, ethoxy, isopropyloxy, or benzyloxy); an aryloxy group (preferably an aryloxy group having 6 to 26 carbon atoms, for example, phenoxy, 1-naphthyloxy, 3-methylphenoxy, or 4-methoxyphenoxy); a heterocyclic oxy group (a group in which an —O— group is bonded to the above-described heterocyclic group), an alkoxycarbonyl group (an alkoxycarbonyl group having 2 to 20 carbon atoms, for example, ethoxycarbonyl or 2-ethylhexyloxycarbonyl); an aryloxycarbonyl group (preferably an aryloxycarbonyl group having 6 to 26 carbon atoms, for example, phenoxycarbonyl, 1-naphthyloxycarbonyl, 3-methylphenoxycarbonyl, or 4-methoxyphenoxycarbonyl); an amino group (preferably an amino group having 0 to 20 carbon atoms, an alkylamino group, or an arylamino group, for example, amino, N,N-dimethylamino, N,N-diethylamino, N-ethylamino, or anilino); a sulfamoyl group (preferably a sulfamoyl group having 0 to 20 carbon atoms, for example, N,N-dimethylsulfamoyl or N-phenylsufamoyl); an acyl group (an alkylcarbonyl group, an alkenylcarbonyl group, an alkynylcarbonyl group, an arylcarbonyl group, or a heterocyclic carbonyl group, preferably an acyl group having 1 to 20 carbon atoms, for example, acetyl, propionyl, butyryl, octanoyl, hexadecanoyl, acryloyl, methacryloyl, crotonoyl, benzoyl, naphthoyl, or nicotinoyl); an acyloxy group (an alkylcarbonyloxy group, an alkenylcarbonyloxy group, an alkynylcarbonyloxy group, an arylcarbonyloxy group, or a heterocyclic carbonyloxy group, preferably an acyloxy group having 1 to 20 carbon atoms, for example, acetyloxy, propionyloxy, butyryloxy, octanoyloxy, hexadecanoyloxy, acryloyloxy, methacryloyloxy, crotonoyloxy, benzoyloxy, naphthoyloxy, or nicotinoyloxy); an aryloyloxy group (preferably an aryloyloxy group having 7 to 23 carbon atoms, for example, benzoyloxy); a carbamoyl group (preferably a carbamoyl group having 1 to 20 carbon atoms, for example, N,N-dimethylcarbamoyl or N-phenylcarbamoyl); an acylamino group (preferably an acylamino group having 1 to 20 carbon atoms, for example, acetylamino or benzoylamino); an alkylthio group (preferably an alkylthio group having 1 to 20 carbon atoms, for example, methylthio, ethylthio, isopropylthio, or benzylthio); an arylthio group (preferably an arylthio group having 6 to 26 carbon atoms, for example, phenylthio, 1-naphthylthio, 3-methylphenylthio, or 4-methoxyphenylthio); a heterocyclic thio group (a group in which an —S— group is bonded to the above-described heterocyclic group), an alkylsulfonyl group (preferably an alkylsulfonyl group having 1 to 20 carbon atoms, for example, methylsulfonyl or ethylsulfonyl), an arylsulfonyl group (preferably an arylsulfonyl group having 6 to 22 carbon atoms, for example, benzenesulfonyl), an alkylsilyl group (preferably an alkylsilyl group having 1 to 20 carbon atoms, for example, monomethylsilyl, dimethylsilyl, trimethylsilyl, or triethylsilyl); an arylsilyl group (preferably an arylsilyl group having 6 to 42 carbon atoms, for example, triphenylsilyl), a phosphoryl group (preferably a phosphate group having 0 to 20 carbon atoms, for example, —OP(=O)(R$^P$)$_2$), a phosphonyl group (preferably a phosphonyl group having 0 to 20 carbon atoms, for example, —P(=O)(R$^P$)$_2$), a phosphinyl group (preferably a phosphinyl group having 0 to 20 carbon atoms, for example, —P(R$^P$)$_2$), a sulfo group (sulfonate group), a hydroxy group, a sulfanyl group, a cyano group, and a halogen atom (for example, a fluorine atom, a chlorine atom, a bromine atom, or an iodine atom).

In addition, each exemplary group of the substituent T may be further substituted with the substituent T.

In a case where a compound or a substituent, a linking group, or the like includes, for example, an alkyl group, an alkylene group, an alkenyl group, an alkenylene group, an alkynyl group, and/or an alkynylene group, these groups may be cyclic or chained, may be linear or branched, and may be substituted or unsubstituted as described above.

In a case where each of the substituents defined in the present specification is substituted in a state where the linking group L described below is interposed in a range where the effects of the present invention are exhibited, the linking group L may be interposed in the structure. For example, the following heterocyclic linking group may be further interposed in the structure of an alkyl group, an alkylene group, an alkenyl group, an alkenylene group, or the like.

As the linking group L, a hydrocarbon linking group [an alkylene group having 1 to 10 carbon atoms (more preferably 1 to 6 carbon atoms and still more preferably 1 to 3 carbon atoms), an alkenylene group having 2 to 10 carbon atoms (more preferably 2 to 6 carbon atoms still more preferably 2 to 4 carbon atoms), an alkynylene group having 2 to 10 carbon atoms (more preferably 2 to 6 carbon atoms still more preferably 2 to 4 carbon atoms), or an arylene group having 6 to 22 carbon atoms (more preferably 6 to 10 carbon atoms)], a heterocyclic linking group [a carbonyl group (—CO—), a thiocarbonyl group (—CS—), an ether group (—O—), a thioether group (—S—), an imino group (—NR$^N$—), an imine linking group (R$^N$—N=C<, —N=C (R$^N$)—), a sulfonyl group (—SO$_2$—), a sulfinyl group (—SO—), a phosphate linking group (—O—P(OH)(O)—O—), a phosphonate linking group (—P(OH)(O)—O—), or a divalent heterocyclic group], or a linking group including a combination thereof is preferable. In a case where a ring is formed by condensation, the above-described hydrocarbon linking group may be linked by appropriately forming a double bond or a triple bond. As the formed ring, a 5-membered ring or a 6-membered ring is preferable. As the 5-membered ring, a nitrogen-containing 5-membered ring is preferable, and examples of a compound forming the ring include pyrrole, imidazole, pyrazole, indazole, indole, benzoimidazole, pyrrolidine, imidazolidine, pyrazolidine, indoline, carbazole, and a derivative thereof. Examples of the 6-membered ring include piperidine, morpholine, piperazine, a derivative thereof. In addition, in a case where a compound or a substituent, a linking group, or the like contains, for example, an aryl group or a heterocyclic group, these groups may have a monocyclic or fused ring and may be substituted or unsubstituted as described above.

R$^N$ represents a hydrogen atom or a substituent, and the substituent has the same definition as that of the substituent T. As the substituent, an alkyl group (having preferably 1 to 24 carbon atoms, more preferably 1 to 12 carbon atoms, still more preferably 1 to 6 carbon atoms, and still more preferably 1 to 3 carbon atoms), an alkenyl group (having preferably 2 to 24 carbon atoms, more preferably 2 to 12 carbon atoms, still more preferably 2 to 6 carbon atoms, and still more preferably 2 or 3 carbon atoms), an alkynyl group (having preferably 2 to 24 carbon atoms, more preferably 2 to 12 carbon atoms, still more preferably 2 to 6 carbon atoms, and still more preferably 2 or 3 carbon atoms), an aralkyl group (having preferably 7 to 22 carbon atoms, more preferably 7 to 14 carbon atoms, and still more preferably 7 to 10 carbon atoms), or an aryl group (having preferably 6 to 22 carbon atoms, more preferably 6 to 14 carbon atoms, and still more preferably 6 to 10 carbon atoms) is preferable.

R$^P$ represents a hydrogen atom, a hydroxy group, or a substituent. As the substituent, an alkyl group (having preferably 1 to 24 carbon atoms, more preferably 1 to 12 carbon atoms, still more preferably 1 to 6 carbon atoms, and still more preferably 1 to 3 carbon atoms), an alkenyl group (having preferably 2 to 24 carbon atoms, more preferably 2 to 12 carbon atoms, still more preferably 2 to 6 carbon atoms, and still more preferably 2 or 3 carbon atoms), an alkynyl group (having preferably 2 to 24 carbon atoms, more preferably 2 to 12 carbon atoms, still more preferably 2 to 6 carbon atoms, and still more preferably 2 or 3 carbon atoms), an aralkyl group (having preferably 7 to 22 carbon atoms, more preferably 7 to 14 carbon atoms, and still more preferably 7 to 10 carbon atoms), an aryl group (having preferably 6 to 22 carbon atoms, more preferably 6 to 14 carbon atoms, and still more preferably 6 to 10 carbon atoms), or an alkoxy group (having preferably 1 to 24 carbon atoms, more preferably 1 to 12 carbon atoms, still more preferably 1 to 6 carbon atoms, and still more preferably 1 to 3 carbon atoms), an alkenyloxy group (having preferably 2 to 24 carbon atoms, more preferably 2 to 12 carbon atoms, still more preferably 2 to 6 carbon atoms, and still more preferably 2 or 3 carbon atoms), an alkynyloxy group (having preferably 2 to 24 carbon atoms, more preferably 2 to 12 carbon atoms, still more preferably 2 to 6 carbon atoms, and still more preferably 2 or 3 carbon atoms), an aralkyloxy group (having preferably 7 to 22 carbon atoms, more preferably 7 to 14 carbon atoms, and still more preferably 7 to 10 carbon atoms), an aryloxy group (having preferably 6 to 22 carbon atoms, more preferably 6 to 14 carbon atoms, and still more preferably 6 to 10 carbon atoms) is preferable.

In the present specification, the number of atoms forming the linking group is preferably 1 to 36, more preferably 1 to 24, still more preferably 1 to 12, and still more preferably 1 to 6. The number of linking atoms in the linking group is preferably 10 or less and more preferably 8 or less. The lower limit is 1 or more. The number of linking atoms refers to the minimum number of atoms that is positioned on a path connecting predetermined structural units and relates to linking. For example, in the case of —CH$_2$—C(=O)—O—, the number of atoms forming the linking group is 6, but the number of linking atoms is 3.

Specific examples of the combination of linking groups include the following examples. An oxycarbonyl group (—OCO—), a carbonate group (—OCOO—), an amido group (—CONH—), a urethane group (—NHCOO—), a urea group (—NHCONH—), a (poly)alkyleneoxy group (—(Lr—O)x-), a (poly)alkyleneoxycarbonyl group (—(Lr—O)x-CO—), a carbonyl(poly)oxyalkylene group (—CO—(O—Lr)x-), a carbonyl(poly)alkyleneoxy group (—CO—(Lr—O)x-), a carbonyloxy(poly)alkyleneoxy group (—COO—(Lr—O)x-), a (poly)alkyleneimino group (—(Lr—NR$^N$)x-), an alkylene(poly)iminoalkylene group (—Lr—(NR$^N$—Lr)x-), a carbonyl(poly)iminoalkylene group (—CO—(NR$^N$—Lr)x-), a carbonyl(poly)alkyleneimino group (—CO—(Lr—NR$^N$)x-), a (poly)ester group (—(CO—O—Lr)x-), —(O—CO—Lr)x-, —(O—Lr—CO)x-, —(Lr—CO—O)x-, —(Lr—O—CO)x-), a (poly)amide group (—(CO—NR$^N$—Lr)x-, —(NR$^N$—CO—Lr)x-, —(NR$^N$—Lr—CO)x-, —(Lr—CO—NR$^N$)x-, and —(Lr—NR$^N$—CO)x-). x represents an integer of 1 or more, preferably 1 to 500, and more preferably 1 to 100. R$^N$ has the same definition described below regarding the above-described substituent T.

It is preferable that Lr represents an alkylene group, an alkenylene group, or an alkynylene group. The number of carbon atoms in Lr is preferably 1 to 12, more preferably 1 to 6, and still more preferably 1 to 3. A plurality of Lr's, a plurality of R$^N$'s, a plurality of R$^P$'s, a plurality of x's, or the like are not necessarily the same. The direction of the linking group is not limited to that described above and may be appropriately adjusted according to a predetermined chemical formula.

As the above-described macromonomer A, a macromonomer having an ethylenically unsaturated bond at a terminal may be used. Here, the macromonomer A consists of a polymer chain portion and a polymerizable functional group portion having an ethylenically unsaturated double bond at a terminal.

A copolymerization ratio of the component derived from the macromonomer A is not particularly limited but is preferably 1 mass % or higher, more preferably 3 mass % or higher, and still more preferably 5 mass % or higher with respect to the polymer forming the binder particles A. The upper limit of the concentration is preferably 50 mass % or lower, more preferably 30 mass % or lower, and still more preferably 20 mass % or lower.

—Specification of Binder Particles a or the Like

The number-average molecular weight of the polymer forming the binder particles A is preferably 5,000 or more, more preferably 10,000 or higher, and still more preferably 30,000 or higher. The upper limit is preferably 1,000,000 or lower and more preferably 200,000 or lower.

The average particle size of the binder particles A is preferably 1,000 nm or less, more preferably 750 nm or less, still more preferably 500 nm or less, still more preferably 300 n or less, and still more preferably 200 nm or less. The lower limit value is preferably 10 nm or more, more preferably 20 nm or more, still more preferably 30 nm or more, and still more preferably 50 nm or more. Unless specified otherwise, the average particle size of the binder particles A according to the embodiment of the present invention is a value obtained with a measurement method described below in Examples.

It is preferable that the particle size of the above-described binder particles A is less than the average particle size of the inorganic solid electrolyte.

By adjusting the particle size of binder particles A to be in the above-described range, excellent adhesiveness and suppression of an interface resistance can be realized.

It is preferable that the polymer forming the binder particles A according to the embodiment of the present invention is amorphous. In the present invention, the polymer "being amorphous" typically refers to a polymer that shows no endothermic peak caused by crystal melting during measurement using a measurement method of a glass transition temperature described in paragraph "0143" of JP2015-088486A. The Tg of the above-described polymer is preferably 50° C. or lower, more preferably 30° C. or lower, still more preferably 20° C. or lower, and still more preferably 0° C. or lower. The lower limit value s preferably −80° C. or higher, more preferably −70° C. or higher, and still more preferably −60° C. or higher. Unless specified otherwise, the glass transition temperature of the polymer forming the binder particles A according to the embodiment of the present invention is a value obtained using the above-described measurement method.

In the prepared all-solid state secondary battery, the glass transition temperature can be measured, for example, by disassembling the battery to peel off an electrode, putting the electrode into water to disperse a material thereof, filtering the dispersion liquid, collecting the remaining solid, and measuring the glass transition temperature of the solid using the above-described Tg measurement method.

The binder particles A may consist of the polymer forming the binder particles, or may be formed in a form including another material (for example, a polymer, a low molecular weight compound, or an inorganic compound). It is preferable that the binder particles consist of only the forming polymer.

—Binder Particles B—

The binder particles B includes a component derived from a macromonomer B having a mass average molecular weight (Mw) of preferably 1,000 or higher and lower than 1,000,000 and a ring structure of two or more rings. The binder particles B exhibits high adhesiveness particularly to the negative electrode active material.

It is preferable that the polymer forming the binder particles B is polyamide, polyimide, polyurea, polyurethane, or a (meth)acrylic resin.

Monomer Used for Synthesis of Binder Particles B

A monomer other than the macromonomer B used for the synthesis of the binder particles B is not particularly limited. It is preferable that the monomer is a monomer having a polymerizable unsaturated bond. For example, various vinyl monomers and/or (meth)acrylic monomers can be used. Specifically, the monomer (a) described in the above-described binder particles A can be adopted.

Examples of the monomer used as the synthetic raw material of the polymer forming the binder particles B include the exemplary compounds represented by "A-numeral". However, the present invention is not interpreted to be limited to this configuration.

(Component Derived from Macromonomer B)

The component derived from the macromonomer B having a mass average molecular weight of preferably 1000 or higher is incorporated into the polymer forming the binder particles B used in the present invention. In the polymer forming the above-described binder particles B, the component derived from the macromonomer B forms a side chain with respect to the main chain.

The mass average molecular weight of the macromonomer B is more preferably 2,000 or higher and still more preferably 3,000 or higher. The upper limit is preferably lower than 1,000,000, more preferably 500,000 or lower, still more preferably 100,000 or lower, and still more preferably 30,000 or lower. The polymer forming the above-described binder particles B includes the side chain having a molecular weight in the above-described range such that the polymer can be uniformly dispersed in an organic solvent more favorably and can be mixed with the solid electrolyte particles for application.

The mass average molecular weight of the macromonomer B can be measured using the same method as the method of measuring the number-average molecular weight of the macromonomer A.

The binder particles B including the component derived from the macromonomer B exhibits the same action as that of the binder particles A.

The SP value of the macromonomer B is preferably 10 or lower and more preferably 9.5 or lower. The lower limit value is not particularly limited, but is practically 5 or more.

In the polymer forming the binder particles B, in a case where the graft portion derived from the above-described macromonomer B is the side chain and the other portion is the main chain, this main chain structure is not particularly limited. It is preferable that the macromonomer B has a polymerizable unsaturated bond. For example, the macromonomer B may have various vinyl groups or (meth)acryloyl groups. In the present invention, in particular, it is preferable that the macromonomer B has a (meth)acryloyl group.

It is preferable that the component derived from the above-described macromonomer B includes a component (repeating unit) selected from a (meth)acrylic acid component, a (meth)acrylic acid ester component, or a (meth) acrylonitrile component in the graft chain. In addition, it is preferable that the above-described macromonomer B includes a polymerizable double bond and a linear hydrocarbon structural unit S having 6 or more carbon atoms (preferably an alkylene group having 6 to 30 carbon atoms and more preferably an alkylene group having 8 to 24 carbon atoms; a part of methylene forming these alkylene groups may have a substituent, and a part of methylene forming these alkylene groups may be replaced with another structure (for example, an oxygen atom, a sulfur atom, an imino group, or a carbonyl group). This way, the macromonomer B includes the linear hydrocarbon structural unit S such that an action of improving affinity to a solvent and improving dispersion stability can be expected.

It is preferable that the above-described macromonomer B has a site represented by Formula (b-1).

As the macromonomer B, a polyurea or a polyurethane including a structural portion (solvated portion) that is solvated with a hydrocarbon solvent and a structural portion (non-solvated portion) that is not solvated with a hydrocarbon solvent is also preferable. As the polyurea or the polyurethane, particles which have a long-chain alkyl group having 6 or more carbon atoms are preferable. The particles can be obtained, for example, by causing a diol compound (a so-called lipophilic diol) that includes a long-chain alkyl group having 6 or more carbon atoms, an isocyanate compound, and a polyamine (in the case of a polyurethane, polyol) compound to react with each other in a non-aqueous medium. That is, particles can be imparted to the structural portion that is solvated with a hydrocarbon solvent, for example, a long-chain alkyl group having 6 or more carbon atoms. Instead of the lipophilic diol and the isocyanate compound, a terminal NCO prepolymer consisting of these compounds may be provided for the reaction.

The lipophilic diol is a polyol having two or less functional groups, in which the molecular weight is preferably 700 or higher and lower than 5000. However, the lipophilic diol is not limited to this configuration. Specific examples of the lipophilic diol include a diol obtained by introducing about 2 or less hydroxyl groups into a fat and oil using a method of converting various fats and oils into alcoholysis products using a lower alcohol and/or a glycol, a method of partially saponifying a fat and oil, a method of esterifying a hydroxy group-containing aliphatic acid using a glycol, or the like, and a fat and oil-modified polyol, a terminal alcohol-modified (meth)acrylic resin, and a terminal alcohol-modified polyester described in J. H. SAUNDERS, K. C. FRISCH, et al., POLYURETHANES, CHEMISTRY AND TECHNOLOGY PART 1, Chemistry (pp. 48 to 53, published on 1962) and the like.

Among these, examples of the hydroxy group-containing aliphatic acid include ricinoleic acid, 12-hydroxystearic acid, castor oil fatty acid, and hydrogenated castor oil fatty acid.

Examples of the terminal alcohol-modified (meth)acrylic resin include a polymer of a long-chain alkyl (meth)acrylate in which thioglycerol is used as a chain transfer agent. As the polymer of the alkyl (meth)acrylate, one or two or more alkyl (meth)acrylates having 6 or more and less than 30 carbon atoms are suitably used. An alkyl (meth)acrylate having 8 or more and less than 25 carbon atoms (preferably 10 or more and less than 20 carbon atoms) is more preferable.

As the isocyanate compound, all the typical isocyanate compound can be used. Among these, an aliphatic or alicyclic diisocyanate compound such as hexamethylene diisocyanate, hydrogenated toluene diisocyanate (hydrogenated TDI), hydrogenated diphenylmethane diisocyanate (hydrogenated MDI), or isophorone diisocyanate is more preferable.

Examples of the amine compound include ethylenediamine, diaminopropane, diaminobutane, hexamethylenediamine, trimethylhexamethylenediamine, N-aminoethylpiperazine, bis-aminopropyl piperazine, polyoxypropylenediamine, 4,4'-diaminodicyclohexylmethane, isophorone diamine, thiourea, and methyliminobispropylamine. As the amine compound, one kind may be used alone, or a mixture of two or more kinds may be used.

As the above-described macromonomer B, a macromonomer having an ethylenically unsaturated bond at a terminal may be used. Here, the macromonomer B consists of a polymer chain portion and a polymerizable functional group portion having an ethylenically unsaturated double bond at a terminal.

A copolymerization ratio of the component derived from the macromonomer B is not particularly limited but is preferably 3 mass % or higher, more preferably 10 mass % or higher, and still more preferably 20 mass % or higher with respect to the polymer forming the binder particles B. The upper limit of the concentration is preferably 70 mass % or lower, more preferably 60 mass % or lower, and still more preferably 50 mass % or lower. The copolymerization ratio can be calculated from the addition amount (amount used) of the monomer used for the synthesis of the binder particles B. The addition amount (amount used) of the monomer that has a group having a ring structure of two or more rings is not included.

—Group Having Ring Structure of Two or More Rings—

The group having a ring structure of two or more rings that is used in the present invention is not particularly limited as long as it is a group in which at least one hydrogen atom in a compound which has a group having a ring (preferably a fused ring) structure having two or more rings is replaced with a direct bond. The group having a ring structure of two or more rings is preferably a group in which at least one hydrogen atom in a compound represented by Formula (D) is replaced with a direct bond, more preferably a group in which one or two hydrogen atoms are replaced with a direct bond, and still more preferably a group in which one hydrogen atom is replaced with a direct bond.

The group formed of the compound represented by Formula (D) has excellent affinity to a carbonaceous material. Therefore, the dispersion stability of the composition including the binder particles B can be improved, and the binding properties between the solid particles can be improved. Along with the improvement of dispersion stability and the improvement of binding properties, the secondary battery according to the embodiment of the present invention has excellent cycle characteristics. From the viewpoint of improving cycle characteristics, the group having a ring structure of two or more rings is preferably a group having a ring structure of three or more rings and more preferably a group having a ring structure of four or more rings. The upper limit of the number of rings in the ring structure is not particularly limited and is preferably 18 or less, more preferably 16 or less, still more preferably 12 or less, still more preferably 8 or less, and still more preferably 6 or less.

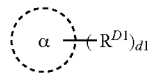

Formula (D)

In Formula (D), a ring α represents a ring including two or more rings, $R^{D1}$ represents a substituent that is bonded to an atom forming the ring α, d1 represents an integer of 1 or more. In a case where d1 represents 2 or more, a plurality of $R^{D1}$'s may be the same as or different from each other. $R^{D1}$'s which are substituted with atoms adjacent to each other may be bonded to each other to form a ring. The number of rings in the ring α is 2 or more, more preferably 3 or more, and still more preferably 4 or more. In addition, the number of rings in the ring α is not particularly limited and is preferably 18 or less, more preferably 16 or less, still more preferably 12 or less, still more preferably 8 or less, and still more preferably 6 or less. It is preferable that the ring α includes a ring structure of a 3- or more membered ring, it is more preferable that the ring α includes a ring structure of a 4- or more membered ring, it is still more preferable that the ring α includes a ring structure of a 5- or more membered ring, it is still more preferable that the ring α includes a 6-membered ring structure. In addition, it is preferable that the ring α includes a ring structure of a 24- or less membered ring, it is more preferable that the ring α includes a ring structure of a 12- or less membered ring, it is still more preferable that the ring α includes a ring structure of an 8- or less membered ring, and it is still more preferable that the ring α includes a ring structure of a 6-membered ring.

It is preferable that the ring α includes a structure of an aliphatic hydrocarbon ring, an unsaturated hydrocarbon ring, an aromatic ring, or a heterocycle, or a combination thereof. Examples of a specific structure of the aliphatic hydrocarbon ring include cyclopropane, cyclobutane, cyclopentane, cyclohexane, cycloheptane, cyclooctane, cyclononane, cyclodecane, cycloundecane, cyclododecane, and decalin.

Examples of a specific structure of the unsaturated hydrocarbon ring include a ring structure in which a part of the aliphatic hydrocarbon ring is replaced with a double bond. Examples of the ring structure include cyclobutene, cyclopentene, cyclopentadiene, cyclohexene, cyclohexadiene, cyclooctene, and cyclooctadiene.

Examples of a specific structure of the aromatic ring include benzene, naphthalene, anthracene, pyrene, tetracene, pentacene, phenanthrene, chrysene, triphenylene, tetraphene, picene, pentaphene, perylene, helicene, and coronene.

Examples of a specific structure of the heterocycle include ethyleneimine, ethylene oxide, ethylene sulfide, acetylene oxide, azacyclobutane, 1,3-propylene oxide, trimethylene sulfide, pyrrolidine, tetrahydrofuran, tetrahydrothiophene, pyrrole, furan, thiophene, piperidine, tetrahydropyran, tetrahydrothiopyran, pyridine, hexamethyleneimine, hexamethylene oxide, hexamethylene sulfide, azatropilidene, oxacycloheptatriene, thiotropilidene, imidazole, oxazole, thiazole, imidazoline, pyrazine, morpholine, thiazine, indole, isoindole, benzoimidazole, purine, quinoline, isoquinoline, quinoxaline, cinnoline, pteridine, chromene, isocromene, acridine, xanthene, benzoquinoline, carbazole, benzo-O-cinnoline, porphyrin, chlorine, and choline.

As the ring α, a structure including cyclobutane, cyclopentane, cyclohexane, cycloheptane, cyclooctane, cyclobutene, cyclopentene, dicyclopentadiene, cyclohexene, cyclohexadiene, cyclooctene, benzene, naphthalene, anthracene, pyrene, tetracene, phenanthrene, triphenylene, pyrrolidine, tetrahydrofuran, tetrahydrothiophene, pyrrole, furan, thiophene, piperidine, pyridine, hexamethyleneimine, hexamethylene oxide, hexamethylene sulfide, imidazole, oxazole, thiazole, imidazoline, pyrazine, morpholine, thiazine, indole, isoindole, benzoimidazole, quinoline, benzoquinoline, xanthene, carbazole, or porphyrin is preferable, a structure including cyclopentane, cyclohexane, cycloheptane, cyclopentene, dicyclopentadiene, cyclohexene, cyclohexadiene, benzene, naphthalene, anthracene, pyrene, triphenylene, pyrrole, furan, thiophene, piperidine, pyridine, imidazole, oxazole, or indole is more preferable, and a structure including cyclopentane, cyclohexane, cyclohexene, or pyrene is still more preferable.

Preferable examples of the substituent represented by $R^{D1}$ include the above-described substituent T.

In addition, as the substituent represented by $R^{D1}$=O is also preferable. Examples of the ring α having =O include a structure having anthraquinone.

As described above, in order to introduce the ring structure of two or more rings into the side chain of the polymer forming the binder particles B used in the present invention and/or the side chain of the macromonomer B component, it is preferable that $R^{D1}$ has the site represented by Formula (b-1) and/or the above-described linking group L and $R^{D1}$ represents $P^1$ described below.

The polymer forming the binder particles B used in the present invention may have the above-described group having the ring structure of two or more rings at the main chain, a side chain, or a terminal of the polymer.

Hereinafter, a case where the compound having the ring structure of two or more rings is a compound represented by Formula (D) will be described as an example.

"Being included at the main chain of the polymer" represents that the compound represented by Formula (D) is incorporated into the polymer as a structure in which at least two hydrogen atoms in the compound represented by Formula (D) are replaced with a direct bond, and functions as the main chain as a repeating structure of the polymer. On the other hand, "being included at the side chain of the polymer" represents being incorporated into the polymer as a structure in which one hydrogen atom in the compound represented by Formula (D) is replaced with a direct bond. In addition, "being included at the terminal of the polymer" represents being incorporated into the polymer as a structure in which one hydrogen atom in the compound represented by Formula (D) is replaced with a direct bond, and functioning as a polymer chain. Here, even in a case where the group is included at a plurality of main chains, side chains, or terminals of the polymer, the same can be applied.

In the present invention, that the polymer forming the binder particles B includes the group having the ring structure of two or more rings preferably at the main chain or the side chain, more preferably at the side chain, and still more preferably the side chain of the component derived from the macromonomer B (the graft chain having the component derived from the macromonomer B). "Being included at the side chain of the macromonomer B component" represents that a repeating unit having, as a side chain, a structure in which one hydrogen atom in the compound represented by Formula (D) is replaced with a direct bond is incorporated into the macromonomer B component as one repeating unit forming the macromonomer B component.

The group having the ring structure of two or more rings is incorporated into the side chain of the polymer forming the binder particles B used in the present invention such that the mobility of the group having the ring structure of two or more rings is improved and thus adsorption is improved. As a result, binding properties between the solid particles in the all-solid state secondary battery can be further improved. The group having the ring structure of two or more rings is incorporated into the side chain of the macromonomer B component of the polymer forming the binder particles B used in the present invention such that the proportion of the group having the ring structure of two or more rings present on the surfaces of the binder particles B increases, and binding properties between the solid particles in the all-solid state secondary battery can be further improved.

In the present invention, the content of the repeating unit that has the group having the ring structure of two or more rings is preferably 10 mass % to 85 mass %, more preferably 15 mass % to 80 mass %, and still more preferably 18 mass % to 70 mass % with respect to 100 mass % of the polymer forming the binder particles B. It is preferable that the content of the repeating unit that has the group having the ring structure of two or more rings is in the above-described range such that the adsorption and the dispersion stability of the binder particles B are simultaneously achieved.

The content of the repeating unit that has the group having the ring structure of two or more rings can be calculated from the addition amount (amount used) of the monomer used for the synthesis of the binder particles B. In Table 1 of WO2017/131093A, among components represented by M1 to M4 and MM, the total content of components that have the group having the ring structure of two or more rings refers to the content of the repeating unit that has the group having the ring structure of two or more rings. For example, in BP-5 in Table 1, M4 (B-5) and MM (MM-2) have the group having the ring structure of two or more rings, and the content of the repeating unit that has the group having the ring structure of two or more rings is 40 mass %.

In addition, in the present invention, it is preferable that the compound represented by Formula (D) is at least one of a compound represented by Formula (1) or an aliphatic hydrocarbon represented by Formula (2).

The compound represented by Formula (1) and the aliphatic hydrocarbon represented by Formula (2) have excellent affinity to the carbonaceous material as the negative electrode active material or the like. Therefore, the dispersion stability of the composition including the above-described compound is further improved, and binding properties between solid particles can be improved. In addition, along with the improvement of the dispersion stability and the improvement of the binding properties, cycle characteristics of the secondary battery prepared using the composition can be improved.

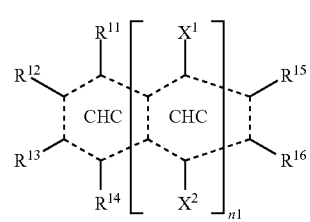

Formula (1)

In Formula (1), CHC represents a benzene ring, a cyclohexane ring, a cyclohexene ring, or a cyclohexadiene ring. n1 represents an integer of 0 to 8. $R^{11}$ to $R^{16}$ each independently represent a hydrogen atom or a substituent. In a case where CHC represents a group other than a benzene ring, the ring structure may have a hydrogen atom at a position other than $R^{11}$ to $R^{16}$. $X^1$ and $X^2$ each independently represent a hydrogen atom or a substituent. Here, in $R^{11}$ to $R^{16}$, $X^1$, and $X^2$, groups adjacent to each other may be bonded to each other to form a 5- or 6-membered ring. In a case where n1 represents 0, one substituent represented by any one of $R^{11}$ to $R^{16}$ is —$(CHC^1)_{m1}$-Rx, or any two or $R^{11}$ to $R^{16}$ may be bonded to form —$(CHC)_{m1}$. Here, $CHC^1$ represents a phenylene group, a cycloalkylene group, or a cycloalkenylene group, m1 represents an integer of 2 or more, and Rx represents a hydrogen atom or a substituent. In addition, in a case where n1 represents 1, among $R^{11}$ to $R^{16}$, $X^1$, and $X^2$, at least two adjacent to each other are bonded to each other to form a benzene ring, a cyclohexane ring, a cyclohexene ring, or a cyclohexadiene ring.

Examples of the substituent represented by $R^{11}$ to $R^{16}$ include an alkyl group, an aryl group, a heteroaryl group, and an alkenyl group, an alkynyl group, an alkoxy group, an aryloxy group, a heteroaryloxy group, an alkylthio group, an arylthio group, a heteroarylthio group, an acyl group, an acyloxy group, an alkoxycarbonyl group, an aryloxycarbonyl group, an alkylcarbonyloxy group, an arylcarbonyloxy group, a hydroxy group, a carboxy group or a salt thereof, a sulfo group or a salt thereof, an amino group, a mercapto group (sulfanyl group), an amido group, a formyl group, a cyano group, a halogen atom, a (meth)acryl group, a (meth)acryloyloxy group, a (meth)acrylamide group, an epoxy group, and an oxetanyl group.

Hereinafter, in the following description, a formyl group is considered as an acyl group.

The number of carbon atoms in the alkyl group is preferably 1 to 30, more preferably 1 to 25, and still more preferably 1 to 20. Specific examples of the alkyl group include methyl, ethyl, propyl, isopropyl, butyl, t-butyl, octyl, dodecyl, stearyl, benzyl, naphthylmethyl, pyrenylmethyl, and pyrenylbutyl. It is more preferable that the alkyl group has an unsaturated carbon bond of a double bond or a triple bond.

The number of carbon atoms in the aryl group is preferably 6 to 30, more preferably 6 to 26, and still more preferably 6 to 15. Specific examples of the aryl group include phenyl, naphthyl, anthracene, terphenyl, tolyl, xylyl, methoxyphenyl, cyanophenyl, and nitrophenyl.

It is preferable that the heteroaryl group is a 5- or 6-membered ring having at least one oxygen atom, sulfur atom, or nitrogen atom, in which the number of carbon atoms is preferably 6 to 30, more preferably 6 to 26, and still more preferably 6 to 15. Specific examples of the heteroaryl group include furan, pyridine, thiophene, pyrrole, triazine, imidazole, tetrazole, pyrazole, thiazole, and oxazole.

The number of carbon atoms in the alkenyl group is preferably 2 to 30, more preferably 2 to 25, and still more preferably 2 to 20. Specific examples of the alkenyl group include vinyl and propenyl.

The number of carbon atoms in the alkynyl group is preferably 2 to 30, more preferably 2 to 25, and still more preferably 2 to 20. Specific examples of the alkynyl group include ethynyl, propynyl, and phenylethynyl.

Alkoxy group: the alkyl group in the alkoxy group is the same as the above-described alkyl group.

Aryloxy group: the aryl group in the aryloxy group is the same as the above-described aryl group.

Heteroaryloxy group: the heteroaryl group in the heteroaryloxy group is the same as the above-described heteroaryl group.

Alkylthio Group: the alkyl group in the alkylthio group is the same as the above-described alkyl group.

Arylthio group: the aryl group in the arylthio group is the same as the above-described aryl group.

Heteroarylthio group: the heteroaryl group in the heteroarylthio group is the same as the above-described heteroaryl group.

Acyl group: the number of carbon atoms is preferably 1 to 30, more preferably 1 to 25, and still more preferably 1 to 20. The acyl group may be a formyl group, an aliphatic carbonyl group, an aromatic carbonyl group, or a heterocyclic carbonyl group. Examples of the acyl group are as follows. Formyl, acetyl (methylcarbonyl), benzoyl (phenylcarbonyl), ethylcarbonyl, acryloyl, methacryloyl, octylcarbonyl, dodecylcarbonyl (stearic acid residue), a linoleic acid residue, and a linolenic acid residue.

Acyloxy group: the acyl group in the acyloxy group is the same as the above-described acyl group.

Alkoxycarbonyl group: the alkyl group in the alkoxycarbonyl group is the same as the above-described alkyl group.

Aryloxycarbonyl group: the aryl group in the aryloxycarbonyl group is the same as the above-described aryl group.

Alkylcarbonyloxy group: the alkyl group in the alkylcarbonyloxy group is the same as the above-described alkyl group.

Arylcarbonyloxy group: the aryl group in the arylcarbonyloxy group is the same as the above-described aryl group.

In general, these substituents can be introduced using an electrophilic substitution reaction, a nucleophilic substitution reaction, halogenation, sulfonation, or diazotization of the aromatic hydrocarbon represented by Formula (1) or a combination thereof. Examples of the reaction include alkylation by the Friedel-Crafts reaction, acylation by the Friedel-Crafts reaction, the Vilsmeier reaction, and a transition metal catalyst coupling reaction.

n1 represents more preferably an integer of 0 to 6 and still more preferably an integer of 1 to 4.

The compound represented by Formula (1) is preferably a compound represented by Formula (1-1) or (1-2).

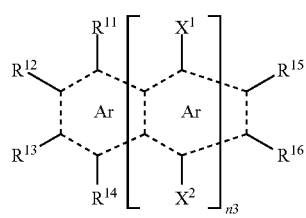

Formula (1-1)

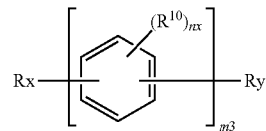

Formula (1-2)

In Formula (1-1), Ar represents a benzene ring. $R^{11}$ to $R^{16}$, $X^1$, and $X^2$ have the same definitions and the same preferable ranges as those of the examples described regarding $R^{11}$ to $R^1$ and $X^1$ and $X^2$ in Formula (1). n3 represents an integer of 1 or more. In a case where n3 represents 1, among $R^{11}$ to $R^{16}$ and $X^1$ and $X^2$, at least two adjacent to each other are bonded to each other to form a benzene ring.

Rx in Formula (1-2) has the same definition and the same preferable range as Rx in Formula (1). $R^{10}$ represents a substituent, and nx represents an integer of 0 to 4. m3 represents an integer of 3 or more. Ry represents a hydrogen atom or a substituent. Here, Rx and Ry may be bonded to each other.

n3 represents preferably an integer of 1 to 6, more preferably an integer of 1 to 3, and still more preferably an integer of 1 or 2.

m3 represents preferably an integer of 3 to 10, more preferably an integer of 3 to 8, and still more preferably an integer of 3 to 5.

Specific examples of the compound represented by Formula (1) include a compound having a structure of naphthalene, anthracene, phenanthracene, pyrene, tetracene, tetraphene, chrysene, triphenylene, pentacene, pentaphene, perylene, pyrene, benzo[a]pyrene, coronene, anthanthrene, corannulene, ovalene, graphene, cycloparaphenylene, polyparaphenylene, or cyclophene. However, the present invention is not limited to Examples.

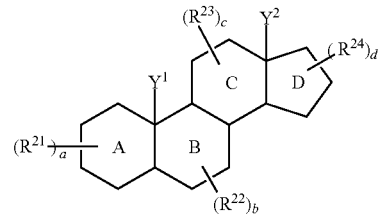

Formula (2)

In Formula (2), $Y^1$ and $Y^2$ each independently represent a hydrogen atom, a methyl group, or a formyl group. $R^{21}$, $R^{22}$, $R^{23}$, and $R^{24}$ each independently represent a substituent, and a, b, c, and d represent an integer of 0 to 4.

Here, an A ring may be a saturated ring, an unsaturated ring having one or two double bonds, or an aromatic ring, and a B ring and a C ring may be an unsaturated ring having one or two double bonds. In a case where a, b, c, or d represents an integer of 2 to 4, substituents adjacent to each other may be bonded to form a ring.

The aliphatic hydrocarbon represented by Formula (2) is a compound having a steroid skeleton.

Here, carbon numbers in the steroid skeleton are as follows.

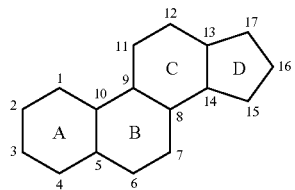

Carbon Number in Steroid Skeleton

First, the aliphatic hydrocarbon represented by Formula (2) will be described.

The substituent represented by $R^{21}$, $R^{22}$, $R^{23}$, and $R^{24}$ may be any substituent. In particular, an alkyl group, an alkenyl group, a hydroxy group, a formyl group, an acyl group, a carboxy group or a salt thereof, a (meth)acryl group, a (meth)acryloyloxy group, a (meth)acrylamide group, an epoxy group, or an oxetanyl group is preferable. In addition, an =O group in which two substituents are formed common to the same carbon atom is preferable.

The alkyl group is preferably an alkyl group having 1 to 12 carbon atoms and may have a substituent. The substituent may be any substituent, and examples thereof include an alkyl group, an alkenyl group, a hydroxy group, a formyl group, an acyl group, a carboxy group, an alkoxycarbonyl group, a carbamoyl group, and a sulfo group. It is more preferable that the alkyl group has an unsaturated carbon bond of a double bond or a triple bond.

The alkenyl group is preferably an alkenyl group having 1 to 12 carbon atoms and may have a substituent. The substituent may be any substituent, and examples thereof include an alkyl group, an alkenyl group, a hydroxy group, a formyl group, an acyl group, a carboxy group, an alkoxycarbonyl group, a carbamoyl group, and a sulfo group.

It is preferable that $R^{21}$ is substituted with carbon number 3, it is preferable that $R^{22}$ is substituted with carbon number 6 or 7, it is preferable that $R^{23}$ is substituted with carbon number 11 or 12, and it is preferable that $R^{24}$ is substituted with carbon number 17.

It is preferable that $Y^1$ and $Y^2$ represent a hydrogen atom or a methyl group.

It is preferable that a, b, c, and d represent an integer of 0 to 2.

In a case where the A ring represents an unsaturated ring, it is preferable that the double bond is a bond of carbon numbers 4 and 5. In a case where the B ring represents an unsaturated ring, it is preferable that the double bond is a bond of carbon numbers 5 and 6 or a bond of carbon numbers 6 and 7. In a case where the C ring represents an unsaturated ring, it is preferable that the double bond is a bond of carbon numbers 8 and 9.

The compound represented by Formula (2) may include any stereoisomer. In a case where a downward direction on the paper plane is represented by α and an upward direction on the paper plane is represented by β, a bonding direction of a substituent, may be any of α or β or a mixture thereof. In addition, the configuration of the A/B rings, the configuration of the B/C rings, or the configuration of the C/D rings may be any one of a trans configuration or a cis configuration or may be a mixed configuration thereof.

In the present invention, it is preferable that the sum of a to d represent 1 or more and any one of $R^{21}$, $R^{22}$, $R^{23}$, or $R^{24}$ represent a hydroxy group or an alkyl group which may have a substituent.

It is preferable that the compound having a steroid skeleton is steroid as described below.

In the following description, a substituent having a steroid ring is sterically controlled.

In order from the left, the substituents are a cholestane, a cholane, a pregnane, an androstane, and an estrane.

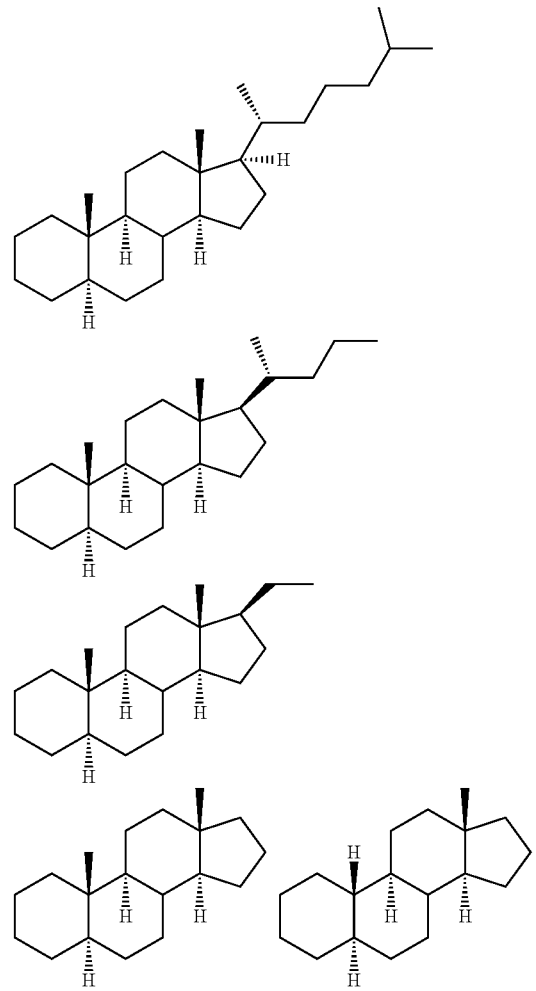

Specific examples of the aliphatic hydrocarbon represented by Formula (2) include a compound having a structure of cholesterol, ergosterol, testosterone, estradiol, aldosterone, hydrocortisone, stigmasterol, thymosterol, lanosterol, 7-dehydrodesmosterol, 7-dehydrocholesterol, cholanic acid, cholic acid, lithocholic acid, deoxycholic acid, sodium deoxycholate, lithium deoxycholate, hyodeoxycholic acid, chenodeoxycholic acid, ursodeoxycholic acid, dehydrocholic acid, phocaecholic acid, or hyocholic acid. However, the present invention is not limited to Examples.

The aliphatic hydrocarbon represented by Formula (2) may be a commercially available product.

In the compound represented by Formula (D), it is preferable that at least one $R^{D1}$ represents $L^{1a}$-$P^1$ and or at least two $R^{D1}$'s each independently represent $L^{2a}$-$P^2$ or $L^{3a}$-$P^2$, and it is more preferable that at least one $R^{D1}$ represents $L^{1a}$-$P^1$. In Formula (1), it is preferable that at least one of $R^{11}$ to $R^{16}$, $X^1$, or $X^2$ represents $L^{1a}$-$P^1$ or at least two of $R^1$ to $R^{16}$, $X^1$, and $X^2$ each independently represent $L^{2a}$-$P^2$ or $L^{3a}$-$P^2$, and it is more preferable that at least one of $R^{11}$ to $R^{16}$, $X^1$, or $X^2$ represents $L^{1a}$-$P^1$. In Formula (2), it is preferable that at least one of $R^{21}$, $R^{22}$, $R^{23}$, and $R^{24}$ represents $L^{1a}$-$P^1$ and or at least two of $R^{21}$, $R^{22}$, $R^{23}$, and $R^{24}$ each independently represent $L^{2a}$-$P^2$ or $L^{3a}$-$P^2$, and it is more preferable that at least one of $R^{21}$, $R^{22}$, $R^{23}$, and $R^{24}$ represents $L^{1a}$-$P^1$.

$L^{1a}$-$P^1$ is bonded to a ring at $L^{1a}$. $L^{2a}$-$P^2$ and $L^{3a}$-$P^2$ are bonded to rings at $L^{2a}$ and $L^{3a}$, respectively.

$L^{1a}$ represents a single bond or a linking group. As the linking group, a hydrocarbon linking group [an alkylene group having 1 to 10 carbon atoms (more preferably 1 to 6 carbon atoms and still more preferably 1 to 3 carbon atoms), an alkenylene group having 2 to 10 carbon atoms (more preferably 2 to 6 carbon atoms still more preferably 2 to 4 carbon atoms), an alkynylene group having 2 to 10 carbon atoms (more preferably 2 to 6 carbon atoms still more preferably 2 to 4 carbon atoms), an arylene group having 6 to 22 carbon atoms (more preferably 6 to 10 carbon atoms), or a combination thereof], a heterocyclic linking group [a carbonyl group (—CO—), a thiocarbonyl group (—CS—), an ether group (—O—), a thioether group (—S—), an imino group (—NR$^{Na}$—), an ammonium linking group (—NR$^{Na}_2{}^+$—), a polysulfide group (the number of S's is 1 to 8), an imine linking group ($R^{Na}$—N=C<, —N=C($R^{Na}$)—), a sulfonyl group (—SO$_2$—), a sulfinyl group (—SO—), a phosphate linking group (—O—P(OH)(O)—O—), a phosphonate linking group (—P(OH)(O)—O—), or a combination thereof], or a linking group including a combination thereof is preferable. $R^{Na}$ in $L^{1a}$ represents a hydrogen atom or an alkyl group having 1 to 12 carbon atoms (preferably 1 to 4 carbon atoms and more preferably 1 or 2 carbon atoms).

In a case where a ring is formed by condensation of a substituent or a linking group, the above-described hydrocarbon linking group may be linked by appropriately forming a double bond or a triple bond. As the formed ring, a 5-membered ring or a 6-membered ring is preferable. As the 5-membered ring, a nitrogen-containing 5-membered ring is preferable, and examples of a compound forming the ring include pyrrole, imidazole, pyrazole, indazole, indole, benzoimidazole, pyrrolidine, imidazolidine, pyrazolidine, indoline, carbazole, and a derivative thereof. Examples of the 6-membered ring include piperidine, morpholine, piperazine, a derivative thereof. In addition, in a case where a compound or a substituent, a linking group, or the like contains, for example, an aryl group or a heterocyclic group, these groups may have a monocyclic or fused ring and may be substituted or unsubstituted as described above.

In a case where $L^{1a}$ represents a linking group consisting of a combination of linking groups, the number of the linking groups used in combination is not particularly limited and is, for example, preferably 2 to 30, more preferably 2 to 20, still more preferably 2 to 10, and still more preferably 2 to 4. Examples of the linking group consisting of a combination of linking groups include an alkylene group having 1 to 6 carbon atoms (having preferably 1 to 4 carbon atoms), an arylene group having 6 to 24 carbon atoms (having preferably 6 to 10 carbon atoms), an ether group (—O—), a thioether group (—S—), an imino group (NR$^{Na}$), a carbonyl group, a (poly)alkyleneoxy group, a (poly)ester group, a (poly)amido group, and a group relating to a combination thereof. In particular, an alkylene group having 1 to 4 carbon atoms, an ether group (—O—), an imino group (NR$^{Na}$), a carbonyl group, a (poly)alkyleneoxy group, a (poly)ester group, or a group relating to a combination thereof is more preferable. In addition, a linking group having an exemplary monomer described below can be used.

In a case where $L^{1a}$ represents a group which may have a substituent, the group may further have a substituent. Examples of the substituent include the above-described substituent T. In particular, a halogen atom (preferably, a fluorine atom or a chlorine atom), an alkyl group, an acyl group, a carbamoyl group, or a hydroxy group is preferable.

It is preferable that $L^{1a}$ has a certain length or more. Specifically, the minimum number of atoms linking the ring α (an atom bonded to $L^{1a}$ among the atoms forming the ring structure represented by Formula (1) or (2)) and $P^1$ to each other is preferably 2 or more, more preferably 4 or more, still more preferably 6 or more, and still more preferably 8 or more. The upper limit is preferably 1000 or less, more preferably 500 or less, still more preferably 100 or less, and still more preferably 20 or less.

$L^2a$ and $L^3$ have the same definition as that of $L^{1a}$ and may be the same as or different from each other.

$P^1$ represents a polymerizable site. The polymerizable site is a group that is polymerizable through a polymerization reaction, and examples thereof include a group capable of chain polymerization, for example, an ethylenically unsaturated group, an epoxy group, or an oxetanyl group. In addition, for example, a group including two or more of a hydroxy group, an amino group, a carboxy group, an isocyanate group, and the like, or a group including one or more dicarboxylic anhydride structures as a group for condensation polymerization can be used.

Examples of the ethylenically unsaturated group include a (meth)acryloyl group, a (meth)acryloyloxy group, a (meth)acrylamide group, and a vinyl group (including an allyl group).

As $P^1$, a partial structure including one or more ethylenically unsaturated groups, one or more epoxy groups, one or more oxetanyl groups, or one or more dicarboxylic anhydrides or including two or more hydroxy groups, two or more amino groups, or two or more isocyanate groups is preferable, a partial structure including one or more (meth)acryloyl groups, one or more (meth)acryloyloxy groups, one or more (meth)acrylamide groups, or one or more vinyl groups or including two or more hydroxy groups, two or more amino groups, or two or more isocyanate groups is more preferable, and a partial structure including a (meth)acryloyl group or a (meth)acryloyloxy group is still more preferable.

Examples of $P^2$ include a group capable of condensation polymerization, for example, a hydroxy group, an amino group, a carboxy group, an isocyanate group, or a dicarboxylic anhydride. In particular, a hydroxy group, an amino group, an isocyanate group, or a dicarboxylic anhydride is preferable, and a hydroxy group, an amino group, or an isocyanate group is more preferable.

It is preferable that $L^{1a}$-$P^1$ represents a group represented by Formula (F-1).

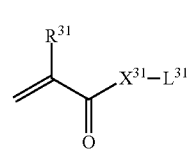

(F-1)

In the compound represented by Formula (D), it is preferable that d1 represents 1 to 4 and $R^{D1}$ represents a group represented by Formula (F-1), and it is more preferable that d1 represents 1 and $R^D$ represents a group represented by Formula (F-1). It is preferable that at least four of $R^{11}$ to $R^{16}$, $X^1$, and $X^2$ in Formula (1) represent a group represented by Formula (F-1), and it is more preferable that at least one of $R^{11}$ to $R^{16}$, $X^1$, and $X^2$ represents a group represented by Formula (F-1). It is preferable that at least four of $R^{21}$, $R^{22}$, $R^{23}$, and $R^{24}$ in Formula (2) represent a group represented by Formula (F-1), and it is more preferable that at least one of $R^2$, $R^{22}$, $R^{23}$, and $R^2$ represents a group represented by Formula (F-1).

$X^{31}$ represents —O— or >NH.

In the formula, $R^3$ represents a hydrogen atom, a hydroxy group, a cyano group, a halogen atom, an alkyl group, an alkenyl group, an alkynyl group, or an aryl group.

The alkyl group that may be used as $R^{31}$ is not particularly limited and is preferably an alkyl group having 1 to 24 carbon atoms, more preferably an alkyl group having 1 to 12 carbon atoms, and still more preferably an alkyl group having 1 to 6 carbon atoms.

The alkenyl group that may be used as $R^3$ is not particularly limited and is preferably an alkenyl group having 2 to 24 carbon atoms, more preferably an alkenyl group having 2 to 12 carbon atoms, and still more preferably an alkenyl group having 2 to 6 carbon atoms.

The alkynyl group that may be used as $R^3$ is not particularly limited and is preferably an alkynyl group having 2 to 24 carbon atoms, more preferably an alkynyl group having 2 to 12 carbon atoms, and still more preferably an alkynyl group having 2 to 6 carbon atoms.

The aryl group that may be used as R is not particularly limited and is preferably an aryl group having 6 to 22 carbon atoms and more preferably an aryl group having 6 to 14 carbon atoms.

Examples of the halogen atom which may be used as $R^{31}$ include a fluorine atom, a chlorine atom, a bromine atom, and an iodine atom. Among these, a fluorine atom, a chlorine atom, or a bromine atom is preferable.

In particular, as $R^{31}$, a hydrogen atom or an alkyl group is preferable, and a hydrogen atom or methyl is more preferable.

In a case where $R^{31}$ represents a group which may have a substituent (an alkyl group, an alkenyl group, an alkynyl group, or an aryl group), R may further have a substituent. Examples of the substituent include the above-described substituent T. In particular, a halogen atom (for example, a fluorine atom), a hydroxy group, a carboxy group, an ester group (for example, an alkoxycarbonyl group, an aryloxycarbonyl group, an acyloxy group, or an aryloyloxy group), or an amido group (carbamoyl group) is preferable.

$L^{31}$ has the same definition as that of $L^{1a}$. In particular, an alkylene group (preferably 1 to 12 carbon atoms and more preferably 1 to 6 carbon atoms), a carbonyl group, an ether group, an imino group, or a linking group including a combination thereof is more preferable. An alkylene group having 1 to 4 carbon atoms, a carbonyl group, an ether group, an imino group, or a linking group including a combination thereof is still more preferable.

In a case where $L^1$ represents a group which may have a substituent, the group may further have a substituent. Examples of the substituent include the above-described substituent T. In particular, a halogen atom (preferably, a fluorine atom or a chlorine atom), an alkyl group, an acyl group, a carbamoyl group, or a hydroxy group is preferable.

It is preferable that $L^3$ has a certain length or more. The minimum number of atoms linking the ring α (an atom bonded to $L^1$ among the atoms forming the ring structure represented by Formula (1) or (2)) and $X^3$ to each other is the same as the minimum number of atoms linking the ring α and $P^1$ to each other.

Specific examples of the compound having the above-described ring structure of two or more rings will be shown below but do not intend to limit the present invention. In the following exemplary compounds, m4 represents 1 to 100000, and n4 represents 1 to 100000.

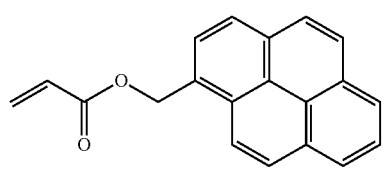

B-1

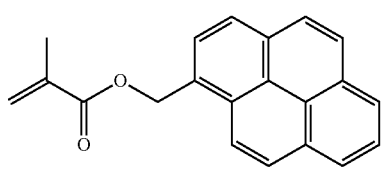

B-2

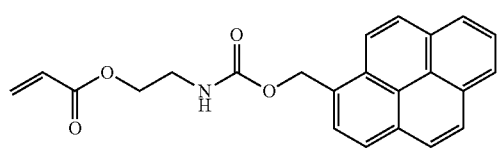

B-3

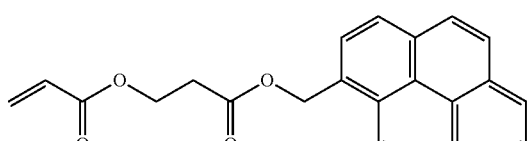

B-4

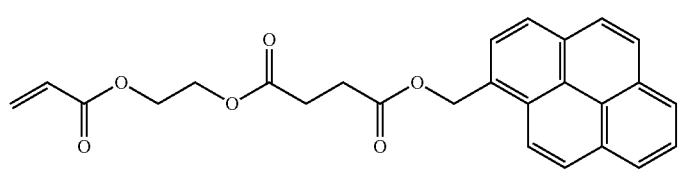

B-5

-continued
B-6
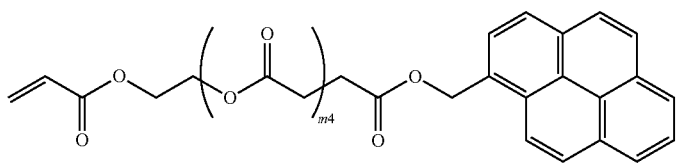
B-7
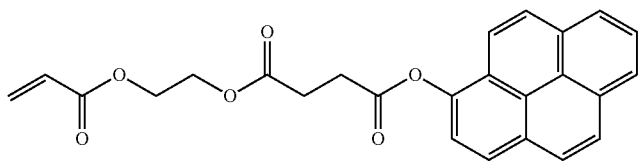
B-8
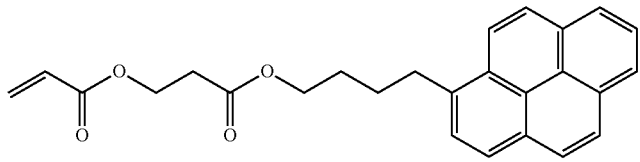
B-9
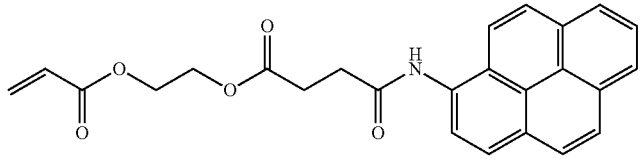
B-10
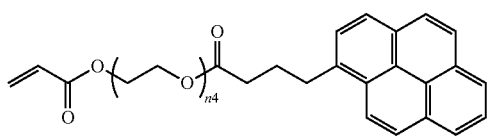
B-11
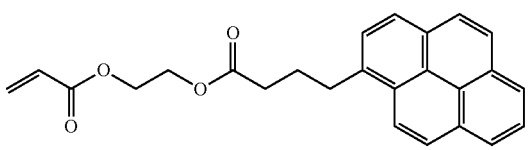
B-12
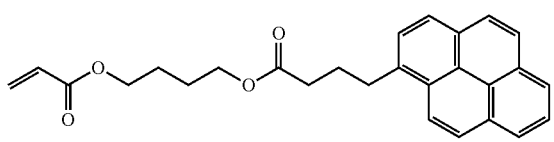
B-13
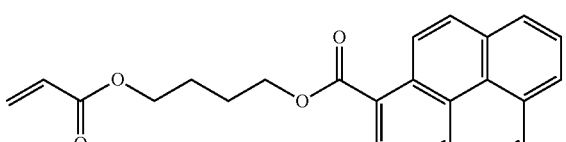
B-14
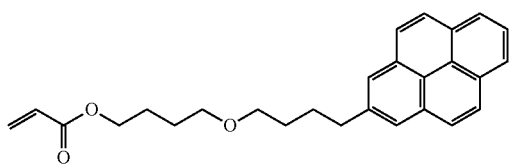
B-15
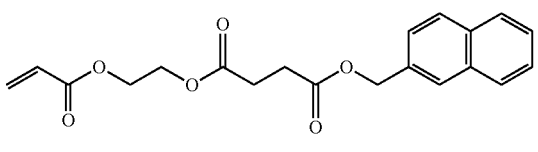
B-16
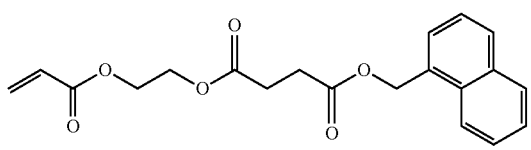
B-17
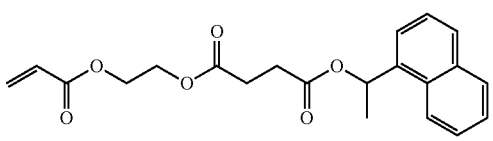
B-18
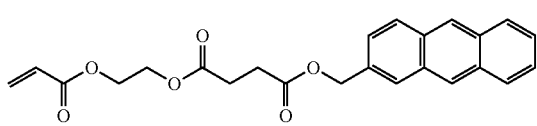
B-19
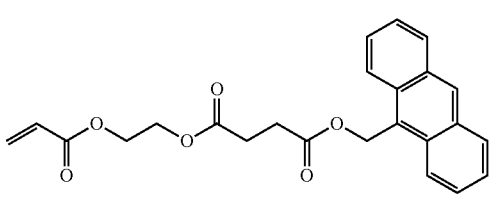

-continued
B-20
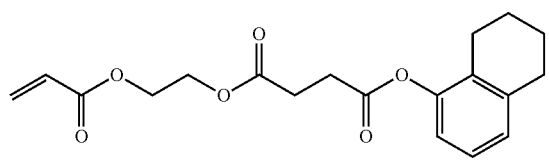
B-21
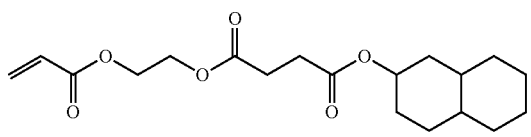
B-22
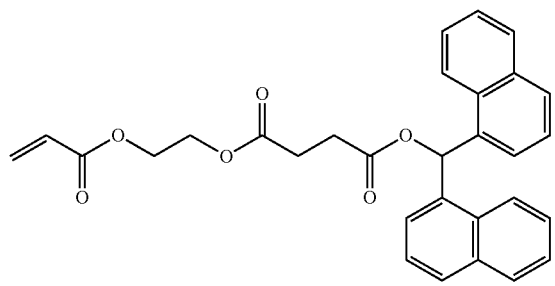
B-23
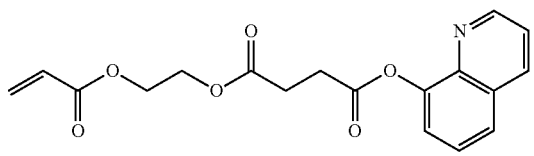
B-24
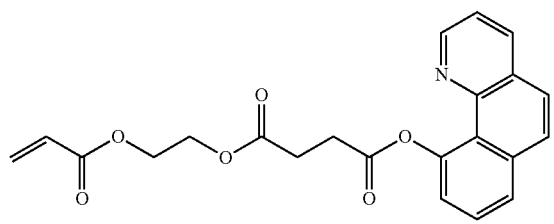
B-25
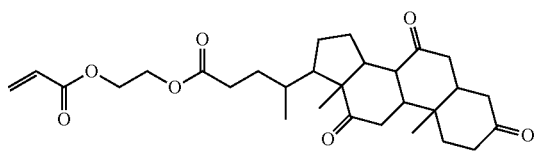
B-26
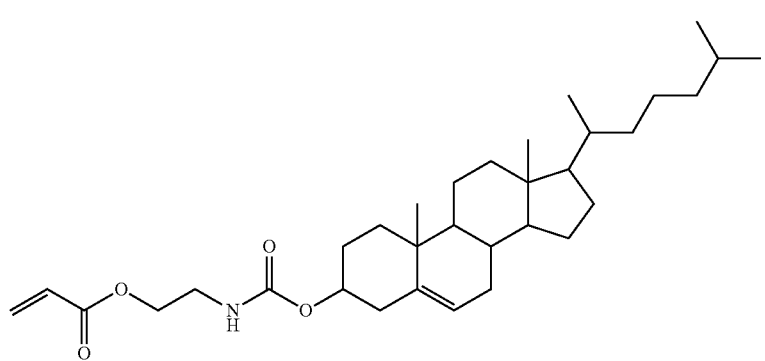
B-27
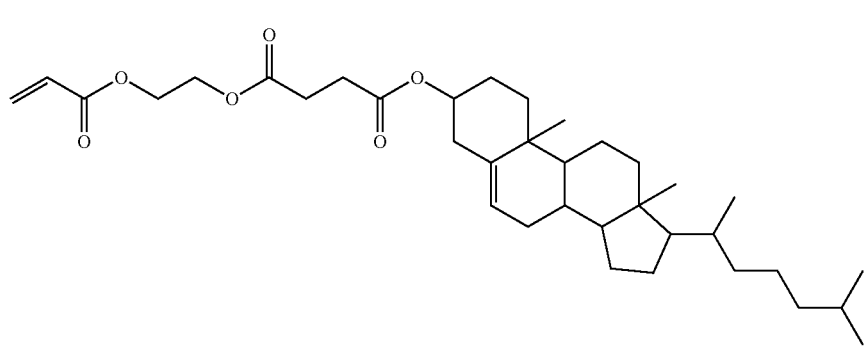

-continued

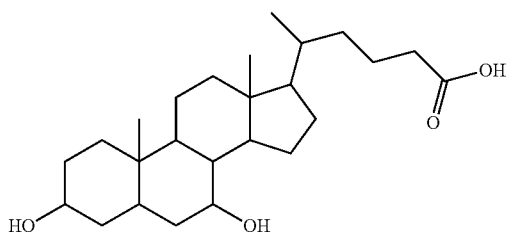
B-28

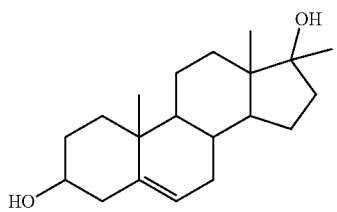
B-29

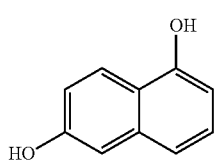
B-30

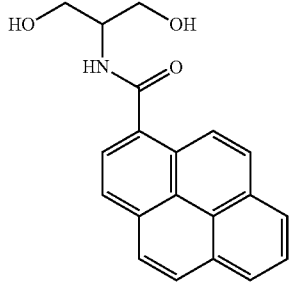
B-31

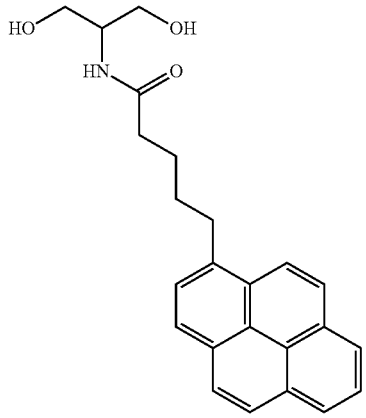
B-32

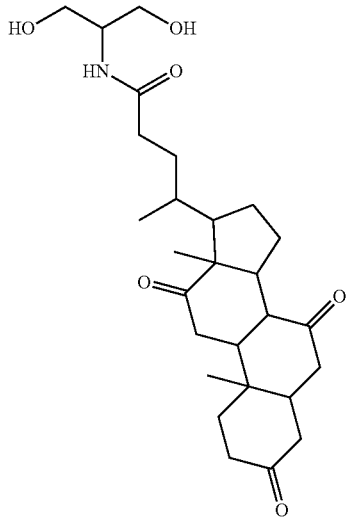
B-33

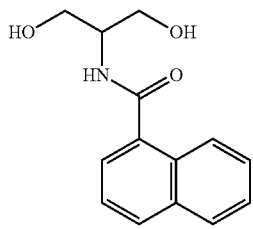
B-34

The compound having the ring structure of two or more rings can be synthesized and obtained, for example, by causing a compound having a polymerizable group (for example, a (meth)acryloyl group) to react with a compound having a ring structure of two or more rings and a reaction point (for example, a hydroxy group or a carboxy group).

The average particle size of the binder particles B is 50,000 nm or less, preferably 1000 nm or less, more preferably 500 nm or less, still more preferably 300 nm or less, and still more preferably 250 nm or less. The lower limit value is 10 nm or more, preferably 30 nm or more, more preferably 50 nm or more, and still more preferably 100 nm or more. By adjusting the size of the binder particles B to be in the above-described range, the area of a resistance film such as solid particles can be reduced, and the resistance can be reduced. That is, excellent adhesiveness and suppression of an interface resistance can be realized.

A method of measuring the average particle size of the binder particles B is the same as the method of measuring the average particle size of the binder particles A.

The mass average molecular weight of the polymer forming the binder particles B is preferably 5,000 or higher, more preferably 10,000 or higher, and still more preferably 30,000 or higher. The upper limit is practically 1,000,000 or lower, and an aspect where the polymer is crosslinked is also preferable.

The mass average molecular weight of the polymer forming the binder particles B can be measured using the same method as the method of measuring the number-average molecular weight of the polymer forming the binder particles A.

In a case where the crosslinking of the polymer progresses due to heating or voltage application, the molecular weight may be higher than the above-described molecular weight. At the start of using the all-solid state secondary battery, the mass average molecular weight of the polymer forming the binder particles B is preferably in the above-described range.

The moisture content of the polymer forming the binder used in the present invention is preferably 100 ppm (by mass) or lower. In addition, the polymer may be dried by crystallization, or the polymer solution may be used as it is. It is preferable that the amount of a metal catalyst (urethanization or polyesterification catalyst=tin, titanium, or bismuth) is small. By reducing the amount of the metal catalyst during polymerization or by removing the catalyst by crystallization, the metal concentration in the copolymer is preferably 100 ppm (by mass) or lower.

The content of the binder in the active material layer is not particularly limited. The content of the binder in the active material layer is preferably 0.1 to 50 parts by mass and more preferably 0.5 to 40 parts by mass with respect to 100 parts by mass. In a case where the active material layer includes an inorganic solid electrolyte, irrespective of the above-described content, the content of the binder in the active material layer is preferably 0.1 to 50 parts by mass, more preferably 0.5 to 40 parts by mass, and still more preferably 1 to 30 parts by mass with respect to 100 parts by mass of the inorganic solid electrolyte. In the present invention, the content of the binder is set in the above-described range. Since adhesiveness between the current collector and the active material layer is strong due to the current collector with an easily adhesive layer, the content of the binder can be reduced.

By using the binder in the above-described range, binding properties of the inorganic solid electrolyte and suppression in interface resistance can be more effectively achieved at the same time.

In the active material layer, as the binder, one kind may be used alone, or a plurality of kinds may be used in combination. In addition, the binder may be used in combination with other particles.

The binder used in the present invention can be prepared using an ordinary method.

In addition, the binder can also be used as a dispersion liquid in which the binder particles are dispersed. Examples of forming particles using the binder include a method of forming binder particles during a polymerization reaction and a method of precipitating the binder resin in a polymerization reaction solution to form particles.

<Solid Electrolyte>

The active material layer may include a solid electrolyte. In a case where the electrode according to the embodiment of the present invention is used for an all-solid state secondary battery, it is preferable that the active material layer includes a solid electrolyte.

The solid electrolyte refers to a solid-form electrolyte capable of migrating ions therein. The solid electrolyte only has to have conductivity of an ion of a metal belonging to Group 1 or Group 2 in the periodic table. Examples of the solid electrolyte include an organic solid electrolyte and an inorganic solid electrolyte. Among these, an inorganic solid electrolyte is preferable.

—Organic Solid Electrolyte—

As the organic solid electrolyte, an organic solid electrolyte that is typically used for a secondary battery can be used without any particular limitation. Examples of the organic solid electrolyte include a polymer electrolyte. For example, the polymer electrolyte consists of an electrolyte salt and a polymer that dissolves the electrolyte salt to impart ion conductivity to the polymer electrolyte.

The polymer forming the polymer electrolyte only has to function as an ionic conductor together with the electrolyte salt. Examples of the polymer include a polymer that is typically used in a polymer electrolyte for a secondary battery. Specific examples of the polymer include polyether, polysiloxane, polyester, polycarbonate, polyurethane, polyurea, and polyacrylate. Among these, polyethylene oxide (polyethylene glycol), polypropylene oxide (polypropylene glycol), polyether such as polytetramethylene ether glycol (polytetrahydrofuran), polysiloxane such as polydimethylsiloxane, polymethyl methacrylate, or polyacrylate such as polyacrylic acid, or polycarbonate is preferable.

The electrolyte salt forming the polymer electrolyte is a salt including an ion of a metal belonging to Group 1 or Group 2 in the periodic table. The electrolyte salt is a metal salt that dissociates (generates) an ion of a metal belonging to Group 1 or Group 2 in the periodic table as an ion moving between the positive electrode and the negative electrode by charging and discharging the all-solid state secondary battery. The electrolyte salt dissolves the above-described polymer to exhibit ion conductivity together with the polymer.

The electrolyte salt is not particularly limited as long as it exhibits the above-described ion conductivity, and examples thereof include an electrolyte salt that is typically used in a polymer electrolyte for an all-solid state secondary battery.

In particular, a lithium salt is preferable, and a metal salt (lithium salt) selected from the following (a-1) or (a-2) is preferable.

$$\mathrm{Li}A_xD_y \quad \text{(a-1):}$$

A represents P, B, As, Sb, Cl, Br, I, or a combination of two or more elements selected from P, B, As, Sb, Cl, Br, and I. D represents F or O. x represents 1 to 6 and more preferably 1 to 3. y represents 1 to 12 and more preferably 4 to 6.

Specific preferable examples of the metal salt represented by $\mathrm{Li}_xAD_y$ include an inorganic fluoride salt selected from $\mathrm{LiPF}_6$, $\mathrm{LiBF}_4$, $\mathrm{LiAsF}_6$, or $\mathrm{LiSbF}_6$ and a perhalogenate salt selected from $\mathrm{LiClO}_4$, $\mathrm{LiBrO}_4$, or $\mathrm{LiO}_4$.

$$\mathrm{LiN}(R^f SO_2)_2 \quad \text{(a-2):}$$

$R^f$ represents a fluorine atom or a perfluoroalkyl group. The number of carbon atoms in the perfluoroalkyl group is preferably 1 to 4 and more preferably 1 or 2.

Specific preferable examples of the metal salt represented by $\mathrm{LiN}(R^f SO_2)_2$ include a perfluoroalkane sulfonylimide salt selected from $\mathrm{LiN}(CF_3SO_2)_2$, $\mathrm{LiN}(CF_3CF_2SO_2)_2$, $\mathrm{LiN}(FSO_2)_2$, or $\mathrm{LiN}(CF_3SO_2)(C_4F_9SO_2)$.

Among the above-described examples, from the viewpoint of ion conductivity, the electrolyte salt is preferably a metal salt selected from $\mathrm{LiPF}_6$, $\mathrm{LiBF}_4$, $\mathrm{LiCO}_4$, $\mathrm{LiBrO}_4$, $\mathrm{LiN}(CF_3SO_2)_2$, $\mathrm{LiN}(FSO_2)_2$, or $\mathrm{LiN}(CF_3SO_2)(C_4F_9SO_2)$, more preferably a metal salt selected from $\mathrm{LiPF}_6$, $\mathrm{LiBF}_4$, $\mathrm{LiClO}_4$, $\mathrm{LiN}(CF_3SO_2)_2$, or $\mathrm{LiN}(FSO_2)_2$, and still more preferably a metal salt selected from $\mathrm{LiClO}_4$, $\mathrm{LiN}(CF_3SO_2)_2$, or $\mathrm{LiN}(FSO_2)_2$.

As each of the polymer and the electrolyte salt, one kind may be included, or two or more kinds may be included.

Regarding the content of the organic solid electrolyte in the active material layer, the total content of the organic solid electrolyte and the active material to be used in combination is preferably 0.01% to 50 mass % and more preferably 0.05% to 40 mass %. A mass ratio (polymer:electrolyte salt) of the polymer to the electrolyte salt is preferably 1:0.05 to 2.50 and more preferably 1:0.3 to 1.

—Inorganic Solid Electrolyte—

In the present invention, the inorganic solid electrolyte is an inorganic solid electrolyte and does not include an organic matter as a main ion conductive material. Therefore, the inorganic solid electrolyte is clearly distinguished from the above-described organic solid electrolyte. In addition, the inorganic solid electrolyte is solid in a steady state and thus, typically, is not dissociated or liberated into cations and anions. Due to this fact, the inorganic solid electrolyte is also clearly distinguished from inorganic electrolyte salts of which cations and anions are dissociated or liberated in electrolytic solutions or polymers ($LiPF_6$, $LiBF_4$, lithium bis(fluorosulfonyl)imide (LiFSI), LiCl, and the like). The inorganic solid electrolyte is not particularly limited as long as it has ion conductivity of a metal belonging to Group 1 or Group 2 in the periodic table and generally does not have electron conductivity. In a case where an (all-solid state) secondary battery according to the embodiment of the present invention is a lithium ion battery, the inorganic solid electrolyte preferably has ion conductivity of lithium ions.

The inorganic solid electrolyte can be appropriately selected from solid electrolyte materials that are typically used for a secondary battery. Examples of the inorganic solid electrolyte include (i) a sulfide-based inorganic solid electrolyte, (ii) an oxide-based inorganic solid electrolyte, (iii) a halide-based inorganic solid electrolyte, and (iv) a hydride-based Inorganic solid electrolyte. From the viewpoint that a more favorable interface can be formed between the active material and the inorganic solid electrolyte, a sulfide-based inorganic solid electrolyte is preferable.

(i) Sulfide-Based Inorganic Solid Electrolyte

The sulfide-based inorganic solid electrolyte is preferably a compound that contains a sulfur atom, has ion conductivity of a metal belonging to Group 1 or Group 2 in the periodic table, and has electron-insulating properties. The sulfide-based inorganic solid electrolyte is preferably an inorganic solid electrolyte that contains at least Li, S, and P as elements and has lithium ion conductivity. However, the sulfide-based inorganic solid electrolyte may include elements other than Li, S, and P depending on the purposes or cases.

Examples of the sulfide-based inorganic solid electrolyte include a lithium ion-conductive inorganic solid electrolyte satisfying a composition represented by Formula (1).

$$L_{a1}M_{b1}P_{c1}S_{d1}A_{e1} \quad (1)$$

In the formula, L represents an element selected from Li, Na, or K and is preferably Li. M represents an element selected from B, Zn, Sn, Si, Cu, Ga, Sb, Al, or Ge. A represents an element selected from I, Br, Cl, or F, and a1 to e1 represent the compositional ratios among the respective elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios among the respective elements can be controlled by adjusting the mixing amounts of raw material compounds to manufacture the sulfide-based inorganic solid electrolyte as described below.

The sulfide-based inorganic solid electrolyte may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio between $Li_2S$ and $P_2S_5$ in Li—P—S-based glass and Li—P—S-based glass ceramic is preferably 60:40 to 90:10 and more preferably 68:32 to 78:22 in terms of the molar ratio between $Li_2S:P_2S_5$. In a case where the ratio between $Li_2S$ and $P_2S_5$ is set in the above-described range, it is possible to increase the lithium ion conductivity. Specifically, the lithium ion conductivity can be preferably set to $1\times10^{-4}$ S/cm or more and more preferably set to $1\times10^{-3}$ S/cm or more. The upper limit is not particularly limited, but realistically $1\times10^{-1}$ S/cm or less.

As specific examples of the sulfide-based inorganic solid electrolytes, combination examples of raw materials will be described below. Examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. Mixing ratios of the respective raw materials do not matter. Examples of a method for synthesizing the sulfide-based inorganic solid electrolyte material using the above-described raw material compositions include an amorphization method. Examples of the amorphization method include a mechanical milling method, a solution method, and a melting quenching method. This is because treatments at a normal temperature become possible, and it is possible to simplify manufacturing steps.

(ii) Oxide-Based Inorganic Solid Electrolyte

The oxide-based inorganic solid electrolyte is preferably a compound that contains an oxygen atom, has ion conductivity of a metal belonging to Group 1 or Group 2 in the periodic table, and has electron-insulating properties.

The ion conductivity of the oxide-based inorganic solid electrolyte is preferably $1\times10^{-6}$ S/cm or more, more preferably $5\times10^{-6}$ S/cm or more, and particularly preferably $1\times10^{-5}$ S/cm or more. The upper limit is not particularly limited, but realistically $1\times10^{-3}$ S/cm or less.

Specific examples of the compound include: $Li_{xa}La_{ya}TiO_3$ (xa satisfies $0.3 \le xa \le 0.7$ and ya satisfies $0.3 \le ya \le 0.7$) (LLT); $Li_{xb}La_{yb}Zr_{zb}M^{bb}{}_{mb}O_{nb}$ ($M^{bb}$ represents at least one element selected from Al, Mg, Ca, Sr, V, Nb, Ta, Ti, Ge, In, or Sn, xb satisfies $5 \le xb \le 10$, yb satisfies $1 \le yb \le 4$, zb satisfies $1 \le zb \le 4$, mb satisfies $0 \le mb \le 2$, and nb satisfies $5 \le nb \le 20$.); $Li_{xc}B_{yc}M^{cc}{}_{zc}O_{nc}$ ($M^{cc}$ represents at least one element selected from C, S, Al, Si, Ga, Ge, In, or Sn, xc satisfies $0 < xc \le 5$, yc satisfies $0 < yc \le 1$, zc satisfies $0 < zc \le 1$, and ne satisfies $0 < nc \le 6$); $Li_{xd}(Al,Ga)_{yd}(Ti,Ge)_{zd}Si_{ad}P_{md}O_{nd}$ (xd satisfies $1 \le xd \le 3$, yd satisfies $0 \le yd \le 1$, zd satisfies $0 \le zd \le 2$, ad satisfies $0 \le ad \le 1$, md satisfies $1 \le md \le 7$, and nd satisfies $3 \leq nd \leq 13$); $Li_{(3-2xc)}M^{cc}_{xc}D^{cc}O$ (xe represents a number of 0 to 0.1, $M^{ee}$ represents a divalent metal atom, and $D^{ee}$ represents a halogen atom or a combination of two or more halogen atoms); $Li_{xf}Si_{yf}O_{zf}$ (xf satisfies $1 \leq xf \leq 5$, yf satisfies $0 < yf \leq 3$, and zf satisfies $1 \leq zf \leq 10$); $Li_{xg}S_{yg}O_{zg}$ (xg satisfies $1 \leq xg \leq 3$, yg satisfies $0 < yg \leq 2$, and zg satisfies $1 \leq zg \leq 10$); $Li_3BO_3$; $Li_3BO_3$—$Li_2SO_4$; $Li_2O$—$B_2O_3$—$P_2O_5$; $Li_2O$—$SiO_2$; $Li_6BaLa_2Ta_2O_{12}$; $Li_3PO_{(4-3/2w)}N_w$ (w satisfies w<1); $Li_{3.5}Zn_{0.25}GeO_4$ having a lithium super ionic conductor (LISICON)-type crystal structure; $La_{0.55}Li_{0.35}TiO_3$ having a perovskite-type crystal structure; $LiTi_2P_3O_{12}$ having a natrium super ionic conductor (NASICON)-type crystal structure; $Li_{1+xh+yh}(Al,Ga)_{xh}(Ti,Ge)_{2-xh}Si_{yh}P_{3-yh}O_{12}$ (xh represents $0 \leq xh \leq 1$, and yh represents $0 \leq yh \leq 1$); and $Li_7La_3Zr_2O_{12}$ (LLZ) having a garnet-type crystal structure.

In addition, phosphorus compounds containing Li, P, and O are also desirable. Examples of the phosphorus compound include: lithium phosphate ($Li_3PO_4$); LiPON in which some of oxygen elements in lithium phosphate are substituted with nitrogen elements; and $LiPOD^1$ ($D^1$ preferably represents one or more elements selected from Ti, V, Cr, Mn, Fe, Co, Ni, Cu, Zr, Nb, Mo, Ru, Ag, Ta, W, Pt, or Au).

Further, for example, $LiA^1ON$ ($A^1$ represents one or more elements selected from Si, B, Ge, Al, C, or Ga) can be preferably used.

(iii) Halide-Based Inorganic Solid Electrolyte

The halide-based inorganic solid electrolyte is preferably a compound that contains a halogen atom, has ion conductivity of a metal belonging to Group 1 or Group 2 in the periodic table, and has electron-insulating properties.

The halide-based inorganic solid electrolyte is not particularly limited, and examples thereof include LiCl, LiBr, LiI, and compounds such as $Li_3YBr_6$ or $Li_3YCl_6$ described in ADVANCED MATERIALS, 2018, 30, 1803075. In particular, $Li_3YBr_6$ or $Li_3YCl_6$ is preferable.

(iv) Hydride-Based Inorganic Solid Electrolyte

The hydride-based inorganic solid electrolyte is preferably a compound that contains a hydrogen atom, has ion conductivity of a metal belonging to Group 1 or Group 2 in the periodic table, and has electron-insulating properties.

The hydride-based inorganic solid electrolyte is not particularly limited, and examples thereof include $LiBH_4$, $Li_4(BH_4)_3I$, and $3LiBH_4$—LiCl.

The inorganic solid electrolyte is preferably in the form of particles. In this case, the volume average particle size of the inorganic solid electrolyte is not particularly limited, but is preferably 0.01 μm or more and more preferably 0.1 μm or more. The upper limit is preferably 100 μm or less and more preferably 50 μm or less. The volume average particle size of the inorganic solid electrolyte is measured in the following order. The inorganic solid electrolyte particles are diluted using water (heptane in a case where the inorganic solid electrolyte is unstable in water) in a 20 mL sample bottle to prepare 1 mass % of a dispersion liquid. The diluted dispersion specimen is irradiated with 1 kHz ultrasonic waves for 10 minutes and is then immediately used for testing. The volume average particle size is obtained by acquiring data 50 times using this dispersion liquid specimen, a laser diffraction/scattering particle size distribution analyzer LA-920 (trade name, manufactured by Horiba Ltd.), and a quartz cell for measurement at a temperature of 25° C. Other detailed conditions and the like can be found in JIS Z8828: 2013 "Particle Size Analysis-Dynamic Light Scattering" as necessary. For each level, five specimens are prepared and the average value thereof is adopted.

As the inorganic solid electrolyte, one kind may be used alone, or two or more kinds may be used in combination.

In a case where a solid electrolyte layer is formed, the mass (mg) of the inorganic solid electrolyte per unit area ($cm^2$) of the solid electrolyte layer (weight per unit area) is not particularly limited. The mass (mg) of the inorganic solid electrolyte can be appropriately determined depending on the designed battery capacity and may be, for example, 1 to 100 mg/$cm^2$.

Here, in a case where the solid electrolyte layer includes the above-described active material, regarding the weight of the inorganic solid electrolyte per unit area, the total amount of the active material and the inorganic solid electrolyte is preferably in the above-described range.

From the viewpoints of dispersibility, a reduction in interface resistance, and binding properties, the total content of the inorganic solid electrolyte and the active material to be used in combination in the active material layer is preferably 50% to 99.9 mass %, more preferably 60% to 99.5 mass %, and still more preferably 70% to 99 mass %.

<Additives>

As components other than the respective components described above, the solid electrolyte composition according to the embodiment of the present invention may optionally include additives such as an ionic liquid, a lithium salt (supporting electrolyte), a thickener, a crosslinking agent (an agent causing a crosslinking reaction by radical polymerization, condensation polymerization, or ring-opening polymerization), a polymerization initiator (an agent that generates an acid or a radical by heat or light), an antifoaming agent, a leveling agent, a dehydrating agent, or an antioxidant in an appropriate content.

The lithium salt is preferably a lithium salt typically used for this kind of product and is not particularly limited. For example, a lithium salt described in paragraphs "0082" to "0085" of JP2015-088486A is preferable. The ionic liquid is added to improved the ion conductivity, and a well-known material can be used without any particular limitation.

[Method of Manufacturing Electrode (Electrode Sheet)]

A method of manufacturing the electrode according to the embodiment of the present invention is not particularly limited as long as it is a method capable of incorporating the polymer forming the easily adhesive layer into the active material layer using the current collector with an easily adhesive layer according to the embodiment of the present invention. A preferable manufacturing method include: preparing an active material layer-forming composition including an electrode active material and a solvent that has a C log P value of 2.0 or higher and in which the solubility of the polymer in the easily adhesive layer of the current collector with an easily adhesive layer is 1 g/100 g or higher; and forming a film on the easily adhesive layer of the current collector with an easily adhesive layer using the obtained active material layer-forming composition. In this method, the current collector, the easily adhesive layer-forming composition, and the active material layer-forming composition can be used in combination. In the process of forming the film using the active material layer-forming composition, by applying the active material layer-forming composition to the surface of the easily adhesive layer and redissolving the polymer forming the easily adhesive layer in the solvent in the active material layer-forming composition, the polymer is incorporated into the active material layer-forming composition, and then the active material layer-forming composition is dried. As a result, the electrode according to the embodiment of the present invention can be prepared.

In the method of manufacturing the electrode according to the embodiment of the present invention, the solvent used for preparing the active material layer-forming composition is selected depending on the polymer of the easily adhesive layer-forming composition (easily adhesive layer). That is, the solvent that has a C log P value of 2.0 or higher and dissolves the polymer in the easily adhesive layer formed on the current collector with a solubility (25° C.) of 1 g/100 g or higher is selected. The solubility of the solvent (25° C.) is as described above, and a preferable range thereof is the same. The C log P value of the solvent is 2.0 or higher. In a case where the solvent having a C log P value of 2.0 or higher is used, the above-described polymer is rapidly redissolved and deterioration in the solid electrolyte is suppressed such that the adhesiveness and the battery characteristics described above can be simultaneously achieved. The C log P value of the solvent is preferably 2 to 4.5.

The solvent having a C log P value of 2.0 or higher is typically a solvent having low polarity and hydrophobicity. Various solvents can be used as long as they satisfy the above-described condition. For example, various organic solvents such as an ether compound, a ketone compound, an aromatic compound, an aliphatic compound, or an ester compound are preferable, and specific examples thereof are as follows.

Examples of the ether compound include dibutyl ether (C log P=2.57), dihexyl ether (C log P=4.24), diisoamyl ether (C log P=3.41), and anisole (C log P=2.08).

Examples of the ketone compound include dipropyl ketone (C log P=2.34), dibutyl ketone (C log P=3.6), diisobutyl ketone (C log P=3.48), 2-decanone (C log P=4.01), and diisopropyl ketone (C log P=2.64).

Examples of the aromatic compound include toluene (C log P=2.52), ethylbenzene (C log P=2.94), and xylene (C log P=3.01).

Examples of the aliphatic compound include heptane (C log P=3.42), octane (C log P=3.84), cyclohexane (C log P=2.5), cyclooctane (C log P=3.34), methylcyclohexane (C log P=2.83), and ethylcyclohexane (C log P=3.25).

Examples of the ester compound include butyl butyrate (C log P=2.27), pentyl butyrate (C log P=2.69), isobutyl isobutyrate (C log P=2.4), and pentyl propionate (C log P=2.27).

Examples of a non-aqueous dispersion medium include the solvents described above.

In the present invention, in particular, a ketone compound, an aromatic compound, an aliphatic compound, or an ester compound is preferable, and a ketone compound, an aromatic compound, or an ester compound is more preferable.

The boiling point of the solvent under normal pressure (I atm) is preferably 50° C. or higher and more preferably 70° C. or higher. The upper limit is more preferably 250° C. or lower and still more preferably 220° C. or lower.

As the solvent, one kind may be used alone, or two or more kinds may be used in combination.

In the present invention, the content of the solvent in the active material layer-forming composition can be appropriately set without being particularly limited. For example, the content of the solvent in the active material layer-forming composition is preferably 15% to 99 mass %, more preferably 20% to 70 mass %, and still more preferably 25% to 60 mass %.

Various components such as the active material, the solid electrolyte, the conductive auxiliary agent, or the additives in the active material layer-forming composition are as described above. The content of each of the components in the active material layer-forming composition is the same as that in the above-described active material layer as the content with respect to 100 mass % of the solid content (solid component) of the active material layer-forming composition.

The active material layer-forming composition can be prepared by mixing the above-described respective components and the solvent using an ordinary method. A mixing method is not particularly limited, and the components may be mixed at once or sequentially. The binder may be mixed as it is or in the form of a dispersion liquid. The mixing environment is not particularly limited, and examples thereof include the atmosphere, dry air (dew point: −20° C. or lower), and inert gas (for example, argon gas, helium gas, or nitrogen gas).

In the method of manufacturing the electrode according to the embodiment of the present invention, a film is formed on the surface of the easily adhesive layer in the current collector with an easily adhesive layer using the active material layer-forming composition. It is preferable that the film is formed by applying and drying the active material layer-forming composition. As a result, the easily adhesive layer disappears and the active material layer is strongly adhered to the surface of the current collector such that the electrode according to the embodiment of the present invention can be prepared.

A method of applying the active material layer-forming composition is not particularly limited and is the same as the method of applying the easily adhesive layer-forming composition. In addition, a method (condition) of drying the active material layer-forming composition is not particularly limited as long as it is a method (condition) capable of incorporating the polymer in the easily adhesive layer into the active material, and can be appropriately selected from the method (condition) of drying the easily adhesive layer-forming composition depending on the kind of the polymer, the kind of the solvent, and the like. In order to redissolve the polymer in the easily adhesive layer, the active material layer-forming composition may be dried after maintaining the state where the active material layer-forming composition is applied to the easily adhesive layer for a while.

In the method of manufacturing the electrode according to the embodiment of the present invention, the obtained electrode (active material layer) can also be pressurized. Pressurization conditions or the like will be described below regarding the method of manufacturing an all-solid state secondary battery. The pressurization pressure can be set to be lower than that applied to the all-solid state secondary battery and can be set to be, for example, 2 to 100 MPa.

[Secondary Battery]

The secondary battery including the electrode according to the embodiment of the present invention may be a secondary battery including a liquid electrolyte as an electrolyte or may be an all-solid state secondary battery including a solid electrolyte layer as an electrolyte. As described above, it is preferable that the secondary battery including the electrode according to the embodiment of the present invention is the all-solid state secondary battery having various advantageous effects such as safety.

The secondary battery including a liquid electrolyte is the same as a typical secondary battery, except that the electrode according to the embodiment of the present invention is used. Hereinafter, the all-solid state secondary battery will be described below in detail.

—All-Solid State Secondary Battery—

The all-solid state secondary battery according to the embodiment of the present invention includes: a positive electrode (a positive electrode current collector and a positive electrode active material layer); a negative electrode (a negative electrode active material layer and a negative electrode current collector) that faces the positive electrode; and a solid electrolyte layer that is disposed between the positive electrode (positive electrode active material layer) and the negative electrode (negative electrode active material layer). In the present invention, at least one of the positive electrode or the negative electrode and preferably both of the positive electrode and the negative electrode are configured with the electrode (electrode sheet) according to the embodiment of the present invention. The current collector and the active material layer are the same as those in the electrode according to the embodiment of the present invention. In a case where one of the positive electrode or the negative electrode is not formed using the electrode according to the embodiment of the present invention, this electrode can be formed using a well-known solid electrolyte composition including an active material.

The solid electrolyte layer is formed using, for example, a typical solid electrolyte composition including a solid electrolyte.

The thicknesses of the negative electrode active material layer, the solid electrolyte layer, and the positive electrode active material layer are not particularly limited respectively. In consideration of the dimension of a general all-solid state secondary battery, each of the thicknesses of the respective layers is preferably 10 to 1,000 µm and more preferably 20 µm or more and less than 500 µm. In the all-solid state secondary battery according to the embodiment of the present invention, the thickness of at least one layer of the positive electrode active material layer or the negative electrode active material layer is still more preferably 50 µm or more and less than 500 µm.

[Case]

Depending on uses, the all-solid state secondary battery according to the embodiment of the present invention may be used as the all-solid state secondary battery having the above-described structure as it is but is preferably sealed in an appropriate case to be used in the form of a dry cell. The case may be a metallic case or a resin (plastic) case. In a case where a metallic case is used, examples thereof include an aluminum alloy case and a stainless steel case. It is preferable that the metallic case is classified into a positive electrode-side case and a negative electrode-side case and that the positive electrode-side case and the negative electrode-side case are electrically connected to the positive electrode current collector and the negative electrode current collector, respectively. The positive electrode-side case and the negative electrode-side case are preferably integrated by being joined together through a gasket for short-circuit prevention.

Hereinafter, an all-solid state secondary battery according to a preferred embodiment of the present invention will be described with reference to FIG. 2, but the present invention is not limited thereto.

Figure 2:
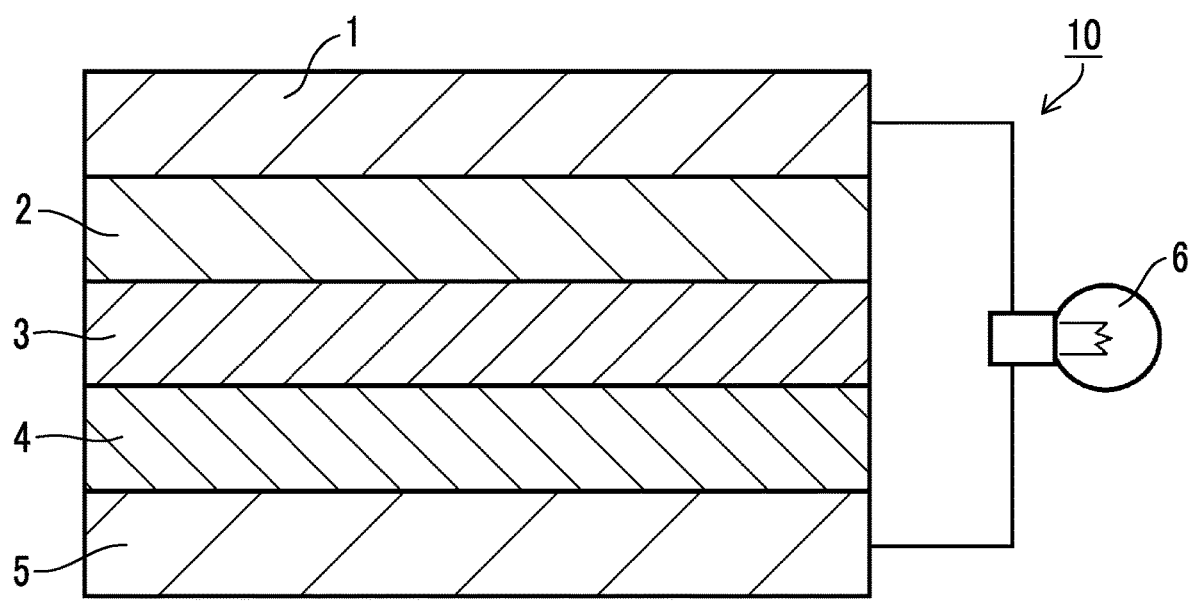
FIG. 2 is a vertical cross-sectional view schematically showing an all-solid state secondary battery according to a preferred embodiment of the present invention.

FIG. 2 is a cross-sectional view schematically showing the all-solid state secondary battery (lithium ion secondary battery) according to the preferred embodiment of the present invention. In an all-solid state secondary battery 10 according to the embodiment is a secondary battery in which both the positive electrode and the negative electrode are formed using the electrode (aspect in which the easily adhesive layer disappears) according to the embodiment of the present invention, and the easily adhesive layer is not shown in FIG. 2. In the case of being seen from the negative electrode side, the all-solid state secondary battery 10 includes a negative electrode current collector 1, a negative electrode active material layer 2, a solid electrolyte layer 3, a positive electrode active material layer 4, and a positive electrode current collector 5 in this order. The respective layers are in contact with one another and adjacent to each other. In a case in which the above-described structure is adopted, during charging, electrons (e) are supplied to the negative electrode side, and lithium ions ($Li^+$) are accumulated in the negative electrode side. On the other hand, during discharging, the lithium ions ($Li^+$) accumulated in the negative electrode side return to the positive electrode, and electrons are supplied to an operation portion 6. In an example shown in the drawing, an electric bulb is adopted as a model of the operation portion 6 and is lit by discharging.

In the present invention, a functional layer, a member, or the like may be appropriately interposed or disposed between the respective layers of the negative electrode current collector, the negative electrode active material layer, the solid electrolyte layer, the positive electrode active material layer, and the positive electrode current collector or on the outside thereof. In addition, each of the layers may have a single-layer structure or a multi-layer structure.

The all-solid state secondary battery according to the embodiment of the present invention includes the electrode according to the embodiment of the present invention. Therefore, as described above, the current collector and the active material layer can be strongly adhered to each other, peeling of the active material layer from the current collector can be prevented, and high battery performance can be exhibited.

—Use of Secondary Battery—

The secondary battery according to the embodiment of the present invention, in particular, the all-solid state secondary battery has the above-described excellent characteristics and can be applied to various uses. Application aspects are not particularly limited, and, in the case of being mounted in electronic apparatuses, examples of the electronic apparatuses include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, memory cards, portable tape recorders, radios, and backup power supplies. In addition, examples of an electronic apparatus for consumer use include an automobile, an electromotive vehicle, a motor, a lighting device, a toy, a game device, a load conditioner, a timepiece, a strobe, a camera, a medical device (for example, a pacemaker, a hearing aid, or a shoulder massager). Further, the all-solid state secondary battery can be used as various cells for use in military or aerospace applications. In addition, the all-solid state secondary battery can also be combined with solar batteries.

In particular, using the above-described excellent characteristics, it is preferable that the secondary battery according to the embodiment of the present invention is mounted on the above-described various electronic apparatuses and the automobile. An electronic apparatus and an electric vehicle on which the secondary battery according to the embodiment of the present invention is mounted using a typical method exhibit excellent battery performance.

[Method of Manufacturing Secondary Battery]

A method of manufacturing the secondary battery according to the embodiment of the present invention is not particularly limited as long as it is a method of manufacturing a secondary battery using the electrode according to the embodiment of the present invention, that is, a method of manufacturing a secondary battery through the method of manufacturing the electrode according to the embodiment of the present invention. The secondary battery according to the embodiment of the present invention can be manufactured with a well-known method using the electrode according to the embodiment of the present invention.

—Method of Manufacturing all-Solid State Secondary Battery—

Hereinafter, a method of manufacturing the all-solid state secondary battery will be described below in detail.

The method of manufacturing the all-solid state secondary battery according to the embodiment of the present invention is a method of manufacturing an all-solid state secondary battery through the method of manufacturing the electrode according to the embodiment of the present invention. For example, the all-solid state secondary battery can be manufactured by manufacturing the electrode according to the embodiment of the present invention and forming a solid electrolyte layer using the electrode. Specifically, the solid electrolyte layer may be formed on the electrode or may be disposed or transferred to the electrode. By laminating another electrode on the solid electrolyte layer formed as described above, an all-solid state secondary battery is formed. As long as the electrode according to the embodiment of the present invention is used as at least one electrode, a typical electrode (a laminate including a current collector and an active material layer) may be prepared and used as another electrode. Preferable examples of the manufacturing method include a method including: preparing the electrode according to the embodiment of the present invention as a positive electrode and a negative electrode; and disposing a solid electrolyte layer between the electrodes.

The solid electrolyte layer can be formed, for example, by preparing a solid electrolyte composition and applying and drying the solid electrolyte composition. The solid electrolyte composition is a composition including a solid electrolyte, preferably a dispersion medium and a binder, and optionally the above-described additives, and is preferably a slurry. Components in the solid electrolyte composition are as described above. Examples of the dispersion medium include dispersion media that are typically used, and various solvents that are typically used for forming a solid electrolyte layer can be used irrespective of C log P values.

The moisture content (also referred to as "water content") in the solid electrolyte composition according to the embodiment of the present invention is not particularly limited and is preferably 500 ppm or lower, more preferably 200 ppm or lower, still more preferably 100 ppm or lower, and still more preferably 50 ppm or lower. The moisture content refers to the amount of water (the mass ratio thereof to the solid electrolyte composition) in the solid electrolyte composition and specifically is a value measured by Karl Fischer titration after filtering the solid electrolyte composition the through a membrane filter having a pore size of 0.02 µm.

<Formation of Solid Electrolyte Layer (Film Formation)>

A method of applying the solid electrolyte composition is not particularly limited and is the same as the method of applying the above-described easily adhesive layer-forming composition. In addition, a method (condition) of drying the solid electrolyte composition is also not particularly limited and is the same as the method (condition) of drying the above-described easily adhesive layer-forming composition.

It is preferable that the film formed of the solid electrolyte composition or the manufactured all-solid state secondary battery is pressurized. Examples of the pressurization method include a method using a hydraulic cylinder pressing machine. The pressurization pressure is not particularly limited, but is, generally, preferably in a range of 50 to 1,500 MPa.

The pressurization can also be performed during the heating of the solid electrolyte composition. The heating temperature is not particularly limited, but is generally in a range of 30° C. to 300° C. The respective layers or the all-solid state secondary battery can also be pressed at a temperature higher than the glass transition temperature of the inorganic solid electrolyte. On the other hand, in a case where the inorganic solid electrolyte and the binder are present together, the respective layers or the all-solid state secondary battery can also be pressed at a temperature higher than the glass transition temperature of the above-described resin forming the binder. The pressurization may be performed in a state in which the dispersion medium has been dried in advance or in a state in which the dispersion medium remains.

The atmosphere during the pressurization is not particularly limited and may be any one of atmosphere, dr air, or an inert gas. The pressing time may be a short time (for example, within several hours) at a high pressure or a long time (one day or longer) under the application of an intermediate pressure. In addition, in a case where the all-solid state secondary battery is pressurized, a restraining device (for example, a screw fastening pressure) can also be used in order to continuously apply an intermediate pressure.

The pressing pressure may be homogeneous or variable with respect to a pressed portion. In this case, the pressing pressure may be variable depending on the area or the thickness of the pressed portion. In addition, the same portion can be pressurized stepwise at different pressures. A pressing surface may be smooth or roughened.

<Initialization>

The secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure up to a pressure at which the secondary battery is ordinarily used.

EXAMPLES

Hereinafter, the present invention will be described in more detail based on Examples but is not limited to these examples. "Parts" and "%" that represent compositions in the following examples are mass-based unless particularly otherwise described. In the present invention, "room temperature" refers to 25° C.

Binders and inorganic solid electrolytes used in Examples and Comparative Examples were synthesized as follows.

Synthesis Example of Particle Binder a 7.2 g of a 40 mass % heptane solution of the following macromonomer M-1, 12.4 g of methyl acrylate (the exemplary compound A-3, manufactured by FUJIFILM Wako Pure Chemical Corporation), 6.7 g of acrylic acid (the exemplary compound A-1, manufactured by FUJIFILM Wako Pure Chemical Corporation), 207 g of heptane (manufactured by FUJIFILM Wako Pure Chemical Corporation), and 1.4 g of azoisobutyronitrile were added to a 2 L three-neck flask equipped with a reflux cooling pipe and a gas introduction coke, nitrogen gas was introduced at a flow rate of 200 mL/min for 10 minutes, and the solution was heated to 100° C. A liquid (a solution in which 93.1 g of a 40 mass % heptane solution of the macromonomer M-1, 222.8 g of methyl acrylate, 120.0 g of acrylic acid, 300.0 g of heptane, and 2.1 g of azoisobutyronitrile were mixed with each other) prepared in a separate container was added dropwise to the solution for 4 hours. After completion of the dropwise addition, 0.5 g of azoisobutyronitrile was added. Next, the solution was stirred at 100° C. for 2 hours, was value was 9.3, and the number-average molecular weight was 11000.

Estimated structural formulae of the polymer forming the particle binder A and the macromonomer M-1 are shown below.

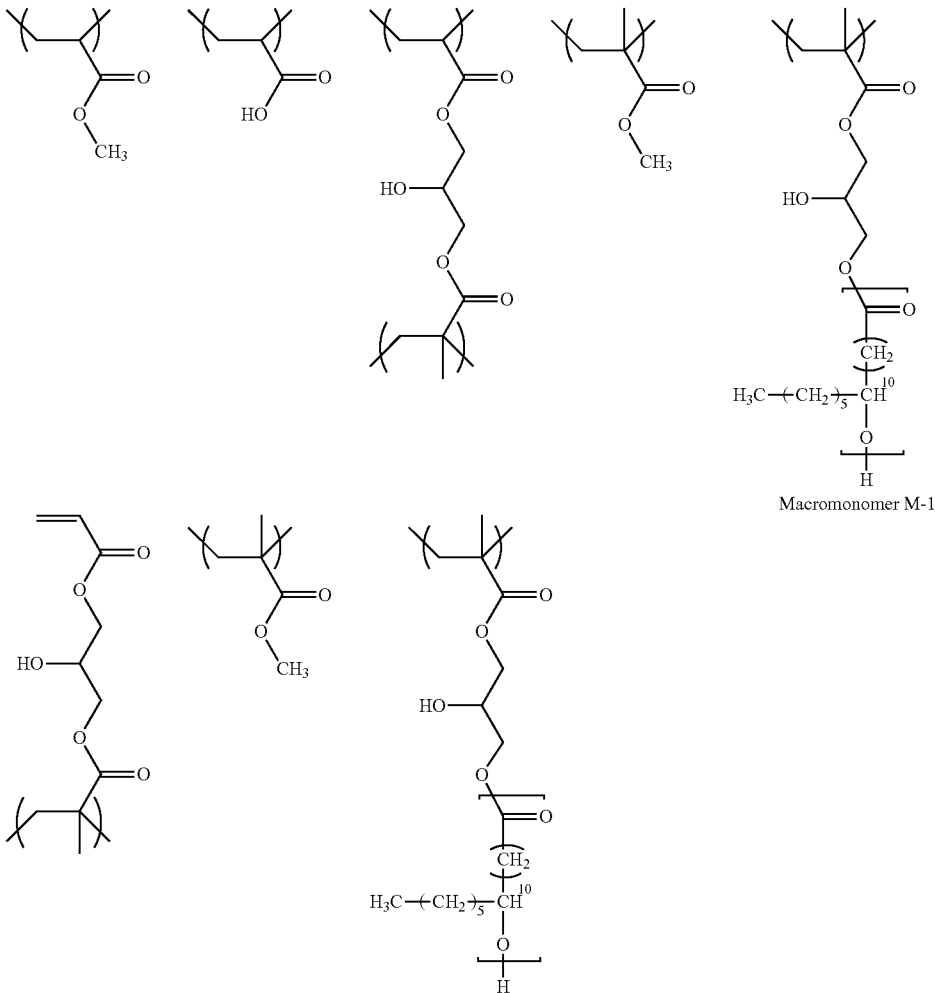

Macromonomer M-1 cooled to room temperature, and was filtered. As a result, a dispersion liquid of a particle binder A was obtained. The concentration of solid contents was 39.2%.

The average particle size of the particle binder A was 0.15 μm. In addition, in a resin forming the particle binder A, the mass average molecular weight of is 100000, and the glass transition temperature was −5° C.

(Synthesis Example of Macromonomer M-1)

Glycidyl methacrylate (manufactured by Tokyo Chemical Industry Co., Ltd.) was caused to react with a self condensate (GPC polystyrene standard number-average molecular weight: 2,000) of 12-hydroxystearic acid (manufactured by FUJIFILM Wako Pure Chemical Corporation) to obtain a macromonomer. This macromonomer, methyl methacrylate, and glycidyl methacrylate (manufactured by Tokyo Chemical Industry Co., Ltd.) were polymerized at a ratio (molar ratio) of 1:0.99:0.01 to obtain a polymer. The obtained polymer was caused to react with acrylic acid (manufactured by FUJIFILM Wako Pure Chemical Corporation) to obtain a macromonomer M-1. In the macromonomer M-1, the SP Synthesis Example of Particle Binder B 200 parts by mass of heptane was added to a 1 L three-neck flask equipped with a reflux cooling pipe and a gas introduction coke, nitrogen gas was introduced at a flow rate of 200 mL/min for 10 minutes, and the solution was heated from room temperature to 80° C. A liquid (a solution in which 90 parts by mass of butyl acrylate (the exemplary compound A-5, manufactured by FUJIFILM Wako Pure Chemical Corporation), 20 parts by mass of methyl methacrylate (the exemplary compound A-4, manufactured by FUJIFILM Wako Pure Chemical Corporation), 10 parts by mass of acrylic acid (the exemplary compound A-1, manufactured by FUJIFILM Wako Pure Chemical Corporation), 20 parts by mass of the following B-27 (a synthetic product), 60 parts by mass (solid content) of the following macromonomer MM-1, and 2.0 parts by mass of a polymerization initiator V-601 (trade name, manufactured by FUJIFILM Wako Pure Chemical Corporation) were mixed with each other) prepared in a separate container were added dropwise to heptane for 2 hours while stirring heptane. Next, the solution was stirred at 80° C. for 2 hours. Next, 1.0 part by mass of V-601 was further added to the obtained mixture, and the solution was stirred at 90° C. for 2 hours. The obtained solution was diluted with heptane to obtain a dispersion liquid of the particle binder B. The concentration of solid contents was 30%.

The average particle size of the particle binder B was 0.2 µm. In addition, in a resin forming the particle binder B, the mass average molecular weight of is 150000, and the glass transition temperature was −20° C.

(Synthesis of B-27)

80 g of cholesterol (manufactured by Tokyo Chemical Industry Co., Ltd.), 50 g of mono(2-acryloyloxyethyl) succinate (manufactured by Sigma-Aldrich Corporation), 5 g of 4-dimethylaminopyridine (manufactured by Tokyo Chemical Industry Co., Ltd.), and 500 g of dichloromethane were added to a 1 L three-neck flask and were stirred at 20° C. for 5 minutes. 52 g of 1-(3-dimethylaminopropyl)-3-ethylcarbodiimide hydrochloride (manufactured by Tokyo Chemical Industry Co., Ltd.) was added to the solution for 30 minutes while stirring the solution, and the solution was stirred at 20° C. for 5 hours. Next, the solution was washed with 0.1 M hydrochloric acid three times, was dried with magnesium sulfate, and was distilled under reduced pressure. The obtained sample was purified by silica gel column chromatography to obtain B-27.

(Synthesis of Macromonomer MM-1)

190 parts by mass of toluene was added to a 1 L three-neck flask equipped with a reflux cooling pipe and a gas introduction coke, nitrogen gas was introduced at a flow rate of 200 mL/min for 10 minutes, and the solution was heated from room temperature to 80° C. A liquid (the following formula α) prepared in a separate container was added dropwise to toluene for 2 hours while stirring the toluene, and was stirred at 80° C. for 2 hours. Next, 0.2 parts by mass of V-601 (manufactured by FUJIFILM Wako Pure Chemical Corporation) was added, and the solution was stirred at 95° C. for 2 hours. 0.025 parts by mass of 2,2,6,6-tetramethylpiperidine-1-oxyl (manufactured by Tokyo Chemical Industry Co., Ltd.), 13 parts by mass of glycidyl methacrylate (manufactured by FUJIFILM Wako Pure Chemical Corporation), and 2.5 parts by mass of tetrabutylammonium bromide (manufactured by Tokyo Chemical Industry Co., Ltd.) were added to the solution held at 95° C. after stirring, and the solution was stirred at 120° C. for 3 hours. The obtained mixture was cooled to a room temperature and was added to methanol to be precipitated. Precipitates were separated by filtration and were washed with methanol two times. 300 parts by mass of heptane was added to the precipitates to dissolve the precipitates. By condensing a part of the obtained solution under reduced pressure, a solution of the macromonomer MM-1 was obtained. The concentration of solid contents was 43.4%, the SP value was 9.1, and the mass average molecular weight was 16,000. The obtained macromonomer MM-1 was obtained as follows.

(Formula α)

| | |
|---|---|
| Dodecyl methacrylate (the exemplary compound A-9, manufactured by FUJIFILM Wako Pure Chemical Corporation) | 150 parts by mass |
| Methyl methacrylate (exemplary compound A-4, manufactured by FUJIFILM Wako Pure Chemical Corporation) | 59 parts by mass |
| 3-mercaptoisobutyric acid (manufactured by Tokyo Chemical Industry Co., Ltd.) | 2 parts by mass |
| V-601 (manufactured by FUJIFILM Wako Pure Chemical Corporation) | 1.9 parts by mass |

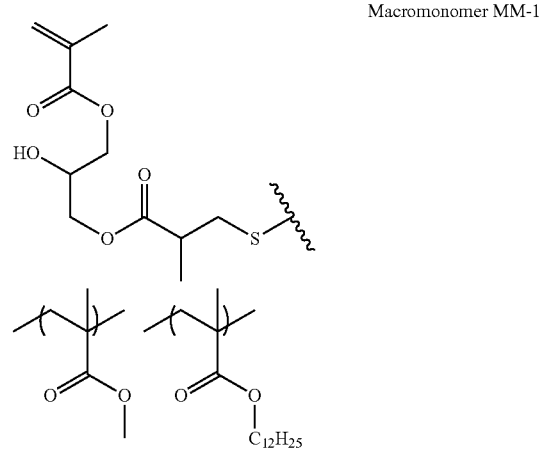

Macromonomer MM-1

Synthesis Example of Polymer C Used for Forming Easily Adhesive Layer 0.36 g of 1,4-butanediol, 1.8 g of 2,2-bis(hydroxymethyl) butyric acid, 6.4 g of polycarbonate diol (trade name: DURANOL T5650J, manufactured by Asahi Kasei Corporation, Mw: 800), and NISSO-PB GI-1000 (trade name, hydrogenated polybutadiene polyol, manufactured by Nippon Soda Co., Ltd., Mw: 1500) were added to a 200 mL three-neck flask to dissolve 49 g of methyl ethyl ketone. 7.6 g of 4,4'-dicyclohexylmethane diisocyanate was added to the solution, and the solution was stirred at 80° C. to uniformly dissolve the components. 100 mg of NEOSTANN U-600 (trade name, manufactured by Nitto Kasei Co., Ltd.) was added to the solution, and the solution was stirred at 75° C. for 10 hours, and 1 g of methanol was added to seal a polymer terminal. After stopping the polymerization reaction, the solution was dried to obtain powder of a polyurethane resin C.

Synthesis Example of Polymer D Used for Forming Easily Adhesive Layer 0.36 g of 1,4-butanediol, 1.8 g of 2,2-bis(hydroxymethyl) butyric acid, 6.4 g of polycarbonate diol (trade name: DURANOL G3450J, manufactured by Asahi Kasei Corporation, Mw: 800), and NISSO-PB GI-1000 (trade name, hydrogenated polybutadiene polyol, manufactured by Nippon Soda Co., Ltd., Mw: 1500) were added to a 200 mL three-neck flask to dissolve 49 g of methyl ethyl ketone. 7.6 g of 4,4'-dicyclohexylmethane diisocyanate was added to the solution, and the solution was stirred at 80° C. to uniformly dissolve the components. 100 mg of NEOSTANN U-600 was added to the solution, and the solution was stirred at 75° C. for 10 hours, and 1 g of methanol was added to seal a polymer terminal. After stopping the polymerization reaction, the solution was dried to obtain powder of a polyurethane resin D.

Synthesis Example of Polymer E Used for Forming Easily Adhesive Layer 0.20 g of 1,4-butanediol, 0.41 g of 2,2-bis(hydroxymethyl)butyric acid, 10.0 g of polycarbonate diol (trade name: ETERNACOLL UH-200, manufactured by Ube Industries Ltd., Mw: 2,000), and 0.193 g of trimethylolpropane (manufactured by Tokyo Chemical Industry Co., Ltd.) were added to a 200 mL three-neck flask to dissolve 22 g of methyl ethyl ketone. 3.8 g of 4,4'-dicyclohexylmethane diisocyanate was added to the solution, and the solution was stirred at 80° C. to uniformly dissolve the components. 100 mg of NEO-STANN U-600 (trade name, manufactured by Nitto Kasei Co., Ltd.) was added to the solution, and the solution was stirred at 80° C. for 4 hours to obtain a prepolymer having a Mw of 27,000. 5 g of a THE solution of 3.7 g of EPOL (trade name: terminal diol-modified hydrogenated polyisoprene, manufactured by Idemitsu Kosan Co., Ltd., Mw: 2,500) was added to the prepolymer, and the solution was continuously stirred at 80° C. for 4 hours. 1 g of methanol was added to seal a polymer terminal. After stopping the polymerization reaction, the solution was dried to obtain powder of a crosslinked polyurethane resin E.

Each of the following tests was performed for each of the prepared particle binders, the dispersion liquid thereof, and the polymer used for forming the easily adhesive layer, and the glass transition temperature of the polymer was shown in Table 1.

<Measurement of Average Particle Size of Particle Binder>

The average particle size of the particle binder was measured in the following order. Using the dispersion liquid of the particle binder prepared as described above and diisobutyl ketone, an 0.1 mass % dispersion liquid was prepared. This dispersion liquid sample was irradiated with 1 kHz ultrasonic waves for 10 minutes, and the volume average particle size of the particle binder was measured using a laser diffraction/scattering particle size distribution analyzer LA-920 (trade name, manufactured by Horiba Ltd.). Other detailed conditions and the like were referred to JIS Z8828: 2013 "Particle Size Analysis-Dynamic Light Scattering" as necessary. For each level, five samples are prepared and measured, and the average value thereof is adopted as the average particle size of the binder particles.

<Measurement of Average Molecular Weight>

The number-average molecular weight or the mass average molecular weight of the resin forming the particle binder was measured using the above-described method (condition 2).

<Measurement Method of Glass Transition Temperature (Tg)>

The glass transition temperature (Tg) of each of the resins or each of the polymers was measured using the above-described method.

<Method of Measuring Concentration of Solid Contents>

The concentration of solid contents of each of the dispersion liquids of the particle binders and the macromonomer solution were measured based on the following method.

About 1.5 g of the dispersion liquid of the particle binder A or B and the macromonomer solution was weighed in an aluminum cup having a diameter of 7 cm, and the weighed value was read up to the three decimal places. Next, the solution was heated and dried in a nitrogen atmosphere at 90° C. for 2 hours and at 140° C. for 2 hours. The mass of the residue in the obtained aluminum cup was measured, and the concentration of solid contents was calculated from the following expression. The measurement was performed five times, and the average value of three measured values other than the maximum value and the minimum value were adopted.

Concentration of Solid Contents (%)=[Amount (g) of Residue in Aluminum Cup/Dispersion Liquid of Particle Binder $A$ or $B$ or Macromonomer Solution (g)]

<Synthesis of Sulfide-Based Inorganic Solid Electrolyte>

A sulfide-based inorganic solid electrolyte was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a glove box under an argon atmosphere (dew point: −70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) were respectively weighed, put into an agate mortar, and mixed using an agate muddler for five minutes. The mixing ratio between $Li_2S$ and $P_2S_5$ ($Li_2S:P_2S_5$) was set to 75:25 in terms of molar ratio.

66 g of zirconia beads having a diameter of 5 mm were put into a 45 mL zirconia container (manufactured by Fritsch Japan Co., Ltd.), the full amount of the mixture of the lithium sulfide and the diphosphorus pentasulfide was put thereinto, and the container was completely sealed in an argon atmosphere. The container was set in a planetary ball mill P-7 (trade name; manufactured by Fritsch Japan Co., Ltd.), mechanical milling was carried out at a temperature of 25° C. and a rotation speed of 510 rpm for 20 hours. As a result, 6.20 g of a yellow powder of a sulfide-based inorganic solid electrolyte (Li—P—S-based glass; hereinafter, referred to as LPS) was obtained.

Example 1

In Example 1, as shown in Table 1, a current collector with an easily adhesive layer was prepared using an easily adhesive layer-forming composition including a polymer having a solubility of 1 g/100 g or higher at 25° C. in toluene as a solvent having a C log P value of 2.0 or higher and an active material layer-forming composition including toluene as a solvent having a C Log P value of 2.0 or higher, an electrode active material, and a sulfide-based inorganic solid electrolyte. Using this current collector with an easily adhesive layer, an electrode and an all-solid state secondary battery were manufactured.

Example 1-1

<Preparation of Positive Electrode Current Collector with Easily Adhesive Layer>

As described below, a positive electrode current collector with an easily adhesive layer 21 shown in FIG. 1 was prepared.

3 g of hydrogenated styrene butadiene rubber (hydrogenated SBR, DYNARON 1321P (trade name), manufactured by JSR Corporation) was added to 100 g of toluene dehydrated with a molecular sieve 3A, and the solution was dispersed using a planetary mixer at room temperature for 1 hour to obtain an easily adhesive layer-forming composition.

Next, in a dry room set to a dew point of −60° C., the easily adhesive layer-forming composition was applied (the application method shown in Table 1 was "Solvent-Based")

to aluminum foil (positive electrode current collector) having a thickness of 20 μm using an applicator (trade name: SA-201, a Baker type applicator, manufactured by Tester Sangyo Co., Ltd.) and was dried on a hot plate at 100° C. for 1 hour. This way, a positive electrode current collector with an easily adhesive layer including the easily adhesive layer having a thickness of 10 nm was obtained.

Regarding the prepared positive electrode current collector with an easily adhesive layer, the following characteristics or physical properties were measured or calculated, and the results are shown in Table 1.

In "Application Method" in the "Positive Electrode Current Collector with Easily Adhesive Layer" field, in a case where the easily adhesive layer-forming composition includes an organic solvent, "Solvent-Based" was shown, and in a case where the easily adhesive layer-forming composition includes an aqueous solvent, "Aqueous".

<Solubility>

While stirring 100 g (adjusted to a liquid temperature of 25° C.) of the solvent (shown in Table 1) used for preparing a positive electrode active material layer-forming composition described below, 1 g of the polymer (shown in Table 1) used for preparing the easily adhesive layer-forming composition was added, and a value (addition amount) immediately before undissolved matter appears was adopted as the solubility. The obtained solubility was classified based on the following standards and was shown in Table 1.

—Standards of Solubility—

A: 10 g/100 g or higher
B: 5 g/100 g or higher and lower than 10 g/100 g
C: 1 g/100 g or higher and lower than 5 g/100 g
D: even 1 g of the polymer was not dissolved, and undissolved matter was able to be observed <C Log P Value>

The C log P value of the solvent was calculated using the above-described calculation method.

<Surface Electrical Resistance>

The prepared easily adhesive layer-forming composition was applied to a Teflon (registered trade name) sheet using a Baker type applicator (manufactured by Paltek Corporation), was left to stand in a fan dryer (manufactured by Yamato Scientific Co., Ltd.) and dried at 100° C. for 8 hours, and was gently peeled off from the Teflon (registered trade name) sheet. As a result, an easily adhesive layer having a thickness of 50 μm or more was obtained. Regarding the obtained easily adhesive layer, the surface electrical resistance was measured according to JIS C 2151. The obtained surface electrical resistance value (unit: Ω/□) was adopted as the surface electrical resistance value of the easily adhesive layer in the positive electrode current collector with an easily adhesive layer.

<Number of Protrusions>

The surface of the easily adhesive layer in the positive electrode current collector with an easily adhesive layer was observed with a scanning electron microscope to obtain a SEM image, 50 protrusions were freely selected from the obtained SEM image, and the distance (closest inter-protrusion distance) between each of the protrusions and another protrusion positioned closest thereto was measured, and the average value thereof was calculated. The number (pieces) of protrusions per 1 $m^2$ was calculated from the obtained average closest inter-protrusion distance. For example, in a case where the average closest inter-protrusion distance was 1 mm, the number of protrusions was 1000×1000=1000000 piece/$m^2$.

<Tensile Elastic Modulus>

The easily adhesive layer-forming composition was applied to a Teflon (registered trade name) sheet using a Baker type applicator (manufactured by Paltek Corporation), was left to stand in a fan dryer (manufactured by Yamato Scientific Co., Ltd.) and dried at 100° C. for 8 hours. Next, the dried film was treated using a chopper type sample cutter (manufactured by Yasuda Seiki Seisakusho, Ltd.) to prepare a standard specimen type 5 defined by JIS K 7127 "Plastics—Determination of tensile properties—Part 3: Test conditions for films and sheets". This way, a specimen for a tensile test was prepared.

Regarding the prepared specimen, a tensile test was performed in an environment of a temperature of 25° C. and a dew point of −50° C. using a digital force gauge ZTS-5N and Vertical Motorized Test Stand MX2 series (all of which are trade names, manufactured by Imada Co., Ltd.). Two parallel marked lines 50 mm apart from each other were drawn at the center portion of the specimen, the specimen was stretched for 1 minute at a rate of 10 mm, and the modulus of elasticity was calculated based on JIS K 7161 "Plastics—Determination of tensile properties". The obtained modulus of elasticity was adopted as the modulus of elasticity of the easily adhesive layer in the positive electrode current collector with an easily adhesive layer.

<Glass Transition Temperature of Polymer>

The glass transition temperature was measured using a method of measuring a glass transition temperature (Tg) described in paragraph "0143" of JP2015-088486A.

(Preparation of Positive Electrode Sheet)

180 zirconia beads having a diameter of 5 mm were put into a 45 mL zirconia container (manufactured by Fritsch Japan Co., Ltd.), and 2.8 g of the above-described synthesized LPS, 0.2 g of (in terms of solid contents) of the dispersion liquid of the particle binder A, and 12.3 g of toluene as a dispersion medium were put thereinto. The container was set in a planetary ball mill P-7 (trade name, manufactured by Fritsch Japan Co., Ltd.) and the components were mixed together for 2 hours at a temperature of 25° C. and a rotation speed of 300 rpm. Next, 7.0 g of NMC ($LiNi_{1/3}Co_{1/3}Mn_{1/3}O_2$ (manufactured by Sigma-Aldrich Corporation)) as an active material and 0.2 g of acetylene black as a conductive auxiliary agent (manufactured by Denka Co., Ltd.) were put into the container. Likewise, the container was set in a planetary ball mill P-7 (trade name, manufactured by Fritsch Japan Co., Ltd.) and the components were continuously mixed together for 10 minutes at a temperature of 25° C. and a rotation speed of 100 rpm. As a result, a positive electrode active material layer-forming composition was prepared.

In the positive electrode active material layer-forming composition, the particle binder A was maintained in a particle shape.

The prepared positive electrode active material layer-forming composition was applied to the easily adhesive layer of the positive electrode current collector using an applicator (trade name: SA-201 Baker Type applicator, manufactured by Tester Sangyo Co., Ltd.) such that the weight per unit area was 30 mg/$cm^2$, was heated at 80° C. for 1 hour, and was further dried at 110° C. for 1 hour. Next, the laminate was pressurized (20 MPa, 1 minute) while being heated (120° C.) using a heat press machine. This way, the hydrogenated SBR forming the easily adhesive layer was incorporated into the positive electrode active material layer, and a positive electrode sheet including the positive electrode active material layer (thickness: 80 μm) on the positive electrode current collector was prepared.

<Preparation of Negative Electrode Current Collector with Easily Adhesive Layer A>

A negative electrode current collector with an easily adhesive layer A was prepared using the same preparation method as that of the positive electrode current collector with an easily adhesive layer, except that the aluminum foil was changed to stainless steel (SUS) foil (negative electrode current collector).

Regarding the prepared negative electrode current collector with an easily adhesive layer, the following characteristics or physical properties were measured or calculated using the same method as that of the positive electrode current collector with an easily adhesive layer. The respective characteristics and physical properties of the negative electrode current collector with an easily adhesive layer are the same as those of the positive electrode current collector with an easily adhesive layer, and thus the description thereof will not be repeated.

(Preparation of Negative Electrode Sheet)

180 zirconia beads having a diameter of 5 mm were put into a 45 mL zirconia container (manufactured by Fritsch Japan Co., Ltd.), and 2.8 g of the above-described synthesized LPS, 0.2 g of (in terms of solid contents) of the dispersion liquid of the particle binder B, and 12.3 g of toluene as a dispersion medium were put thereinto. The container was set in a planetary ball mill P-7 (manufactured by Fritsch Japan Co., Ltd.) and the components were mixed together for 2 hours at a temperature of 25° C. and a rotation speed of 300 rpm. Next, 7.0 g of graphite (trade name, CGB20, manufactured by Nippon Kokuen Group) as an active material was put into the container. Next, using the same method, the container was set in a planetary ball mill P-7 (trade name, manufactured by Fritsch Japan Co., Ltd.) and the components were continuously mixed together for 15 minutes at a temperature of 25° C. and a rotation speed of 200 rpm. As a result, a negative electrode active material layer-forming composition was prepared.

In the negative electrode active material layer-forming composition, the particle binder B was maintained in a particle shape.

The negative electrode active material layer-forming composition prepared as described above was applied to the easily adhesive layer of the negative electrode current collector with an easily adhesive layer A using an applicator (trade name: SA-201 Baker Type applicator, manufactured by Tester Sangyo Co., Ltd.) such that the weight per unit area was 15 mg/cm$^2$, was heated at 80° C. for 1 hour, and was further dried at 110° C. for 1 hour. Next, the laminate was pressurized (20 MPa, 1 minute) while being heated (120° C.) using a heat press machine. This way, the hydrogenated SBR forming the easily adhesive layer was incorporated into the negative electrode active material layer, and a negative electrode sheet including the negative electrode active material layer (thickness: 60 μm) on the negative electrode current collector was prepared.

<Manufacturing of all-Solid State Secondary Battery>

An all-solid state secondary battery having a layer configuration shown in FIG. 2 was manufactured as follows.

That is, a SUS rod having a diameter of 10 mmφ was inserted into a polyethylene terephthalate (PET) cylinder from one opening. The positive electrode sheet was punched into a disk shape having a diameter of 9 mm, the disk was disposed in a state where the positive electrode current collector 22 faces the SUS rod in the cylinder, 30 mg of LPS was put into the surface of the positive electrode active material layer in the cylinder, a SUS rod having a diameter of 10 mmφ was inserted into the cylinder from an opposite opening, and the cylinder was pressurized at 350 MPa. As a result, a solid electrolyte layer (200 m) was formed. The SUS rod on the solid electrolyte layer side was temporarily removed. The negative electrode sheet was punched into a disk shape having a diameter of 9 mm in a state where the negative electrode active material layer faced the solid electrolyte layer, and was disposed on the solid electrolyte layer. Next, the removed SUS rod was inserted again into the cylinder, the cylinder was pressurized at 600 MPa, and the SUS rod was swaged. As a result, an all-solid state secondary battery according to Example 1-1 was manufactured.

This way, an all-solid state secondary battery including the current collector with an easily adhesive layer according to the embodiment of the present invention as the positive electrode and the negative electrode was manufactured.

Examples 1-2 to 1-8

Positive electrode current collectors with an easily adhesive layer according to Examples 1-2 to 1-8 were prepared using the same preparation method as that of the positive electrode current collector with an easily adhesive layer according to Example 1-1, except that the thickness of the easily adhesive layer was changed to a value shown in Table 1, the solvent of the positive electrode active material layer-forming composition in Example 1-4 was changed to diisobutyl ketone (DIBK) instead of toluene, and the solvent of the easily adhesive layer-forming composition in Example 1-5 was changed to diisobutyl ketone (DIBK) instead of toluene.

All-solid state secondary batteries according to Examples 1-2 to 1-8 were manufactured using the same method as that of Example 1-1, except that the respective positive electrode current collectors with an easily adhesive layer were used (as the negative electrode current collector with an easily adhesive layer, the negative electrode current collector with an easily adhesive layer A (the thickness of the easily adhesive layer was 10 nm) prepared in Example 1-1 was used; the same shall be applied to Examples 1-9 to 1-18 and Comparative Examples 1-1 to 1-3).

The easily adhesive layer of the positive electrode current collector with an easily adhesive layer prepared in Example 1-7 was cut, and the water content was measured according to JIS K 0113. As a result, the residual water content was 80 ppm.

Examples 1-9 to 1-11

Positive electrode current collectors with an easily adhesive layer according to Examples 1-9 to 1-11 were prepared using the same preparation method as that of the positive electrode current collector with an easily adhesive layer according to Example 1-6, except that the surface electrical resistance of the easily adhesive layer was set to a value shown in Table 1 by mixing DENKA BLACK (average particle size: 35 nm, manufactured by Denka Co., Ltd.) with the easily adhesive layer-forming composition to change a mixing mass ratio of DENKA BLACK to the hydrogenated styrene butadiene rubber (DYNARON 1321P (trade name)). All-solid state secondary batteries according to Examples 1-9 to 1-11 were manufactured using the same method as that of Example 1-1, except that the respective positive electrode current collectors with an easily adhesive layer prepared as described above were used.

Examples 1-12 to 1-14

Positive electrode current collectors with an easily adhesive layer according to Examples 1-12 to 1-14 were prepared using the same preparation method as that of the positive electrode current collector with an easily adhesive layer according to Example 1-3, except that the easily adhesive layer-forming composition including the hydrogenated styrene butadiene rubber was changed to an easily adhesive layer-forming (aqueous) composition in which soap-free latex (SX1105 (trade name), manufactured by Zeon Corporation) of styrene-butadiene rubber (SBR) included colloidal silica (SNOWTEX ZL (trade name) average particle size: 85 nm, manufactured by Nissan Chemical Industries Ltd.) in a content where the number of protrusions was as shown in Table 1 (the application method shown in Table 1 was "Aqueous"). All-solid state secondary batteries according to Examples 1-12 to 1-14 were manufactured using the same method as that of Example 1-1, except that the respective positive electrode current collectors with an easily adhesive layer prepared as described above were used.

Examples 1-15 and 1-16

Positive electrode current collectors with an easily adhesive layer according to Examples 1-15 to 1-16 were prepared using the same preparation method as that of the positive electrode current collector with an easily adhesive layer according to Example 1-3, except that the hydrogenated styrene butadiene rubber was changed to the polyurethane resin C (Example 1-15) or the polyurethane resin D (Example 1-16) synthesized as described above. All-solid state secondary batteries according to Examples 1-15 and 1-16 were manufactured using the same method as that of Example 1-1, except that the respective positive electrode current collectors with an easily adhesive layer prepared as described above were used.

Example 1-17

A positive electrode current collector with an easily adhesive layer was prepared using the same method as that of the positive electrode current collector with an easily adhesive layer according to Example 1-3, except that the easily adhesive layer-forming composition in which 3 g of the hydrogenated styrene butadiene rubber (DYNARON 1321P (trade name)) was dissolved in 100 g of toluene was changed to a composition in which soap-free latex of styrene-butadiene rubber (SX1105 (trade name), an aqueous composition, manufactured by Zeon Corporation) was diluted with water (the application method shown in Table 1 was "Aqueous"). An all-solid state secondary battery according to Example 1-17 was manufactured using the same method as that of Example 1-1, except that the positive electrode current collector with an easily adhesive layer was used.

Example 1-18

A positive electrode sheet was manufactured using the same method as that of the positive electrode sheet according to Example 1-3, except that the dispersion liquid of the particle binder A was changed to the positive electrode active material layer-forming composition prepared using hydrogenated styrene butadiene rubber (DYNARON 1321P (trade name)). In the positive electrode active material layer-forming composition, hydrogenated styrene butadiene rubber (DYNARON 1321P) was dissolved in toluene. An all-solid state secondary battery according to Example 1-18 was manufactured using the same method as that of Example 1-1, except that the positive electrode sheet was used.

Comparative Example 1-1

A positive electrode current collector with an easily adhesive layer according to Comparative Example 1-1 was prepared using the same preparation method as that of the positive electrode current collector with an easily adhesive layer according to Example 1-3, except that 3 g of the hydrogenated styrene butadiene rubber (DYNARON 1321P (trade name)) was changed to the crosslinked polyurethane resin E. An all-solid state secondary battery was manufactured using the same method as that of Example 1-1, except that the positive electrode current collector with an easily adhesive layer was used.

Comparative Example 1-2

An all-solid state secondary battery was manufactured using the same method as that of Example 1-16, except that toluene was changed to the positive electrode active material layer-forming composition prepared using isobutyronitrile (IBN).

The solubility of the polyurethane resin D in IBN was lower than 1 g/100 g.

Comparative Example 1-3

A positive electrode current collector with an easily adhesive layer was prepared using the same method as that of Example 1-17, except that an easily adhesive layer having a thickness of 2000 nm was formed using an easily adhesive layer-forming composition including lithium silicate 35 (manufactured by Nissan Chemical Industries Ltd.) and DENKA BLACK at 1:1 in terms of solid contents instead of the soap-free latex of the styrene-butadiene rubber. An all-solid state secondary battery according to Comparative Example 1-3 was manufactured using the same method as that of Example 1-1, except that the positive electrode current collector with an easily adhesive layer was used.

Regarding the prepared all-solid state secondary batteries, the following characteristics or physical properties were measured or evaluated, and the results are shown in Table 1.

<Measurement of Thicknesses of Constituent Layers of all-Solid State Secondary Battery>

The thicknesses of the constituent layers were calculated from an image obtained by observing a cross-section of the all-solid state secondary battery with a scanning electron microscope (SEM) or a transmission electron microscope (TEM).

<Evaluation of Film Hardness>

The adhesive strength between the current collector and the active material layer was evaluated through the following film hardness test.

This film hardness test was performed as a bending resistance test using a mandrel tester according to JIS K 5600-5-1. That is, the positive electrode sheet manufactured in each of the examples was cut into a striped shape having a width of 50 mm and a length of 100 mm to prepare a specimen. This positive electrode active material layer was set such that the active material layer surface was opposite to the mandrel (the positive electrode current collector faced mandrel side) and the width direction of the specimen was parallel to the axis of the mandrel. Next, the specimen was bent by 180 (once) along the outer circumferential surface of the mandrel, and whether or not the positive electrode active material layer peeled off from the current collector was observed by visual inspection. The bending test was performed using a mandrel having a diameter of 25 mm. In a case where peeling did not occur, the diameter of the mandrel (unit mm) was gradually reduced to 20, 16, 12, 10, 8, 6, 5, 4, 3, and 2, and the diameter of the mandrel at which peeling initially occurred was recorded. Binding properties were evaluated based on one of the following evaluation standards in which the diameter (defect occurrence diameter) of the mandrel at which peeling initially occurred was included. In this test, as the defect occurrence diameter decreases, the adhesiveness between the current collector and the positive electrode active material layer become stronger, and evaluation standards "AA", "A", "B", and "C" or higher are acceptable levels.

—Evaluation Standards—
AA: less than 5 mm
A: 5 mm or more and less than 10 mm
B: 10 mm or more and less than 16 mm
C: 16 mm
D: 20 mm or more <Measurement of Battery Performance>

The battery performance of the all-solid state secondary battery manufactured in each of the examples was evaluated based on the battery voltage measured using a charging and discharging evaluation device "TOSCAT-3000" (trade name; manufactured by Toyo System Corporation). Specifically, the all-solid state secondary battery was charged at a current value of 0.2 mA until the battery voltage reached 4.2 V, and then was discharged at a current value of 2.0 mA until the battery voltage reached 3.0 V. The battery voltage measured 10 seconds after the start of discharging was read and evaluated based on the following evaluation standards.

The evaluation standards are as follows. In this test, evaluation standards of "AA", "A", "B", and "C" are acceptable levels. In the battery performance test evaluation in the tables, "–" represents that the battery performance was not able to be evaluated because a battery itself was not able to be formed due to the weak film hardness of the positive electrode sheet.

—Evaluation Standards—
AA: 4.10 V or higher
A: 4.05 V or higher and lower than 4.10 V
B: 4.00 V or higher and lower than 4.05 V
C: 3.95 V or higher and lower than 4.00 V
D: 3.90 V or higher and lower than 3.95 V <Evaluation of Adhesiveness Resistance>

Ten sheet-shaped samples cut from the positive electrode current collector with an easily adhesive layer prepared in each of the examples were laminated to prepare a laminated sample. The sheet-shaped samples were laminated such that the easily adhesive layer and the current collector of the sheet-shaped samples positioned on the upper and lower sides were in contact with each other. This test specimen was pressurized in an environment of temperature: 30° C., relative humidity: 80%, and pressurization pressure: 0.5 MPa for 24 hours. Next, the test specimen was left to stand in an environment of temperature: 23° C. and relative humidity: 50% for 12 hours or longer, and the ten positive electrode current collectors with an easily adhesive layer were peeled off from each other. By observing the peeling surface (lower surface) of each of the current collectors with an easily adhesive layer, the adhesiveness resistance of the current collector with an easily adhesive layer was evaluated based on the following evaluation standards. In this test, evaluation standards of "A", "B", and "C" are acceptable levels.

—Evaluation Standards—
A: a case where a peeling trace was not observed on the lower surfaces of the ten positive electrode current collectors with an easily adhesive layer
B: a case where a peeling trace was slightly observed at an edge portion of the lower surfaces of one or two current collectors with an easily adhesive layer
C: a case where a peeling trace was observed on the lower surfaces of one or two current collectors with an easily adhesive layer
D: a case where a peeling trace was observed on the lower surfaces of three or more current collectors with an easily adhesive layer

TABLE 1

| No. | Positive Electrode Current Collector with Easily Adhesive Layer | | | | | | | | | | Positive Electrode Active Material Layer-Forming Composition | | | | Evaluation | | |
|---|---|---|---|---|---|---|---|---|---|---|---|---|---|---|---|---|---|
| | Positive Electrode Current Collector | Easily Adhesive Layer | | | | | | | | | | | | | | | |
| | | Thickness nm | Polymer | Solvent | | Solubility | Surface Resistance Ω/□ | Number of Protrusions Piece/m² | Elastic Modulus Mpa | Tg °C. | Application Method | Solvent | ClogP Value | Inorganic Solid Electrolyte | Binder Shape | Adhesiveness Resistance | Film Hardness | Battery Performance |
| | | | | Kind | ClogP Value | | | | | | | | | | | | | |
| Example 1-1 | A1 | 10 | Hydrogenated SBR | Toluene | 2.52 | A | 1 × 10¹² | 0 | 50 | −20 | Solvent-Based | Toluene | 2.52 | Sulfide-Based | Particle | B | B | AA |
| Example 1-2 | A1 | 30 | Hydrogenated SBR | Toluene | 2.52 | A | 1 × 10¹² | 0 | 50 | −20 | Solvent-Based | Toluene | 2.52 | Sulfide-Based | Particle | B | A | AA |
| Example 1-3 | A1 | 50 | Hydrogenated SBR | Toluene | 2.52 | A | 1 × 10¹² | 0 | 50 | −20 | Solvent-Based | Toluene | 2.52 | Sulfide-Based | Particle | B | AA | AA |
| Example 1-4 | A1 | 50 | Hydrogenated SBR | Toluene | 2.52 | A | 1 × 10¹² | 0 | 50 | −20 | Solvent-Based | Toluene | 2.52 | Sulfide-Based | Particle | B | AA | AA |
| Example 1-5 | A1 | 50 | Hydrogenated SBR | DIBK | 3.48 | A | 1 × 10¹² | 0 | 50 | −20 | Solvent-Based | DIBK | 3.48 | Sulfide-Based | Particle | B | AA | AA |
| Example 1-6 | A1 | 100 | Hydrogenated SBR | Toluene | 2.52 | A | 1 × 10¹² | 0 | 50 | −20 | Solvent-Based | Toluene | 2.52 | Sulfide-Based | Particle | B | AA | A |
| Example 1-7 | A1 | 300 | Hydrogenated SBR | Toluene | 2.52 | A | 1 × 10¹² | 0 | 50 | −20 | Solvent-Based | Toluene | 2.52 | Sulfide-Based | Particle | C | AA | B |
| Example 1-8 | A1 | 500 | Hydrogenated SBR | Toluene | 2.52 | A | 1 × 10⁴ | 0 | 50 | −20 | Solvent-Based | Toluene | 2.52 | Sulfide-Based | Particle | C | AA | C |
| Example 1-9 | A1 | 100 | Hydrogenated SBR | Toluene | 2.52 | A | 1 × 10⁸ | 0 | 50 | −20 | Solvent-Based | Toluene | 2.52 | Sulfide-Based | Particle | B | A | A |
| Example 1-10 | A1 | 100 | Hydrogenated SBR | Toluene | 2.52 | A | 1 × 10² | 0 | 50 | −20 | Solvent-Based | Toluene | 2.52 | Sulfide-Based | Particle | B | A | A |
| Example 1-11 | A1 | 100 | Hydrogenated SBR | Toluene | 2.52 | A | 1 × 10¹² | 0 | 50 | −20 | Solvent-Based | Toluene | 2.52 | Sulfide-Based | Particle | B | C | A |
| Example 1-12 | A1 | 50 | SBR | Toluene | 2.52 | A | 1 × 10¹² | 1.0 × 10⁵ | 50 | 0 | Aqueous | Toluene | 2.52 | Sulfide-Based | Particle | A | AA | AA |
| Example 1-13 | A1 | 50 | SBR | Toluene | 2.52 | A | 1 × 10¹² | 1.0 × 10⁸ | 50 | 0 | Aqueous | Toluene | 2.52 | Sulfide-Based | Particle | A | A | A |
| Example 1-14 | A1 | 50 | SBR | Toluene | 2.52 | A | 1 × 10¹² | 1.0 × 10¹¹ | 50 | 0 | Aqueous | Toluene | 2.52 | Sulfide-Based | Particle | A | A | B |
| Example 1-15 | A1 | 50 | Polyurethane Resin C | Toluene | 2.52 | C | 1 × 10¹² | 0 | 200 | 0 | Solvent-Based | Toluene | 2.52 | Sulfide-Based | Particle | B | B | A |
| Example 1-16 | A1 | 50 | Polyurethane Resin D | Toluene | 2.52 | C | 1 × 10¹² | 0 | 300 | 10 | Solvent-Based | Toluene | 2.52 | Sulfide-Based | Particle | B | C | C |
| Example 1-17 | A1 | 50 | SBR | Toluene | 2.52 | A | 1 × 10¹² | 0 | 50 | 0 | Aqueous | Toluene | 2.52 | Sulfide-Based | Particle | B | AA | AA |
| Example 1-18 | A1 | 50 | Hydrogenated SBR | Toluene | 2.52 | A | 1 × 10¹² | 0 | 50 | −20 | Solvent-Based | Toluene | 2.52 | Sulfide-Based | Solution | B | AA | B |

TABLE 1-continued

| | Positive Electrode Current Collector with Easily Adhesive Layer | | | | | | | | | | Positive Electrode Active Material | | | | | Evaluation | | |
|---|---|---|---|---|---|---|---|---|---|---|---|---|---|---|---|---|---|---|
| | Positive Electrode | | Easily Adhesive Layer | | | | | | | | Layer-Forming Composition | | | Inorganic Solid Electrolyte | Binder Shape | Adhesiveness Resistance | Film Hardness | Battery Performance |
| No. | Current Collector | Thickness nm | Polymer | Solvent Kind | ClogP Value | Solubility | Surface Resistance Ω/□ | Number of Protrusions Piece/m² | Elastic Modulus Mpa | Tg °C. | Application Method | Solvent | ClogP Value | | | | | |
| Comparative Example 1-1 | A1 | 50 | Crosslinked Polyurethane Resin E | Toluene | 2.52 | D | 1 × 10¹² | 0 | 500 | 15 | Solvent-Based | Toluene | 2.52 | Sulfide-Based | Particle | B | D | — |
| Comparative Example 1-2 | A1 | 50 | Polyurethane Resin D | Toluene | 2.52 | C | 1 × 10¹² | 0 | 300 | 10 | Solvent-Based | IBN | 1.39 | Sulfide-Based | Particle | B | D | — |
| Comparative Example 1-3 | A1 | 2,000 | Lithium Silicate | Toluene | 2.52 | D | 1 × 10¹² | 0 | — | — | Aqueous | Toluene | 2.52 | Sulfide-Based | Particle | B | D | — |

The following can be seen from the results of Table 1. That is, in the current collectors with an easily adhesive layer (Comparative Examples 1-1 and 1-3) in which the easily adhesive layer including the polymer not satisfying the solubility defined by the present invention was provided, the adhesiveness (film hardness) with the active material layer formed thereon was not sufficient. In addition, in the current collector with an easily adhesive layer (Comparative Example 1-2) in which the easily adhesive layer including the polymer satisfying the solubility defined by the present invention was provided but the active material layer-forming composition including the solvent not satisfying the C log P value defined by the present invention was used, the current collector did not exhibit sufficient adhesiveness with the active material layer to be formed.

On the other hand, in the current collectors with an easily adhesive layer (Examples 1-1 and 1-18) in which the easily adhesive layer including the polymer satisfying the solubility defined by the present invention was provided, excellent adhesiveness with the active material layer formed using the active material layer-forming composition including the solvent satisfying the C log P value defined by the present invention was exhibited, the battery voltage was high, and an all-solid state secondary battery having excellent battery performance was able to be manufactured. Further, adhesiveness resistance was also excellent, and peeling and fracturing of the easily adhesive layer was able to be prevented even after lamination.

Example 2

In Example 2, a negative electrode shown in Table 2 was prepared using the same method as that of Example 1, an all-solid state secondary battery was manufactured using this negative electrode, and the negative electrode and the all-solid state secondary battery were evaluated. The results are shown in Table 2.

Example 2-1

In Example 2-1, an electrode and an all-solid state secondary battery were manufactured using the same method as that of Example 1-3.

The thickness of the easily adhesive layer provided in the negative electrode current collector with an easily adhesive layer A was 50 nm.

Example 2-2

An all-solid state secondary battery was manufactured using the same method as that of Example 1-3, except that a negative electrode current collector with an easily adhesive layer B prepared as described below was used instead of the negative electrode current collector with an easily adhesive layer A.

—Preparation of Negative Electrode Current Collector with Easily Adhesive Layer B—

The negative electrode current collector with an easily adhesive layer B was prepared using the same preparation method as that of the positive electrode current collector with an easily adhesive layer according to Example 1-1, except that the aluminum foil was changed to copper foil (negative electrode current collector) and the thickness of the easily adhesive layer was changed to 50 nm.

Comparative Example 2-1

An all-solid state secondary battery was manufactured using the same method as that of Comparative Example 1-1, except that a negative electrode current collector with an easily adhesive layer C was used instead of the negative electrode current collector with an easily adhesive layer A.

—Preparation of Negative Electrode Current Collector with Easily Adhesive Layer C—

The negative electrode current collector with an easily adhesive layer C was prepared using the same preparation method as that of the positive electrode current collector with an easily adhesive layer according to Example 1-1, except that the aluminum foil was changed to stainless steel foil (negative electrode current collector), the hydrogenated styrene butadiene rubber (DYNARON 1321P (trade name) was changed to the crosslinked polyurethane resin E, and the thickness of the easily adhesive layer was changed to 50 nm.

Comparative Example 2-2

An all-solid state secondary battery was manufactured using the same method as that of Comparative Example 2-1, except that a negative electrode current collector with an easily adhesive layer D was used instead of the negative electrode current collector with an easily adhesive layer C.

—Preparation of Negative Electrode Current Collector with Easily Adhesive Layer D—.

The negative electrode current collector with an easily adhesive layer D was prepared using the same preparation method as that of the positive electrode current collector with an easily adhesive layer according to Example 1-1, except that the aluminum foil was changed to copper foil (negative electrode current collector), the hydrogenated styrene butadiene rubber (DYNARON 1321P (trade name) was changed to the crosslinked polyurethane resin E, and the thickness of the easily adhesive layer was changed to 50 nm.

Regarding the prepared negative electrode current collector with an easily adhesive layer, the following characteristics or physical properties were measured or calculated using the same method as that of Example 1. The respective characteristics and physical properties of the positive electrode current collector with an easily adhesive layer are the same as those of the corresponding positive electrode current collector with an easily adhesive layer in Example 1, and thus the description thereof will not be repeated.

Regarding the prepared positive electrode sheets and the prepared all-solid state secondary batteries, the following characteristics or physical properties were measured or evaluated using the same method as that of Example 1, and the results are shown in Table 2.

The evaluation of the film hardness was performed by using the negative electrode sheet instead of the positive electrode sheet as the target to be evaluated. In addition, the adhesiveness resistance was evaluated based on the evaluation standards for the negative electrode by using the negative electrode sheet instead of the positive electrode sheet as the target to be evaluated.

TABLE 2

| | Negative Electrode Current Collector with Easily Adhesive Layer | | | | | | | | | | |
|---|---|---|---|---|---|---|---|---|---|---|---|
| | Negative Electrode Current Collector | Easily Adhesive Layer | | | | | | | | | |
| | | Thickness nm | Polymer | Solvent | | | Surface Resistance $\Omega/\square$ | Number of Protrusions Piece/$m^2$ | Elastic Modulus Mpa | Tg °C. | Application Method |
| No. | | | | Kind | ClogP Value | Solubility | | | | | |
| Example 2-1 | SUS | 50 | Hydrogenated SBR | Toluene | 2.52 | A | $1 \times 10^{12}$ | 0 | 50 | −20 | Solvent-Based |
| Example 2-2 | Cu | 50 | Hydrogenated SBR | Toluene | 2.52 | A | $1 \times 10^{12}$ | 0 | 50 | −20 | Solvent-Based |
| Comparative Example 2-1 | SUS | 50 | Crosslinked Polyurethane Resin E | Toluene | 2.52 | D | $1 \times 10^{12}$ | 0 | 500 | 15 | Solvent-Based |
| Comparative Example 2-2 | Cu | 50 | Crosslinked Polyurethane Resin E | Toluene | 2.52 | D | $1 \times 10^{12}$ | 0 | 500 | 15 | Solvent-Based |

| | Negative Electrode Active Material Layer-Forming Composition | | | | | Evaluation | | |
|---|---|---|---|---|---|---|---|---|
| | | | Inorganic | | | | | |
| No. | Solvent | ClogP Value | Solid Electrolyte | Binder Shape | | Adhesiveness Resistance | Film Hardness | Battery Performance |
| Example 2-1 | Toluene | 2.52 | Sulfide-Based | Particle | | B | AA | AA |
| Example 2-2 | Toluene | 2.52 | Sulfide-Based | Particle | | B | AA | AA |
| Comparative Example 2-1 | Toluene | 2.52 | Sulfide-Based | Particle | | B | D | — |
| Comparative Example 2-2 | Toluene | 2.52 | Sulfide-Based | Particle | | B | D | — |

It can be seen from the results of Table 2 that, even in a case where the current collector with an easily adhesive layer in which the easily adhesive layer including the polymer satisfying the solubility defined by the present invention was provided was used as the negative electrode current collector, high adhesive strength with the negative electrode active material layer was exhibited, and an all-solid state secondary battery having high battery performance can be manufactured. Further, in the current collector with an easily adhesive layer, peeling and fracturing of the easily adhesive layer was able to be prevented even after lamination.

Example 3

In Example 3, a current collector with an easily adhesive layer, an electrode, and an all-solid state secondary battery were manufactured and evaluated using the same methods as that of Example 1, except that an oxide-based inorganic solid electrolyte was used as the solid electrolyte of the positive electrode active material layer as shown in Table 3. The evaluation of the battery performance was performed based on the following evaluation standards. The results are shown in Table 3. In this test, evaluation standards of "AA", "A", "B", and "C" are acceptable levels.

—Evaluation Standards—
AA: 3.80 V or higher
A: 3.75 V or higher and lower than 3.80 V
B: 3.70 V or higher and lower than 3.75 V
C: 3.65 V or higher and lower than 3.70 V
D: 3.60 V or higher and lower than 3.65 V Example 3-1

A positive electrode sheet was prepared using the same method as that of Example 1-3, except that a positive electrode active material layer-forming composition prepared using the oxide-based inorganic solid electrolyte $Li_7La_3Zr_2O_{12}$ (LLZ) instead of the sulfide-based inorganic solid electrolyte LPS was used. An all-solid state secondary battery was manufactured using the same method as that of Example 1-3, except that the above-described positive electrode sheet was used.

Comparative Example 3-1

A positive electrode sheet was prepared using the same method as that of Comparative Example 1-1, except that a positive electrode active material layer-forming composition prepared using LLZ instead of LPS was used. An all-solid state secondary battery was manufactured using the same method as that of Comparative Example 1-1, except that the above-described positive electrode sheet was used.

Example 4

In Example 4, a current collector with an easily adhesive layer, an electrode, and an all-solid state secondary battery were manufactured and evaluated using the same methods as that of Example 3, except that an organic solid electrolyte was used as the solid electrolyte of the positive electrode active material layer. The results are shown in Table 3.

Example 4-1

A positive electrode sheet was prepared using the same method as that of Example 1-3, except that a positive electrode active material layer-forming composition prepared using the following Li salt-containing polyethylene oxide solution as the organic solid electrolyte instead of the sulfide-based inorganic solid electrolyte LPS was used. The amount of the Li salt-containing polyethylene oxide solution used was set to be the same as the amount of LPS used in Example 1-3 in terms of solid contents. An all-solid state secondary battery was manufactured using the same method as that of Example 1-3, except that the positive electrode sheet obtained as described above was used.

Preparation Example of Li Salt-Containing Polyethylene Oxide 2.5 g of polyethylene oxide (PEO, Mw: 100000, manufactured by Aldrich) and 1.0 g of lithium bis(trifluoromethanesulfonyl)imide (LiTFSI, manufactured by FUJIFILM Wako Pure Chemical Corporation) were dissolved in 25 g of acetonitrile (manufactured by FUJIFILM Wako Pure Chemical Corporation) to prepare the Li salt-containing polyethylene oxide solution.

Comparative Example 4-1

A positive electrode sheet was prepared using the same method as that of Comparative Example 1-1, except that a positive electrode active material layer-forming composition prepared using the above-described Li salt-containing polyethylene oxide solution (the amount thereof used was expressed in terms of solid contents) instead of LPS was used. An all-solid state secondary battery was manufactured using the same method as that of Comparative Example 1-1, except that the above-described positive electrode sheet was used.

Regarding the prepared positive electrode current collector with an easily adhesive layer, the following characteristics or physical properties were measured or calculated using the same method as that of Example 1. The respective characteristics and physical properties of the negative electrode current collector with an easily adhesive layer are the same as those of the corresponding negative electrode current collector with an easily adhesive layer in Example 1, and thus the description thereof will not be repeated.

Regarding the prepared negative electrode sheets and the prepared all-solid state secondary batteries, the following characteristics or physical properties were measured or evaluated using the same method as that of Example 1, and the results are shown in Table 3.

TABLE 3

Positive Electrode Current Collector with Easily Adhesive Layer

| No. | Positive Electrode Current Collector | Easily Adhesive Layer | | | | | | | | |
|---|---|---|---|---|---|---|---|---|---|---|
| | | Thickness nm | Polymer | Solvent | | | Surface Resistance $\Omega/\square$ | Number of Protrusions Piece/m$^2$ | Elastic Modulus Mpa | Tg °C. | Application Method |
| | | | | Kind | ClogP Value | Solubility | | | | | |
| Example 3-1 | A1 | 50 | Hydrogenated SBR | Toluene | 2.52 | A | $1 \times 10^{12}$ | 0 | 50 | −20 | Solvent-Based |
| Comparative Example 3-1 | A1 | 50 | Crosslinked Polyurethane Resin E | Toluene | 2.52 | D | $1 \times 10^{12}$ | 0 | 500 | 15 | Solvent-Based |
| Example 4-1 | A1 | 50 | Hydrogenated SBR | Toluene | 2.52 | A | $1 \times 10^{12}$ | 0 | 50 | −20 | Solvent-Based |
| Comparative Example 4-1 | A1 | 50 | Crosslinked Polyurethane Resin E | Toluene | 2.52 | D | $1 \times 10^{12}$ | 0 | 500 | 15 | Solvent-Based |

| | Positive Electrode Active Material Layer-Forming Composition | | | | Evaluation | | |
|---|---|---|---|---|---|---|---|
| No. | Solvent | ClogP Value | Inorganic Solid Electrolyte | Binder Shape | Adhesiveness Resistance | Film Hardness | Battery Performance |
| Example 3-1 | Toluene | 2.52 | Oxide-Based Inorganic | Particle | B | AA | A |
| Comparative Example 3-1 | Toluene | 2.52 | Oxide-Based Inorganic | Particle | B | D | — |
| Example 4-1 | Toluene | 2.52 | Organic | Particle | B | AA | A |
| Comparative Example 4-1 | Toluene | 2.52 | Organic | Particle | B | D | — |

It can be seen from the results of Table 3 that, in the current collector with an easily adhesive layer in which the easily adhesive layer including the polymer satisfying the solubility defined by the present invention was provided, in a case where the positive electrode active material including the oxide-based inorganic solid electrolyte or the organic solid electrolyte layer as the inorganic solid electrolyte was provided thereon, high adhesive strength with the positive electrode active material layer was exhibited, and an all-solid state secondary battery having high battery performance can be manufactured. Further, in the current collector with an easily adhesive layer, peeling and fracturing of the easily adhesive layer was able to be prevented even after lamination.

The present invention has been described using the embodiments. However, unless specified otherwise, any of the details of the above description is not intended to limit the present invention and can be construed in a broad sense within a range not departing from the concept and scope of the present invention disclosed in the accompanying claims.

The present application claims priority based on JP2018-104354 filed on May 31, 2018, the entire content of which is incorporated herein by reference.

EXPLANATION OF REFERENCES

1: negative electrode current collector
2: negative electrode active material layer
3: solid electrolyte layer
4: positive electrode active material layer
5: positive electrode current collector
6: operation portion
10: all-solid state secondary battery
11: coin case
12: laminate for all-solid state secondary battery
13: cell (coin battery) for ion conductivity measurement
21: current collector with an easily adhesive layer
22: current collector
23: easily adhesive layer

What is claimed is:

1. A current collector with an adhesive layer comprising:
an adhesive layer that is provided on at least one surface of a current collector,
wherein the adhesive layer includes a polymer having a solubility of 1 g/100 g or higher in toluene at 25° C. and includes $1\times10^5$ to $1\times10^{11}$ piece/m2 protrusion portions on a surface; and
wherein a tensile elastic modulus of the easily adhesive layer is 5001 MPa or lower.

2. The current collector with an adhesive layer according to claim 1,
wherein a surface electrical resistance of the adhesive layer is $10^4$ Ω/□ or higher.

3. The current collector with an adhesive layer according to claim 1,
wherein a thickness of the adhesive layer is 10 to 300 nm.

4. The current collector with an adhesive layer according to claim 1,
wherein a glass transition temperature of the polymer is 0° C. or lower.

5. The current collector with an adhesive layer according to claim 1,
wherein a residual water content of the adhesive layer is 100 ppm or lower.

6. An electrode comprising:
an electrode active material layer including a solid electrolyte that is provided on a surface of the current collector with an adhesive layer according to claim 1 where the adhesive layer is provided.

7. The electrode according to claim 6,
wherein the solid electrolyte is an inorganic solid electrolyte.

8. The electrode according to claim 7,
wherein the inorganic solid electrolyte is a sulfide-based solid electrolyte.

9. The electrode according to claim 6,
wherein the electrode active material layer includes a particle binder.

10. An all-solid state secondary battery comprising:
the electrode according to claim 6.

11. An electronic apparatus comprising:
the all-solid state secondary battery according to claim 10.

12. An electric vehicle comprising:
the all-solid state secondary battery according to claim 10.

13. A method of manufacturing the current collector with an adhesive layer according to claim 1, the method comprising:
forming a film on a surface of a current collector using an adhesive layer-forming composition including the polymer having the solubility of 1 g/100 g or higher in toluene at 25° C.

14. The method according to claim 13,
wherein the adhesive layer-forming composition includes a solvent, and
the film is formed with an application method using the adhesive layer-forming composition.

15. The method according to claim 14,
wherein the solvent is an aqueous solvent.

16. A method of manufacturing an electrode including the current collector with an adhesive layer according to claim 1, the method comprising:
forming a film on the adhesive layer using an active material layer-forming composition including an electrode active material and a solvent that has a ClogP value of 2.0 or higher and dissolves the polymer in the adhesive layer with a solubility of 1 g/100 g or higher.

17. A method of manufacturing an all-solid state secondary battery, the method comprising:
forming a solid electrolyte layer on a first electrode, and laminating a second electrode on the solid electrolyte layer such that the solid electrolyte layer is disposed between the first electrode and the second electrode,
wherein at least one of the first electrode and the second electrode is manufactured by the method of manufacturing the electrode according to claim 16.

* * * * *